United States Patent
Wallentin et al.

(10) Patent No.: US 12,557,020 B2
(45) Date of Patent: Feb. 17, 2026

(54) RADIO NETWORK NODES, USER EQUIPMENT, AND METHODS PERFORMED IN A WIRELESS COMMUNICATION NETWORK

(71) Applicant: Telefonaktiebolaget LM Ericsson (publ), Stockholm (SE)

(72) Inventors: Pontus Wallentin, Linköping (SE); Oumer Teyeb, Montréal (CA); Stefan Wager, Espoo (FI); Icaro Leonardo Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 18/015,869

(22) PCT Filed: Jul. 22, 2021

(86) PCT No.: PCT/SE2021/050746
§ 371 (c)(1),
(2) Date: Jan. 12, 2023

(87) PCT Pub. No.: WO2022/019824
PCT Pub. Date: Jan. 27, 2022

(65) Prior Publication Data
US 2023/0262600 A1   Aug. 17, 2023

Related U.S. Application Data

(60) Provisional application No. 63/054,808, filed on Jul. 22, 2020.

(51) Int. Cl.
*H04W 52/00*   (2009.01)
*H04W 52/02*   (2009.01)

(52) U.S. Cl.
CPC ............... *H04W 52/0235* (2013.01)

(58) Field of Classification Search
None
See application file for complete search history.

(56) References Cited

U.S. PATENT DOCUMENTS

| | | |
|---|---|---|
| 12,063,702 B2 * | 8/2024 | Park .............. H04W 88/14 |
| 12,356,485 B2 * | 7/2025 | Park ............... H04B 7/15542 |
| 2017/0195028 A1 | 7/2017 | Shimezawa et al. |

FOREIGN PATENT DOCUMENTS

| | | |
|---|---|---|
| CN | 110536387 A | 12/2019 |
| EP | 3151622 A1 | 4/2017 |

(Continued)

OTHER PUBLICATIONS

3GPP, "3GPP TS 36.300 V16.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Jul. 2020, 1-390.

(Continued)

*Primary Examiner* — Gerald A Smarth
(74) *Attorney, Agent, or Firm* — Murphy, Bilak & Homiller, PLLC

(57) ABSTRACT

Embodiments herein relate to, for example, a method performed by a UE (10) for communicating in a wireless communication network, wherein the UE (10) is configured to be connected to a first cell of an MSG and a second cell of an SCG. The UE (10) receives an indication to perform transition to a first operation state from a second operation state; and upon transitioning to the first operation state, monitors for one or more temporary reference signals of the SCG.

5 Claims, 28 Drawing Sheets

(56) References Cited

FOREIGN PATENT DOCUMENTS

| WO | WO-2017211682 A1 | * | 12/2017 | ........ | H04W 72/0453 |
|---|---|---|---|---|---|
| WO | 2020033965 A1 | | 2/2020 | | |

OTHER PUBLICATIONS

3GPP, "3GPP TS 36.321 V16.0.0", 3rd Generation Partnership Project; Technical Specification Group Radio Access Network; Evolved Universal Terrestrial Radio Access (E-UTRA); Medium Access Control (MAC) protocol specification (Release 16), Mar. 2020, 1-16.

3GPP, "3GPP TS 38.321 V16.0.0", 3rd Generation Partnership Project; Technical Specification Group Radio Access Network; NR; Medium Access Control (MAC) protocol specification (Release 16), Mar. 2020, 1-141.

3GPP, "3GPP TS 36.133 V16.2.0", 3rd Generation Partnership Project; Technical Specification Group Radio Access Network; Evolved Universal Terrestrial Radio Access (E-UTRA); Requirements for support of radio resource management (Release 16), Jun. 2019, 1-3602.

3GPP, "3GPP TS 37.340 V15.8.0", 3rd Generation Partnership Project; Technical Specification Group Radio Access Netwok; Evolved Universal Terrestrial Radio Access (E-UTRA) and NR; Multi-connectivity; Stage 2 (Release 15), Dec. 2019, 1-71.

3GPP, "3GPP TS 37.340 V16.1.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2020, 1-74.

3GPP, "3GPP TS 38.133 V16.4.0", 3rd Generation Partnership Project; Technical Specification Group Radio Access Network; NR; Requirements for support of radio resource management (Release 16), Jun. 2020, 1-1463.

3GPP, "3GPP TS 38.213 V16.1.0", 3rd Generation Partnership Project; Technical Specification Group Radio Access Network; NR; Physical layer procedures for control (Release 16), Mar. 2020, 1-156.

3GPP, "3GPP TS 38.300 V16.2.0", 3rd Generation Partnership Project; Technical Specification Group Radio Access Network; NR; NR and NG-RAN Overall Description; Stage 2 (Release 16), Jul. 2020, 1-148.

3GPP, "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, 1-835.

3GPP, "3rd Generation Partnership Project; Technical Specification Group Radio Access Network; NR; Requirements for support of radio resource management (Release 16)", 3GPP TS 38.133 V16.2.0, Dec. 2019, 1-1129.

3GPP, "3rd Generation Partnership Project; Technical Specification Group Radio Access Network; NR; Requirements for support of radio resource management (Release 16)", 3GPP TS 38.133 V16.3.0, Mar. 2020, 1-1165.

China Telecom, "Views on NR Rel-17", 3GPP TSG RAN Meeting #84, RP-190919, Newport Beach, USA, Jun. 4, 2019, 1-36.

Huawei, "Revised WID on Further Multi-RAT Dual-Connectivity enhancements", 3GPP TSG RAN Meeting #88e, RP-201040, (revision of RP-193249), Electronic Meeting, Jun. 29-Jul. 3, 2020, 1-4.

* cited by examiner

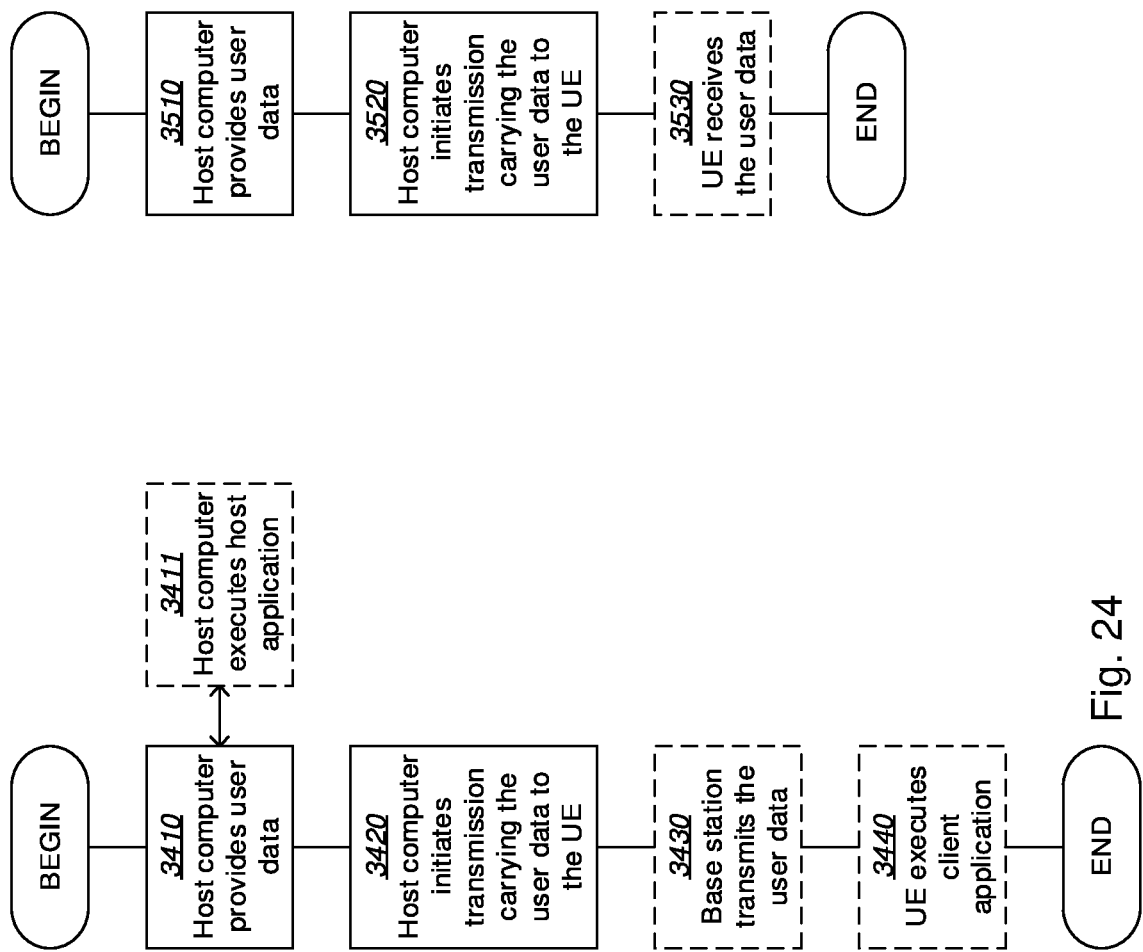

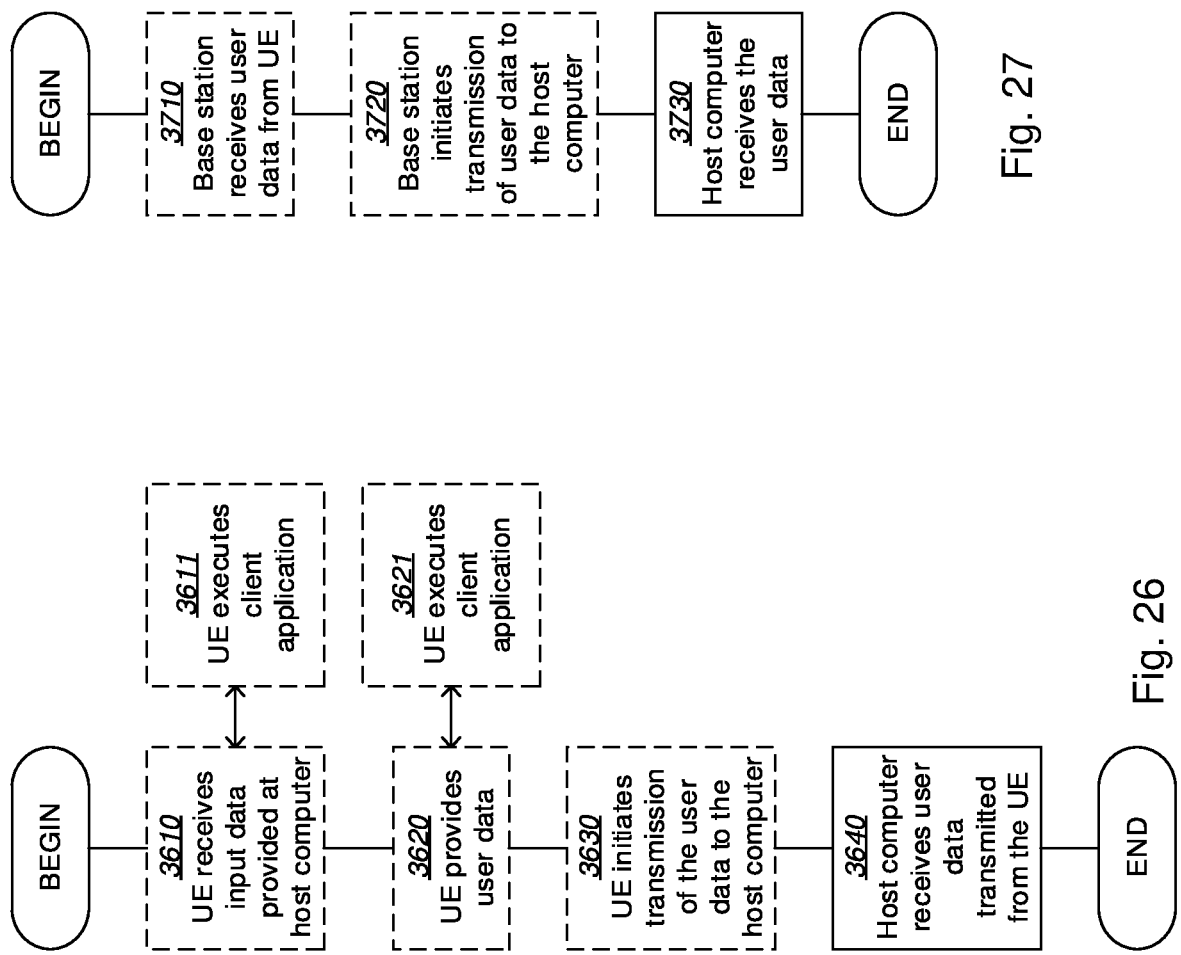

RADIO NETWORK NODES, USER EQUIPMENT, AND METHODS PERFORMED IN A WIRELESS COMMUNICATION NETWORK

TECHNICAL FIELD

Embodiments herein relate to a first radio network node, a second radio network node, a user equipment (UE), and methods performed therein regarding communication in a wireless communication network. Furthermore, a computer program product and a computer-readable storage medium are also provided herein. Especially, embodiments herein relate to handling or enabling communication in the wireless communication network.

BACKGROUND

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by a radio network node such as an access node e.g. a W-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the UEs within range of the access node. The radio network node communicates over a downlink (DL) to the UE and the UE communicates over an uplink (UL) to the radio network node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with UEs. In a forum known as the Third Generation Partnership Project (3GPP), telecommunications suppliers propose and agree upon standards for present and future generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and also for fifth generation (5G) networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio (NR), the use of very many transmit- and receive-antenna elements makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO). 5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) and a new core network (5GC).

Carrier Aggregation (CA) is the simultaneous usage of more than one carrier (cell) at a time by the UE to increase the bandwidth/spectrum usage and thereby improve UE UL/DL throughput. With CA, the UE is connected to a primary cell (PCell), and one or more secondary cells (SCells). Each SCell may correspond to a component carrier (CC) in the same frequency band (intra-band CA) or different frequency band (inter-band CA) from the frequency band of the CC corresponding to the PCell.

Though CA enables higher aggregate throughput for the UE, it comes at the expense of UE power consumption. Even if the UE is not being scheduled on a certain carrier (SCell), maintaining that carrier, e.g. scanning the physical downlink control channel (PDCCH) for incoming scheduling, etc, consumes power. Thus, SCells can be set to be in deactivated state when they are not being utilized. And typically, SCells are initially added/configured in deactivated state and activated on a need basis, e.g. when the UE has enough data to send/receive that justifies the use of the SCells. Typically, the activation procedure can take anywhere between a minimum activation delay, on order of a few milliseconds, to up to tens of milliseconds. Cell activation/deactivation is performed via medium access control (MAC) control element (CE) signaling. Cells can also be activated via radio resource control (RRC) signaling, during e.g. handover (HO), connection resume or SCell addition.

In LTE release (rel)-15, a feature called enhanced uplink CA (euCA) was specified. One of the features of euCA was the enhancement of the SCell activation procedure via fast Channel Quality Indicator (CQI) reporting mechanism, where upon activation, the UE performs fast CQI reporting on that SCell so that the network can quickly determine when the concerned SCell is activated by the UE and the UE is ready to receive/transmit user plane (UP) and/or control plane (CP) data.

For fast CQI reporting, the network configures the UE with a very frequent CQI reporting period for the corresponding SCell. Typically, a UE would report an out-ofrange (OOR) value for CQI when it is not yet activated, and a valid CQI when it is activated, and thus once the network receives a CQI that is not OOR, it can assume that the SCell is activated and the UE can be scheduled for UL/DL data/control transmission/reception on that SCell, and the received CQI could be used for the scheduling as in normal case. In LTE, fast CQI configuration is enabled for a fixed amount of time i.e. from subframe n+8 to subframe n+34, where n is subframe in which the MAC SCell activation command is received by the UE.

When an SCell is deactivated, the UE does not need to receive the corresponding PDCCH or physical downlink shared channel (PDSCH), cannot transmit in the corresponding uplink, nor is it required to perform CQI/channel state information (CSI) measurements. Conversely, when an SCell is active, the UE shall receive PDSCH and PDCCH (if the UE is configured to monitor PDCCH from this SCell), and is expected to be able to perform CQI measurements. To enable faster CQI reporting, a temporary CQI reporting period (called short CQI period) may be supported during SCell activation period. The activation/deactivation may be performed via radio resource control (RRC) signaling (during SCell addition/Handover/Connection Resume), or a MAC CE. Implicit transition from activated to deactivate state is also possible via a configuration of inactivity timers. NOTE: The terms Channel State Information (CSI) and Channel Quality Indication (CQI) are interchangeably used herein. However, strictly speaking, CSI is a collective name of several different type of UE reports that includes the CQI, precoding matrix indicator (PMI), precoding type indicator (PTI) and rank indication (RI).

FIG. 1 illustrates the transition between activated and inactivated state, and the timing requirements. FIG. 1 is an illustration of activation/deactivation of SCells.

The activation/deactivation mechanism is based on the combination of a MAC control element (CE) and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. One deactivation timer is maintained per SCell but one common value is configured per UE by RRC. When there has been no UL/DL activity on an SCell for a duration equal to the inactivity/deactivation timer, the SCell is put into deactivated state.

SCell Activation Delay Requirement for Deactivated SCell
This section is adopted from 38.133 v16.2.0:
The requirements in this clause shall apply for the UE configured with one downlink SCell in EN-DC, or in stand-alone NR carrier aggregation or in NE-DC or in NR-DC and when one SCell is being activated.

The delay within which the UE shall be able to activate the deactivated SCell depends upon the specified conditions.

Upon receiving SCell activation command in slot n, the UE shall be capable to transmit valid CSI report and apply actions related to the activation command for the SCell being activated no later than in slot $$n + \frac{T_{HARQ} + T_{activation\_time} + T_{CSI\_Reporting}}{NR \text{ slot length}},$$

where:
T_HARQ (in ms) is the timing between DL data transmission and acknowledgement as specified in TS 38.213
Tactivation_time is the SCell activation delay in millisecond.
If the SCell is known and belongs to FR1, Tactivation_time is:
  TFirstSSB+5 ms, if the SCell measurement cycle is equal to or smaller than 160 ms.
  TFirstSSB_MAX+Trs+5 ms, if the SCell measurement cycle is larger than 160 ms.
If the SCell is unknown and belongs to FR1, provided that the side condition Ês/Iot≥[−2] dB is fulfilled, Tactivation_time is:
  TFirstSSB_MAX+TSMTC_MAX TSMTC_MAX+ 2*Trs+5 ms.
If the SCell being activated belongs to FR2 and if there is at least one active serving cell on that FR2 band, then Tactivation_time is TFirstSSB+5 ms provided:
  The UE is provided with SS/PBCH block measurement timing configuration (SMTC) for the target SCell, and
  The SSBs in the serving cell(s) and the SSBs in the SCell fulfil the condition defined in clause 3.6.3.
If the SCell being activated belongs to FR2 and if there is at least one active serving cell on that FR2 band, if the UE is not provided with any SMTC for the target SCell, Tactivation_time is 3 ms, provided
  the RS (s) of SCell being activated is (are) quasi-co-location (QCL)-TypeD with RS (s) of one active serving cell on that FR2 band.
If the SCell being activated belongs to FR2 and if there is no active serving cell on that FR2 band provided that PCell or primary secondary cell (PSCell) is FR1:
  If the target SCell is known to UE and semi-persistent CSI-RS is used for CSI reporting, then Tactivation_time is:
    TFineTiming+5 ms, if UE receives the SCell activation command, semi-persistent CSI-RS activation command and Transmission Configuration Indicator (TCI) state activation command at the same time.
    Tuncertainty_MAC+TFineTiming+5 ms, if UE receives TCI state activation command after SCell activation command.
  If the target SCell is known to UE and periodic CSI-RS is used for CSI reporting, then Tactivation_time is:
    max(Tuncertainty_MAC+5 ms+TFineTiming, Tuncertainty_RRC+TRRC_delay-THARQ), where Tuncertainty_MAC=0 if UE receives the SCell activation command and TCI state activation commands at the same time.
  If the target SCell is unknown to UE and semi-persistent CSI-RS is used for CSI reporting, provided that the side condition Ês/Iot [−2] dB is fulfilled, then Tactivation_time is:
    8 ms+24*Trs+Tuncertainty_MAC+TL1-RSRP, measure+ TL1-RSRP, report+THARQ+TFineTiming
  If the target SCell is unknown to UE and periodic CSI-RS is used for CSI reporting, provided that the side condition Ês/Iot [−2] dB is fulfilled, then Tactivation_time is:
    3 ms+24*Trs+TL1-RSRP, measure+TL1-RSRP, report+ {(THARQ+Tuncertainty_MAC+5 ms+TFineTiming), (Tuncertainty_RRC+TRRC_delay)}.
  Where,
  TSMTC_MAX:
    In FR1, in case of intra-band SCell activation, TSMTC_MAX is the longer SMTC periodicity between active serving cells and SCell being activated provided the cell specific reference signals from the active serving cells and the SCells being activated or released are available in the same slot; in case of inter-band SCell activation, TSMTC_MAX is the SMTC periodicity of SCell being activated.

In FR2, TSMTC_MAX is the longer SMTC periodicity between active serving cells and SCell being activated provided that in Rel-15 only support FR2 intra-band CA.

TSMTC_MAX is bounded to a minimum value of 10 ms.

Trs is the SMTC periodicity of the SCell being activated if the UE has been provided with an SMTC configuration for the SCell in SCell addition message, otherwise Trs is the SMTC configured in the measObjectNR having the same synchronization signal block (SSB) frequency and subcarrier spacing.

If the UE is not provided SMTC configuration or measurement object on this frequency, the requirement which involves Trs is applied with Trs=5 ms assuming the SSB transmission periodicity is 5 ms. There is no requirement if the SSB transmission periodicity is not 5 ms.

TFirstSSB: is the time to first SSB indicated by the SMTC after n+THARQ+3 ms TFirstSSB_MAX: Is the time to first SSB indicated by the SMTC after n+THARQ+3 ms, further fulfilling:
- In FR1, in case of intra-band SCell activation, the occasion when all active serving cells and SCells being activated or released are transmitting SSB bursts in the same slot; in case of inter-band SCell activation, the first occasion when the SCell being activated is transmitting SSB burst.
- In FR2, the occasion when all active serving cells and SCells being activated or released are transmitting SSB bursts in the same slot.

TFineTiming is the time period between UE finish processing the last activation command for PDCCH TCI, PDSCH TCI (when applicable) and semi-persistent CSI-RS (when applicable) and the timing of first complete available SSB corresponding to the TCI state.

TL1-reference signal received power (RSRP), measure is L1-RSRP measurement delay TL1-RSRP_Measurement_Period_SSB (ms) or TL1-RSRP_Measurement_Period_CSI-RS based on applicability as defined in clause 9.5 assuming M=1.

TL1-RSRP, report is delay of acquiring CSI reporting resources.

Tuncertainty_MAC is the time period between reception of the last activation command for PDCCH TCI, PDSCH TCI (when applicable) and semi-persistent
  CSI-RS for CQI reporting (when applicable) relative to SCell activation command for known case;
  First valid L1-RSRP reporting for unknown case.

Tuncertainty_RRC is the time period between reception of the RRC configuration message for TCI of periodic CSI-RS for CQI reporting (when applicable) relative to
  SCell activation command for known case;
  First valid L1-RSRP reporting for unknown case.

TRRC_delay is the RRC procedure delay as specified in [2].
  TCSI_reporting is the delay (in ms) including uncertainty in acquiring the first available downlink CSI reference resource, UE processing time for CSI reporting and uncertainty in acquiring the first available CSI reporting resources as specified in TS 38.331.

SCell in FR1 is considered to be known if it has been meeting the following conditions:
  During the period equal to max(5 measCycleSCell, 5 DRX cycles) for FR1 before the reception of the SCell activation command:
  the UE has sent a valid measurement report for the SCell being activated and
  the SSB measured remains detectable according to the cell identification conditions specified in clause 9.2 and 9.3.
  the SSB measured during the period equal to max(5 measCycleSCell, 5 DRX cycles) also remains detectable during the SCell activation delay according to the cell identification conditions specified in clause 9.2 and 9.3.

Otherwise SCell in FR1 is unknown.

For the first SCell activation in FR2 bands, the SCell is known if it has been meeting the following conditions:
  During the period equal to [4 s] for UE supporting power class1 and [3 s] for UE supporting power class 2/3/4 before UE receives the last activation command for PDCCH TCI, PDSCH TCI (when applicable) and semi-persistent CSI-RS for CQI reporting (when applicable):
  the UE has sent a valid L3-RSRP measurement report with SSB index
  SCell activation command is received after L3-RSRP reporting and no later than the time when UE receives MAC-CE command for TCI activation
  During the period from L3-RSRP reporting to the valid CQI reporting, the reported SSBs with indexes remain detectable according to the cell identification conditions specified in clauses 9.2 and 9.3, and the TCI state is selected based on one of the latest reported SSB indexes.

Otherwise, the first SCell in FR2 band is unknown. The requirement for unknown SCell applies provided that the activation commands for PDCCH TCI, PDSCH TCI (when applicable), semi-persistent CSI-RS for CQI reporting (when applicable), and configuration message for TCI of periodic CSI-RS for CQI reporting (when applicable) are based on the latest valid L1-RSRP reporting.

If the UE has been provided with higher layer in TS 38.331 signaling of smtc2 prior to the activation command, TSMTC_Scell follows smtc1 or smtc2 according to the physical cell ID of the target cell being activated. TSMTC_MAX follows smtc1 or smtc2 according to the physical cell IDs of the target cells being activated and the active serving cells.

In addition to CSI reporting defined above, UE shall also apply other actions related to the activation command specified in TS 38.331 for a SCell at the first opportunities for the corresponding actions once the SCell is activated.

The interruption on PSCell or any activated SCell in SCG for EN-DC mode specified herein shall not occur before slot $$n + 1 + \frac{T_{HARQ}}{NR \text{ slot length}}$$

and not occur after slot $$n + 1 + \frac{T_{HARQ} + 3 + T_{SMTC\_MAX} + T_{SMTC\_duration}}{NR \text{ slot length}}.$$

The interruption on PCell or any activated SCell in MCG for NR standalone mode specified herein shall not occur before slot $$n + 1 + \frac{T_{HARQ}}{NR \text{ slot length}}$$

and not occur after slot $$n+1+\frac{T_{HARQ}+3+T_{SMTC\_MAX}+T_{SMTC\_duration}}{NR\ slot\ length}.$$

Starting from the slot specified in clause 4.3 of TS 38.213 (timing for secondary Cell activation/deactivation) and until the UE has completed the SCell activation, the UE shall report out of range (OOR) if the UE has available uplink resources to report CQI for the SCell.

Starting from the slot specified in clause 4.3 of TS 38.213 (timing for secondary Cell activation/deactivation) and until the UE has completed a first L1-RSRP measurement, the UE shall report lowest valid L1 SS-RSRP range if the UE has available uplink resources to report L1-RSRP for the SCell.
Dormant SCells (LTE) and Dormancy Like Behavior of SCells (NR)

In LTE, to enable faster transition to activated state, a dormant state for SCells (i.e. not PCell or PSCell) is supported. When an SCell is in dormant state, like in the deactivate state, the UE does not need to receive the corresponding PDCCH or PDSCH and cannot transmit in the corresponding uplink. However, the UE is required to perform CQI measurements. A PUCCH SCell (SCell configured with PUCCH) cannot be in dormant state.

FIG. 2 shows an illustration of dormant state SCells in LTE (the lower part showing the transition between activated and dormant states)

In NR, dormancy like behavior is realized using the concept of dormant bandwidth parts (BWP). One dormant BWP, one of the dedicated BWPs configured by the network via RRC signaling, can be configured for an SCell. If the active BWP of the activated SCell is a dormant BWP, the UE stops monitoring PDCCH on the SCell but continues performing CSI measurements, Automatic Gain Control (AGC) and beam management, if configured. A downlink control information (DCI) is used to control entering/leaving the dormant BWP for one or more SCell(s) or one or more SCell group(s), and it is sent to the special cell (sPCell) of the cell group that the SCell belongs to, i.e. PCell in case the SCell belongs to the master cell group (MCG) and PSCell if the SCell belongs to the secondary cell group (SCG). The SpCell (i.e. PCell of PSCell) and PUCCH SCell cannot be configured with a dormant BWP.

FIG. 3 is an illustration of dormancy like behavior for SCells in NR.
Dual Connectivity Dual connectivity is generally used in NR (5G) and LTE systems to improve UE transmit and receive data rate. With dual connectivity (DC), the UE typically operates initially a serving cell group called a master cell group (MCG). The UE is then configured by the network with an additional cell group called a secondary cell group (SCG). Each cell group (CG) can have one or more serving cells. MCG and SCG can be operated from geographically non-collocated gNBs. MCG and SCG can be operated with corresponding serving cells belonging to different frequency ranges and/or corresponding serving cells in same and different frequency ranges. In an example, a MCG can have serving cells in FR1, and SCG can also have serving cells in FR1.
3GPP Architecture Options There are different ways to deploy 5G network with or without interworking with LTE (also referred to as E-UTRA) and evolved packet core (EPC), as depicted in FIG. 4. In principle, NR and LTE can be deployed without any interworking, denoted by NR stand-alone (SA) operation, that is gNB in NR can be connected to 5G core network (5GC) and eNB can be connected to EPC with no interconnection between the two (Option 1 and Option 2 in the figure). On the other hand, the first supported version of NR is the so-called EN-DC (E-UTRAN-NR Dual Connectivity), illustrated by Option 3. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR which will be standardized as part of NG-RAN connected to 5GC, denoted by MR-DC (Multi-Radio Dual Connectivity). Under the MR-DC umbrella, we have:

EN-DC (Option 3): LTE is the master node and NR is the secondary (EPC CN employed)

NE-DC (Option 4): NR is the master node and LTE is the secondary (5GCN employed)

NGEN-DC (Option 7): LTE is the master node and NR is the secondary (5GCN employed)

NR-DC (variant of Option 2): Dual connectivity where both the master and secondary are NR (5GCN employed).

FIG. 4 shows LTE and NR interworking options.

As migration for these options may differ from different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR it is also possible to support CA (Carrier Aggregation) in each cell group (i.e. MCG and SCG) and dual connectivity between nodes on same RAT (e.g. NR-NR DC). For the LTE cells, a consequence of these different deployments is the co-existence of LTE cells associated to eNBs connected to EPC, 5GC or both EPC/5GC.
MR-DC User Plane Architecture.

From a UE point of view, there are three Data Radio Bearer (DRB) types in MR-DC; MCG, SCG and split DRB, characterized by which cell group that is used for transmission, see FIG. 5. MCG DRB uses only the MCG, SCG DRB uses only the SCG, whereas split DRB can use both MCG and SCG for data transmission. For RLC/MAC, the protocol version (E-UTRA or NR) is selected based on the RAT used by the cell group. NR PDCP is used for all DRB types, except in EN-DC it is also possible for network to configure E-UTRA PDCP for MCG DRB.

From a network point of view, each DRB may be terminated either by the MN or the SN. This applies to all three bearer types, so that from a network point of view, six different bearer configurations are possible, see FIG. 6 and FIG. 7. For bearer types requiring data transmission over X2/Xn interface, a flow control protocol is used between MN and SN to avoid excessive buffering of data on RLC bearer level, which may lead to excessive reordering at the receiving PDCP entity. The RLC bearer contains the RLC/MAC configuration for each logical channel towards the UE.

For DL transmission on split DRBs, the network decides per Packet Data Convergence Protocol (PDCP) protocol data unit (PDU) whether to transmit via MCG or SCG. For UL transmission on split DRBs, the UE is configured with a buffer threshold. When data in buffer for the corresponding DRB is below the threshold, Buffer Status Reports (BSR) are sent only on the preferred path. The preferred path can be either MCG or SCG, and is configured by the network per DRB. When data in the buffer is above the buffer threshold, the UE reports the total BSR to both MCG and SCG. It is then up to the network scheduler using scheduling grants in MCG and SCG to control the uplink data flow.

FIG. 5 shows Radio Bearer types in MR-DC.

FIG. 6 shows the network side radio protocol termination options for MCG, SCG and split bearers in the MN and SN for MR-DC with EPC (EN-DC).

FIG. 7 shows the network side radio protocol termination options for MCG, SCG and split bearers in the MN and SN for MR-DC with 5GC.

MR-DC Control Plane Architecture

A UE in MR-DC has a single control plane connection to the core network and a single RRC state, controlled by the MN. Both MN and SN has an own RRC entity for creating RRC messages or Information Elements (IE) for configuring the UE, see FIG. 8. Since the SN is responsible for its own resources, it provides the UE with the Secondary Cell Group (SCG) configuration in an RRC message and also the radio bearer configuration in an IE, for all bearers that are terminated in the SN. The MN in turn creates the Master Cell Group (MCG) configuration and the radio bearer configuration for all bearers terminated in the MN. The cell group configuration includes the configuration of L1 (physical layer), MAC and RLC. The radio bearer configuration includes the configuration of PDCP (and service data adaptation protocol (SDAP) in case of 5GC).

The MN always sends the initial SN RRC configuration via MCG SRB (SRB1), but subsequent RRC configurations created by the SN can be sent to the UE either via the MN using SRB1 or directly to the UE using SRB3 (if configured). See FIG. 9 for the different SRB types. For the SRB1 case, the MN receives from the SN an RRC message containing the SCG configuration and an IE containing the radio bearer configuration. The MN encapsulates these into the RRC message it creates itself, that may also include changes to the MCG configuration and radio bearer configuration of bearers terminated in the MN. Thereby, the MCG and SCG configurations may be sent to the UE in the same RRC message.

Split SRB1 is used to create diversity. From RRC point of view, it operates like normal SRB1. However, on PDCP level, the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg", "path" and "RLC bearer" are used interchangeably throughout this document.

For the SRB3 case, the SN creates the RRC message including the SCG configuration and radio bearer configuration for radio bearers terminated in the SN. SN may only use SRB3 for reconfigurations not requiring coordination with MN.

FIG. 8 shows a Control plane architecture for EN-DC (left) and MR-DC with 5GC (right).

FIG. 9 shows Network side protocol termination options for SRBs in MR-DC.

MR-DC Secondary Node Addition

Secondary Node Addition to establish MR-DC is described in 37.340 as follows:

< ---------------start current 3GPP RAN2 Rel-16 spec text 37.340 f80----------------->

The Secondary Node (SN) Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 10 shows the SN Addition procedure.

1. The MN decides to request the target SN to allocate resources for one or more specific PDU Sessions/QOS Flows, indicating QoS Flows characteristics (QOS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN terminated bearers are setup) to enable SRB3 to be setup based on SN decision.

For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QOS flow, the MN may request the direct establishment of SCG and/or split bearers, i.e. without first having to establish MCG bearers. It is also allowed that all QOS flows can be mapped to SN terminated bearers, i.e. there is no QoS flow mapped to an MN terminated bearer.

| | |
|---|---|
| 2. | If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided. |
| NOTE 3: | In case of MN terminated bearers, transmission of user plane data may take place after step 2. |
| NOTE 4: | In case of SN terminated bearers, data forwarding and the SN Status Transfer may take place after step 2. |
| NOTE 5: | For MN terminated NR SCG bearers for which PDCP duplication with CA is configured the MN allocates 2 separate Xn-U bearers.<br>For SN terminated NR MCG bearers for which PDCP duplication with CA is configured the SN allocates 2 separate Xn-U bearers. |
| 2a. | For SN terminated bearers using MCG resources, the MN provides Xn-U DL TNL address information in the Xn-U Address Indication message. |
| 3. | The MN sends the MN RRC reconfiguration message to the UE including the SN RRC configuration message, without modifying it. |
| 4. | The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure. |
| 5. | The MN informs the SN that the UE has completed the reconfiguration procedure successfully via SN Reconfiguration Complete message, including the SN RRC response message, if received from the UE. |
| 6. | If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure. |
| 7. | If PDCP termination point is changed to the SN for bearers using RLC AM, and when RRC full configuration is not used, the MN sends the SN Status Transfer. |
| 8. | For SN terminated bearers or QoS flows moved from the MN, dependent on the characteristics of the respective bearer or QOS flow, the MN may take actions to minimise service interruption due to activation of MR-DC (Data forwarding). |
| 9-12. | If applicable, the update of the UP path towards the 5GC is performed via a PDU Session Path Update procedure. |

<----------------end current 3GPP RAN2 Rel-16 spec text 37.340 f80----------------->

SN Addition Delay in EN-DC (from 36.133 v16.2.0)

7.31.2 NR PSCell Addition Delay Requirement

The requirements in this section shall apply for the UE which is configured with PCell, and may also be configured with one or more SCells.

Upon receiving NR PSCell addition in subframe n, the UE shall be capable to transmit physical random access channel (PRACH) preamble towards NR PSCell no later than in subframe $n+T_{config\_PSCell}$:

Where:

$$T_{config\_PSCell} = T_{RRC\_delay} + T_{processing} + T_{search} + T_A + T_{PSCell\_DU} + 2 \text{ ms}$$

$T_{RRC\_delay}$ is the RRC procedure delay as specified in [2].

$T_{processing}$ is the SW processing time needed by UE, including RF warm up period. $T_{processing}=20$ ms if NR PSCell is in FR1, $T_{processing}=40$ ms if NR PSCell is in FR2.

$T_{search}$ is the time for AGC settling and PSS/SSS detection.

For NR PSCell in FR1: if the target cell is a known cell, $T_{search}=0$ ms. If the target cell is an unknown cell and the target cell Es/Iot≥−2 dB, then $T_{search}=3*Trs$ ms;

For NR PSCell in FR2: if the target cell is a known cell, $T_{search}=0$ ms. If the target cell is an unknown cell and the target cell Es/Iot≥−2 dB, then $T_{search}=24*Trs$ ms.

$T_A$ is time for fine time tracking and acquiring full timing information of the target cell. $T_A=1*Trs$ ms for a known or unknown PSCell.

$T_{PSCell\_DU}$ is the delay uncertainty in acquiring the first available PRACH occasion in the NR PSCell. $T_{PSCell\_DU}$ is up to the summation of SSB to PRACH occasion association period and 10 ms. SSB to PRACH occasion associated period is defined in the table 8.1-1 of TS 38.213 [39].

Trs is the SMTC periodicity of the target NR cell if the UE has been provided with an SMTC configuration for the target cell in PSCell addition message, otherwise Trs is the SMTC configured in the measObjectNR having the same SSB frequency and subcarrier spacing. If the UE is not provided SMTC configuration or measurement object on this frequency, the requirement in this section is applied with Trs=5 ms assuming the SSB transmission periodicity is 5 ms. There is no requirement if the SSB transmission periodicity is not 5 ms.

In FR1 and FR2, the NR PSCell is known if it has been meeting the following conditions:

During the last 5 seconds before the reception of the NR PSCell configuration command:

the UE has sent a valid measurement report for the NR PSCell being configured and One of the SSBs measured from the NR PSCell being configured remains detectable according to the cell identification conditions specified in section 9.3 of TS 38.133 [50], One of the SSBs measured from NR PSCell being configured also remains detectable during the NR PSCell configuration delay according to the cell identification conditions specified in section 9.3 of TS 38.133 [50].

otherwise it is unknown.

The PCell interruption specified in section 7.32 is allowed only during the RRC reconfiguration procedure [2].

SN addition delay in NR-DC (from 38.133 v16.2.0)

8.9.2 PSCell Addition Delay Requirement

The requirements in this clause shall apply for the UE configured with only PCell in FR1. Upon receiving PSCell addition in subframe n, the UE shall be capable to transmit PRACH preamble towards PSCell in FR2 no later than in subframe $n+T_{config\_PSCell}$:

Where:

$$T_{config\_PSCell} = T_{RRC\_delay} + T_{processing} + T_{search} + T_A + T_{PSCell\_DU} + 2 \text{ ms}$$

$T_{RRC\_delay}$ is the RRC procedure delay as specified in TS 38.331 [2].

$T_{processing}$ is the SW processing time needed by UE, including RF warm up period. $T_{processing}$ 30=40 ms.

$T_{search}$ is the time for AGC settling and PSS/SSS detection. If the target cell is known, $T_{search}=0$ ms. If the target cell is unknown and the target cell Es/Iot≥−2 dB, $T_{search}=24*Trs$ ms. $T_A$ is time for fine time tracking and acquiring full timing information of the target cell. $T_A=1*Trs$ ms for a known or unknown PSCell.

$T_{PSCell\_DU}$ is the delay uncertainty in acquiring the first available PRACH occasion in the PSCell. $T_{PSCell\_DU}$ is up to the summation of SSB to PRACH occasion association period and 10 ms. SSB to PRACH occasion associated period is defined in Table 8.1-1 of TS 38.213.

TABLE 8.1-1

Mapping between PRACH configuration period and SS/PBCH block to PRACH occasion association period

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Trs is the SMTC periodicity of the target cell if the UE has been provided with an SMTC configuration for the target cell in PSCell addition message, otherwise Trs is the SMTC configured in the measObjectNR having the same SSB frequency and subcarrier spacing. If the UE is not provided SMTC configuration or measurement object on this frequency, the requirement in this clause is applied with Trs=5 ms assuming the SSB transmission periodicity is 5 ms. There is no requirement if the SSB transmission periodicity is not 5 ms.

In FR1 and FR2, the PSCell is known if it has been meeting the following conditions:

During the last 5 seconds before the reception of the PSCell configuration command:
  the UE has sent a valid measurement report for the PSCell being configured and
  One of the SSBs measured from the PSCell being configured remains detectable according to the cell identification conditions specified in clause 9.3.
  One of the SSBs measured from PSCell being configured also remains detectable during the PSCell configuration delay $T_{config\_PSCell}$ according to the cell identification conditions specified in clause 9.3.

otherwise it is unknown.

The PCell interruption specified in clause 8.2 is allowed only during the RRC reconfiguration procedure.

MR-DC Secondary Node Modification

Secondary Node Modification to modify MR-DC is described in 37.340 as follows:

<---------------start current 3GPP RAN2 Rel-16 spec text 37.340 f80----------------->

SN initiated SN Modification with MN involvement

FIG. 11: SN Modification procedure - SN initiated with MN involvement

The SN uses the procedure to perform configuration changes of the SCG within the same SN, e.g. to trigger the modification/release of the user plane resource configuration and to trigger PSCell changes (e.g. when a new security key is required or when the MN needs to perform PDCP data recovery). The MN cannot reject the release request of PDU session/QoS flows. The SN also uses the procedure to request the MN to provide more DRB IDs to be used for SN terminated bearers or to return DRB IDs used for SN terminated bearers that are not needed any longer. FIG. 11 shows an example signalling flow for SN initiated SN Modification procedure.

1. The SN sends the SN Modification Required message including an SN RRC reconfiguration message, which may contain user plane resource configuration related context, other UE context related information and the new radio resource configuration of SCG. In case of change of security key, the PDCP Change Indication indicates that an SN security key update is required. In case the MN needs to perform PDCP data recovery, the PDCP Change Indication indicates that PDCP data recovery is required.
   The SN can decide whether the change of security key is required.

2/3. The MN initiated SN Modification procedure may be triggered by SN Modification Required message, e.g. when an SN security key change needs to be applied.

NOTE 3: For SN terminated NR MCG bearers to be setup for which PDCP duplication with CA is configured the SN allocates 2 separate Xn-U bearers.

4. The MN sends the MN RRC reconfiguration message to the UE including the SN RRC reconfiguration message with the new SCG radio resource configuration.

5. The UE applies the new configuration and sends the MN RRC reconfiguration complete message, including an SN RRC response message, if needed. In case the UE is unable to comply with (part of) the configuration included in the MN RRC reconfiguration message, it performs the reconfiguration failure procedure.

6. Upon successful completion of the reconfiguration, the success of the procedure is indicated in the SN Modification Confirm message including the SN RRC response message, if received from the UE.

| | |
|---|---|
| 7. | If instructed, the UE performs synchronisation towards the PSCell configured by the SN as described in SN Addition procedure. Otherwise, the UE may perform UL transmission directly after having applied the new configuration. |
| 8. | If PDCP termination point is changed for bearers using RLC AM, and when RRC full configuration is not used, the SN Status Transfer takes place between the MN and the SN (FIG. 11 depicts the case where a bearer context is transferred from the SN to the MN). |
| 9. | If applicable, data forwarding between MN and the SN takes place (FIG. 10.3.2-2 depicts the case where a user plane resource configuration related context is transferred from the SN to the MN). |
| 10. | The SN sends the Secondary RAT Data Usage Report message to the MN and includes the data volumes delivered to and received from the UE as described in clause 10.11.2. |
| NOTE 4: | The order the SN sends the Secondary RAT Data Usage Report message and performs data forwarding with MN is not defined. The SN may send the report when the transmission of the related QoS flow is stopped. |
| 11. | If applicable, a PDU Session path update procedure is performed. |
| | < ---------------end current 3GPP RAN2 Rel-16 spec text 37.340 f80-----------------> |

Discontinuous Reception (DRX)

UE battery life is vital in a cellular networks. Also power consumption of network equipment becomes more and more relevant to address. There are multiple mechanisms which reduce the UE and also network power consumption. Methods for UE power saving include Discontinuous Reception (DRX), UE suspend, radio resource management (RRM) measurements relaxation, cross-slot scheduling and UE assistance information.

Discontinuous Reception (DRX) methods denote a category of UE power saving methods that allow the UE to turn off its receiver for battery preservation purposes. DRX is an important function in order to increase the performance and standby times of small handsets.

NR and LTE support efficient DRX in RRC_CONNECTED (in addition to RRC_IDLE and RRC_INACTIVE). Depending on UE and the UE activity, the UE can successively go down into deeper sleep modes. TS 36/38.321 and 36/38.300 illustrate what is known as a DRX cycle as follows, where the time between two "On Duration"s offers an opportunity for the UE to turn off its receiver and thus may stop monitoring the PDCCH:

FIG. 12 shows a DRX Cycle,

In other words, the DRX functionality controls the UE's PDCCH monitoring activity. When DRX is configured by the network, the UE may enter DRX operation upon the fulfillment of certain conditions (e.g. on the expiration of an inactivity timer). After entering DRX operation it does not have to continuously monitor PDCCH and instead the PDCCH monitoring is performed according to the DRX configuration characterized with a number of parameters described further below. When the UE is in non-DRX operation it, on the other hand, has to monitor the PDCCH continuously. The UE may transit from DRX operation to non-DRX operation based on an event, e.g. when it needs to transmit or receive data, when DRX is de-configured by the network or even based on UE implementation (since DRX is optional to use by the UE when DRX is configured).

The DRX configuration is characterized by the following parameters which are configurable by the network using RRC signalling:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity (see FIG. 12);

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

The NR and LTE specifications currently support two configurable DRX periods: a shortDRX-Cycle and a longDRX-Cycle, c.f. TS 36.321 and TS 38.321. The network controls the DRX operation in MAC using a number of configurable parameters sent by RRC signalling messages. The network may also trigger when the MAC entity for a certain cell group UE enters DRX by transmitting a DRX Command MAC Control Element (CE), or a Long DRX Command MAC CE to the UE on the DL-SCH transport channel in a cell of the corresponding cell group, as specified in 3GPP TS 36.321 and TS 38.321. Transition from short DRX to long DRX is controlled by a timer in the UE as well as by the network by transmitting a Long DRX Command MAC CE to the UE. During data inactivity, the DRX cycle may then be stepwise increased, thereby improving the battery preservation.

The range of the configurable DRX cycles in RRC_CONNECTED is comparable to the range of Paging cycles used in RRC_IDLE and RRC_CONNECTED. Thus, it is possible to configure very efficient DRX also in RRC_CONNECTED, such that a stationary UE in RRC_CONNECTED can have the same standby times as a UE in RRC_IDLE.

Whenever a UE is configured with only one serving cell (i.e. PCell) Rel-8/9 DRX applies. In the case of CA (i.e. PCell and one or more SCells), the same DRX operation applies to all configured and activated serving cells (i.e. identical active time for PDCCH monitoring).

In DC, separate DRX configurations can be applied to MCG and SCG, and the cell group (CG) specific DRX operation applies to all configured and activated serving cells in the same CG (i.e. identical active time for PDCCH monitoring).

In Rel-16, DRX enhancements are introduced for FR1/FR2 SCell operation. FR2 SCells can be configured in a secondary DRX group, with a separate shorter inactivity- Timer and OnDurationTimer, see figure below. This reduces the PDCCH monitoring in FR2, which is the main power consuming activity.

FIG. 13 shows Secondary DRX group operation in Rel-16

SS/PBCH block measurement timing configuration (SMTC)

In RRC_CONNECTED, the UE can be configured by the network to perform RRM measurements. As part of its measurement configuration, the UE receives a measurement window SMTC configuration for a given SSB frequency.

On the indicated ssbFrequency, the UE shall not consider SS/PBCH block transmission in subframes outside the SMTC occasion for RRM measurements based on SS/PBCH blocks and for RRM measurements based on CSI-RS except for SFN and frame timing difference (SFTD) measurement (see TS 38.133, subclause 9.3.8). SFN meaning system frame number.

The UE shall setup the first SS/PBCH block measurement timing configuration (SMTC) in accordance with the received periodicityAndOffset parameter (providing Periodicity and Offset value for the following condition) in the smtc1 configuration, according to 5.5.2.10 in TS 38.331.

SSB-MTC

The IE SSB-MTC is used to configure measurement timing configurations, i.e., timing occasions at which the UE measures SSBs.

| SSB-MTC information element |
|---|

```
--ASN1START
--TAG-SSB-MTC-START
SSB-MTC ::=                         SEQUENCE {
    periodicityAndOffset                CHOICE {
        sf5                                 INTEGER (0..4),
        sf10                                INTEGER (0..9),
        sf20                                INTEGER (0..19),
        sf40                                INTEGER (0..39),
        sf80                                INTEGER (0..79),
        sf160                               INTEGER (0..159)
    },
    duration                            ENUMERATED { sf1, sf2, sf3, sf4, sf5 }
}
SSB-MTC2 ::=                        SEQUENCE {
    pci-List                            SEQUENCE (SIZE (1..maxNrofPCIsPerSMTC)) OF
PhysCellId                          OPTIONAL,  -- Need M
    periodicity                         ENUMERATED {sf5, sf10, sf20, sf40, sf80, spare3,
spare2, spare1}
}
SSB-MTC2-LP-r16 ::=                 SEQUENCE {
    pci-List                            SEQUENCE (SIZE (1..maxNrofPCIsPerSMTC)) OF
PhysCellId                          OPTIONAL,  -- Need R
    periodicity                         ENUMERATED {sf10, sf20, sf40, sf80, sf160, spare3,
spare2, spare1}
}
SSB-MTC3-r16 ::=                    SEQUENCE {
    ssb-MTC-Periodicity-r16             ENUMERATED {ms5, ms10, ms20, ms40, ms80, ms160,
ms320, ms640, ms1280},
    ssb-MTC-Timingoffset-r16            INTEGER (0..127),
    ssb-MTC-Duration-r16                ENUMERATED {sf1, sf2, sf3, sf4, sf5},
    ssb-MTC-pci-List-r16                SEQUENCE (SIZE (0..63)) OF PhysCellId,
    ssb-ToMeasure-r16                   SetupRelease { SSB-ToMeasure }
OPTIONAL   -- Need M
}
-- TAG-SSB-MIC-STOP
-- ASN1STOP
```

| SSB-MTC field descriptions |
|---| duration
Duration of the measurement window in which to receive SS/PBCH blocks. It is given in number of subframes (see TS 38.213 [13], clause 4.1).
periodicityAndOffset
Periodicity and offset of the measurement window in which to receive SS/PBCH blocks, see 5.5.2.10.
Periodicity and offset are given in number of subframes.

| SSB-MTC2 field descriptions |
|---| pci-List
PCIs that are known to follow this SMTC.

| SSB-MTC3 field descriptions |
|---| ssb-MTC-Duration
SMTC window duration.
ssb-MTC-pci-List
List of physical cell IDs to be measured.
ssb-MTC-Periodity
SMTC window periodicity.
ssb-MTC-Timingoffset
SMTC window timing offset.

SUMMARY

In order to improve the network energy efficiency and UE battery life for UEs in MR-DC, a Rel-17 work item is planned to introduce efficient SCG/SCell activation/deactivation. This can be especially important for MR-DC configurations with NR SCG, as it has been evaluated in www.3gpp.org/ftp/tsg_ran/TSG_RAN/TSGR_84/Docs/RP-190919.zip that in some cases NR network power consumption is 3 to 4 times higher than LTE.

One alternative for reducing SCG power consumption is to configure a long DRX for the SCG, while keeping a short DRX cycle on MCG in order to improve responsiveness. Rel-15 already supports different DRX configurations for MCG and SCG. This means that not only DRX cycle, but existing DRX related configurations can be different in MCG and SCG. For instance, MCG could be configured with a longer inactivity timer and shorter DRX cycle, such that the UE enters SCG DRX more quickly compared to MCG and while in SCG DRX, the DRX cycle is longer compared to MCG.

However, one problem with long DRX is that it increases the delay involved when resuming transmission on the SCG. For UL triggered traffic, the UE can at any time exit DRX by sending scheduling request on the SCG. For DL triggered traffic, the radio network node controlling the SCG that needs to schedule that DL traffic, e.g. the SN or a distributed unit (DU) of the SN, however has no way to reach the UE before the start of next on-duration of the SCG DRX cycle, when the UE resumes PDCCH monitoring. This introduces an additional delay for DL triggered traffic that on average is half of the DRX cycle, before the SCG can be used. Depending on the DRX cycle configured for the UE for the SCG, this delay ranges between 0-640 ms for short DRX and 0-10 s for long DRX. One of the drawbacks of such long delays is that once the UE can be scheduled in the SCG after waiting this time, a large part of the DL data may have already be transmitted over the MCG, so that available resources in the SCG, i.e. in the other serving frequency, are not properly utilized, which makes the whole MR-DC scheduling inefficient.

Note that the problem of bringing the UE out of DRX can occur also in the other direction, i.e. the UE may be in DRX on the MCG, while traffic is still ongoing on the SCG. This may be the case for a configuration where traffic is offloaded to SCG, while there is no traffic on the MCG and the UE thus is in DRX on the MCG.

A similar issue may become relevant also for UE in carrier aggregation (CA). Rel-16 introduced the secondary DRX group, with a separate shorter inactivityTimer and OnDurationTimer. Possible Rel-17 enhancements of the secondary DRX group may include allowing also separate DRX cycle on the secondary DRX group, e.g. such that the second DRX cycle is an integer multiple of the primary DRX, such that on durations of the primary and secondary DRX groups overlap.

In order to address the above issues, mechanisms are going to be studied in Rel-17 as part of e.g. the MR-DC enhancements work item (ftp://ftp.3gpp.org/tsg_ran/TSG_RAN/TSGR_88 e/Docs/RP-201040.zip). Therein, one of the ideas is to standardize mechanisms enabling the UE to minimize its operation with the SCG/SN depending on traffic demands while that is still configured, e.g. via some kind of power saving scheme, but at the same time be able to quickly re-start the normal operation with the SCG, i.e., quickly be able to be scheduled in the SCG. The Rel-17 MR-DC WID describes this issue as follows:

"When UE data rate requirement changes dynamically, e.g. from high to low, SN is worth considering to be (de)activated to save network and UE energy consumption. This issue has been discussed in Release 16 eDCCA WI and has significant support. But due to time limitation, it is not completed in Release 16. Therefore an efficient SCG (de) activation mechanism should be specified in Release 17. This efficient SCG (de)activation mechanism can also be applied to other MR-DC options."

Regardless of which scheme is going to be standardized in Rel-17 MR-DC enhancements for SN "deactivation", e.g. long DRX, stored SCG that is activated on a need basis, PSCell with a dormancy like behavior similar to what was specified for SCells in rel-16, etc, the fact is that the UE may interrupt its normal operation with the SCG for some time for power savings purpose, which may lead to delays to re-start its normal operation with the SCG/SN, i.e., it may take some time until the UE is in sync with the SCG and could be scheduled at the SCG such as in a PSCell and/or SCells of the SCG. For example, depending on how long the UE interrupted its normal operation with the SCG, and/or radio conditions, and/or UE capabilities there is some delay (wake-up time) in the UE before it can start e.g. monitoring the PDCCH on the PSCell.

A first issue, for example, is that the UE may need to determine or establish DL synchronization before it can start decoding PDCCH. This is especially challenging in the case reference signals, e.g. SSBs and/or CSI-RSs, of the SCG are transmitted with long periodicity (e.g. above 20 ms), which is possibly to be considered to save network energy consumption, which is also described as part of Rel-17 scope. In other words, it may take some time even to get first reference signal samples, and to collect multiple samples before sync is obtained and the UE can monitor PDCCH and/or perform random access with the SCG, depending on the radio conditions of these signals.

Another issue is beam alignment/re-alignment, as during the time the UE was not in normal operation with the SCG, the network and the UE may have lost sync on the DL beam, e.g. TCI state and associated Quasi-Co-Location source, the UE should monitor for CORESET/PDCCH scheduling.

In addition, even if after resuming its normal operation with the SCG, where layer one (L1) measurements should be performed and reported for beam management and further L1 purposes (like link adaptation), it may still take some time until the UE is able to perform L1/CQI/CSI measurements for beam management/link adaptation/MIMO so that both UE and network are synchronized in terms of beam alignment and optimal L1 parameters, e.g. link adaptation, PMI, codebooks, etc.

Proposals are herein provided to address these aspects.

An object of embodiments herein is to provide a mechanism that improves communication in the wireless communication network.

According to an aspect the object is achieved by providing a method performed by a UE for communicating in a wireless communication network. The UE is connected to a first cell of an MSG and a second cell of an SCG. The UE receives a triggering indication to perform transition to a first operation state from a second operation state, for example from power saving mode state to a normal mode. Upon transitioning to the first operation state, the UE monitors for one or more temporary reference signals of the SCG. For example, the wireless communication network comprises a first cell and a second cell and the UE is connected to the first cell and the second cell. The UE may receive an indication to transition to a first operation state, e.g. normal operation. The UE may then use at least one temporary reference signal of a second cell group e.g. upon state transition the UE monitors for one or more temporary reference signals of the second cell.

According to another aspect the object is achieved by providing a method performed by a first radio network node for communicating in a wireless communication network, wherein the first radio network node provides radio coverage over a first cell of a MCG to which a UE is connected to. The first radio network node obtains an indication that the UE is to perform transition to a first operation state from a second operation state in a second cell of a SCG. The first radio network node transmits a triggering indication to the UE to perform transition to the first operation state and to trigger the UE to monitor for one or more temporary reference signals of the SCG.

According to yet another aspect the object is achieved by providing a method performed by a second radio network node for communicating in a wireless communication network, wherein the second radio network node provides radio coverage over a second cell of a SCG to which a UE is connected to. The second radio network node obtains an indication that the UE is to perform transition to a first operation state from a second operation state in the second cell of the SCG. The second radio network node further transmits one or more temporary reference signals of the SCG.

Thus, it is herein disclosed a method performed by a radio network node, such as a first or second radio network node, for communicating in a wireless communication network. The radio network node provides radio coverage over one or more cells out of at least a first cell and a second cell to which the UE is connected to. The radio network node obtains an indication that the UE is to transition to a first operation state, e.g. determines to operate the UE in normal operation. The radio network node then transmits at least one temporary reference signal of the second cell and/or transmits another indication, i.e. the monitoring indication, to the UE to transition to the first operation state triggering the UE to monitor for the at least one temporary reference signal.

It is furthermore provided herein a computer program product comprising instructions, which, when executed on at least one processor, cause the at least one processor to carry out any of the methods above, as performed by the first, second radio network node or the UE, respectively. It is additionally provided herein a computer-readable storage medium, having stored thereon a computer program product comprising instructions which, when executed on at least one processor, cause the at least one processor to carry out the method according to any of the methods above, as performed by the first, second radio network node or the UE, respectively.

According to still another aspect the object is achieved by providing a UE for communicating in a wireless communication network, wherein the UE is configured to be connected to a first cell of a MSG and a second cell of a SCG. The UE is further configured to receive an indication to perform transition to a first operation state from a second operation state; and to, upon transitioning to the first operation state, monitor for one or more temporary reference signals of the SCG.

According to yet still another aspect the object is achieved by providing a first radio network node for communicating in a wireless communication network, wherein the first radio network node is configured to provide radio coverage over a first cell of a MCG, to which a UE is connected to. The first radio network node is configured to obtain an indication that the UE is to perform transition to a first operation state from a second operation state in a second cell of a SCG, and to transmit a triggering indication to the UE to perform transition to the first operation state and to trigger the UE to monitor for one or more temporary reference signals of the SCG.

According to a further aspect the object is achieved by providing a second radio network node for communicating in a wireless communication network, wherein the second radio network node is configured to provide radio coverage over a second cell of a SCG to which a UE is connected to. The second radio network node is configured to obtain an indication that the UE is to perform transition to a first operation state from a second operation state in a second cell of the SCG; and to transmit one or more temporary reference signals of the SCG.

Embodiments herein relate to methods and apparatuses for one or more of the following:

- Network configuring the UE with temporary RSs to be used on transitioning the SCG from power saving mode to normal UE operation (or on SCG addition or SCG change)
- Network instructing the UE to transition in the SCG from power saving mode (or network adding the SCG or changing the SCG)
- Network transmitting the temporary RSs on the SCG for a given duration
- UE performing and reporting measurements based on the temporary RS configuration upon transitioning the SCG into normal mode operation Embodiments herein provide a faster way of getting a cell group that has been operating in a power saving mode to start operating in the first operation mode, such as a normal mode wherein the UE is fully operational and the UE can be scheduled in the UL/DL on that cell group, by providing a burst of temporary reference signals that enables the UE to obtain synchronization with a cell of that cell group, e.g. special cell (SpCell) of the SCG, and/or perform measurements (e.g. beam measurements) to speed up various procedures depending on these measurements such as random access, SSB/CSI-RS/beam reporting for TCI state activation/switching, PMI/RI/CQI/CSI for MIMO and link adaptation, etc.

Another advantage/difference compared to existing mechanisms for temporary RS for faster SCell activation (e.g. temporary CSI-RS configuration for faster CQI reporting during the activation of an SCell) is that SCells are assumed to be synchronized with the SpCell (e.g. if the UE is in sync with the PCell, the MCG SCells are also assumed to be in sync; if the UE is in synch with the PSCell, the SCG SCells are also assumed to be in sync). However, in the scenario where the UE is operating in MR-DC and the SCG is in a power saving mode of operation, the UE may not be performing radio link monitoring on the SCG and thus not be able to maintain sync with the PSCell, so just using a temporary CSI-RS may not be sufficient to regain the sync quickly with the PSCell when the SCG returns to normal operation.

In addition to it, many procedures for a single cell group can be performed based on cross-carrier reporting, while it is not possible to perform cross-cell-group mL1 measurement reporting for L1 operation such as beam management, etc.

Embodiments herein provide solution for activating SCG communication fast and hence improve communication in the wireless communication network.

BRIEF DESCRIPTION OF DRAWINGS

Embodiments will now be described in more detail in relation to the enclosed drawings, in which:

FIGS. 24-27 are flowcharts illustrating methods implemented in a communication system including a host computer, a base station and a user equipment.

DETAILED DESCRIPTION

Embodiments herein are described in the context of 5G/NR and LTE but the same concept can also be applied to other wireless communication system such as 4G/LTE and UMTS. Embodiments herein may be described within the context of 3GPP NR radio technology, e.g. using gNB as the radio network node. It is understood, that the problems and solutions described herein are equally applicable to wireless access networks and user equipments (UE) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
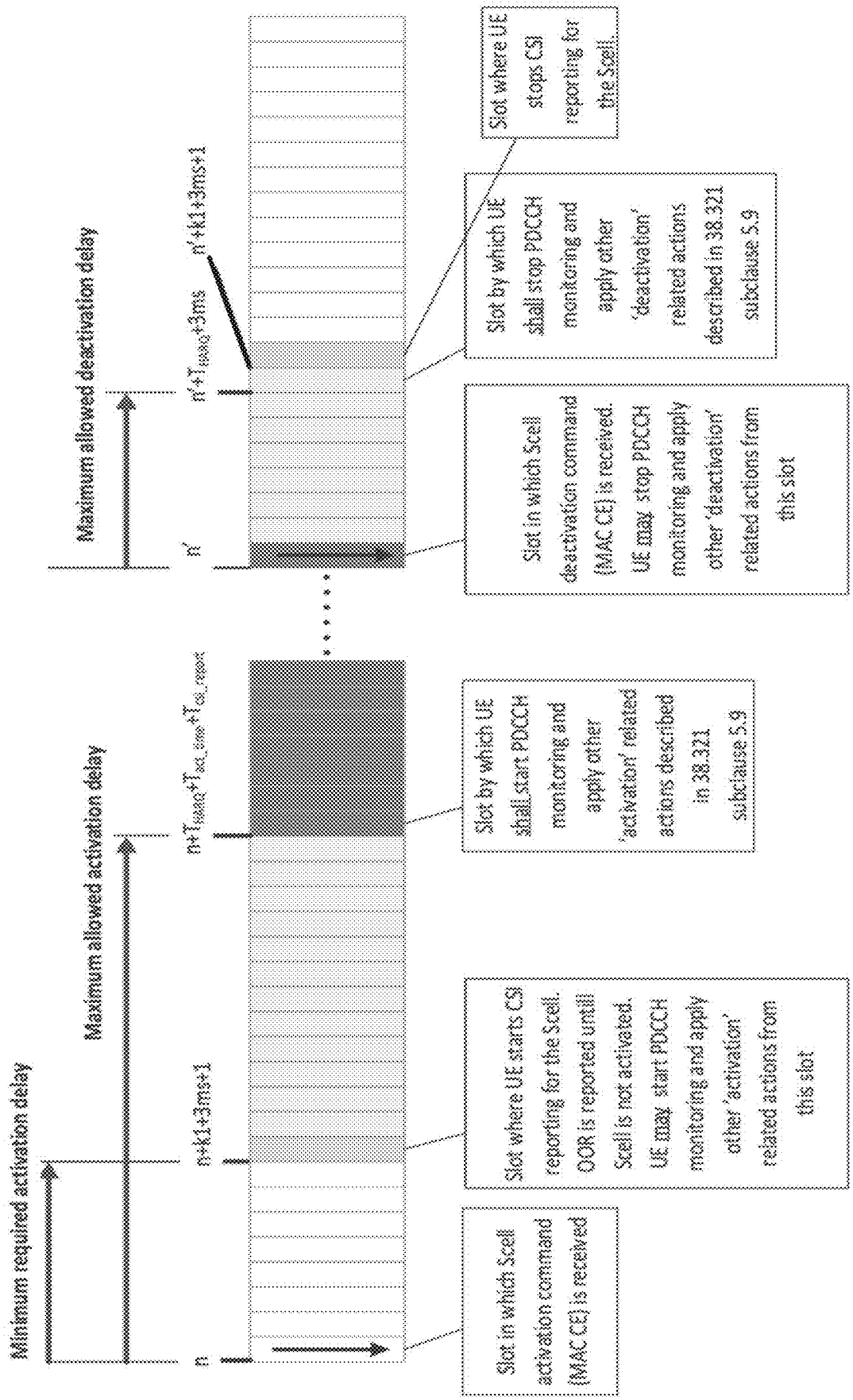
FIG. 1 shows an illustration of activation/deactivation of SCells according to prior art.
Figure 2:
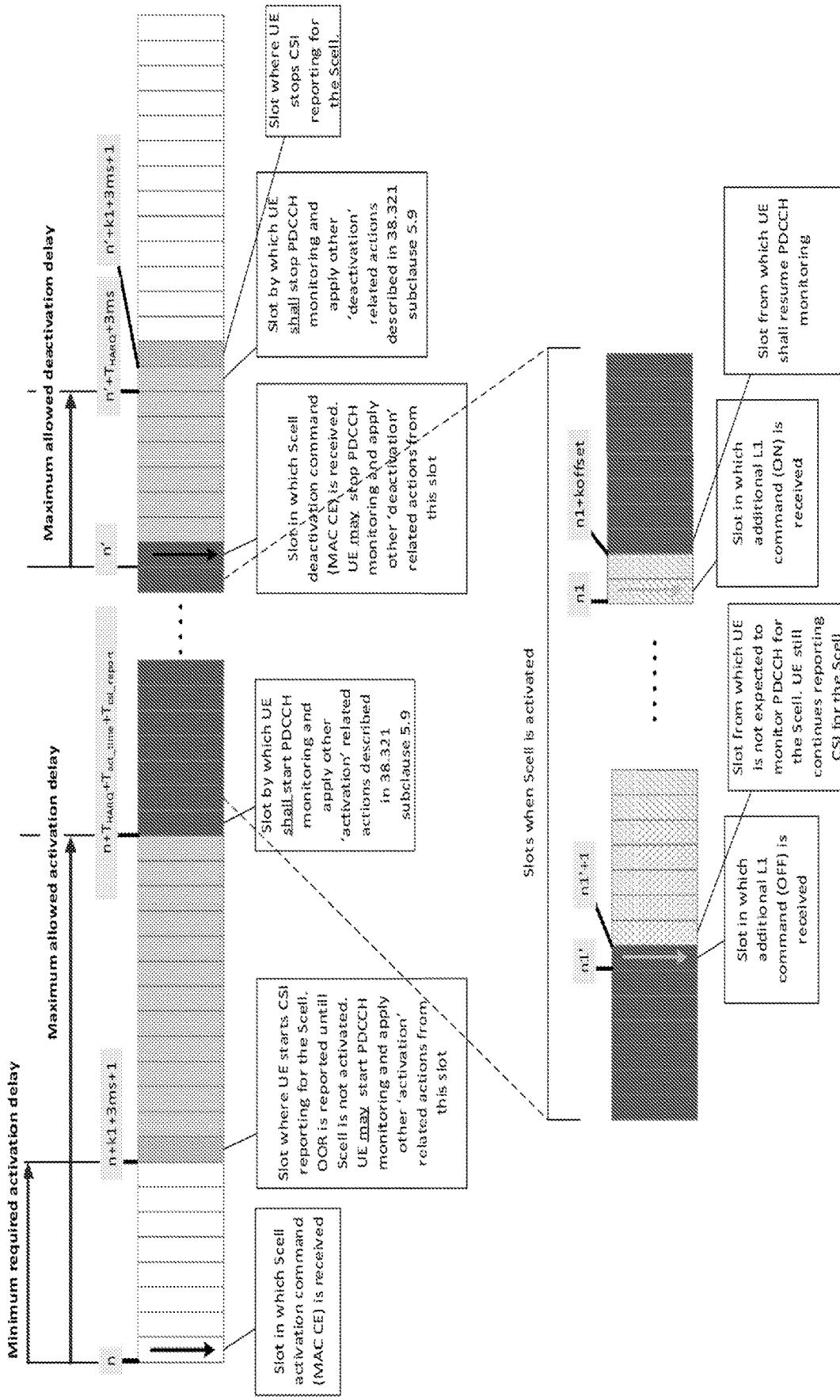
FIG. 2 shows an illustration of dormant state SCells in LTE according to prior art.
Figure 3:
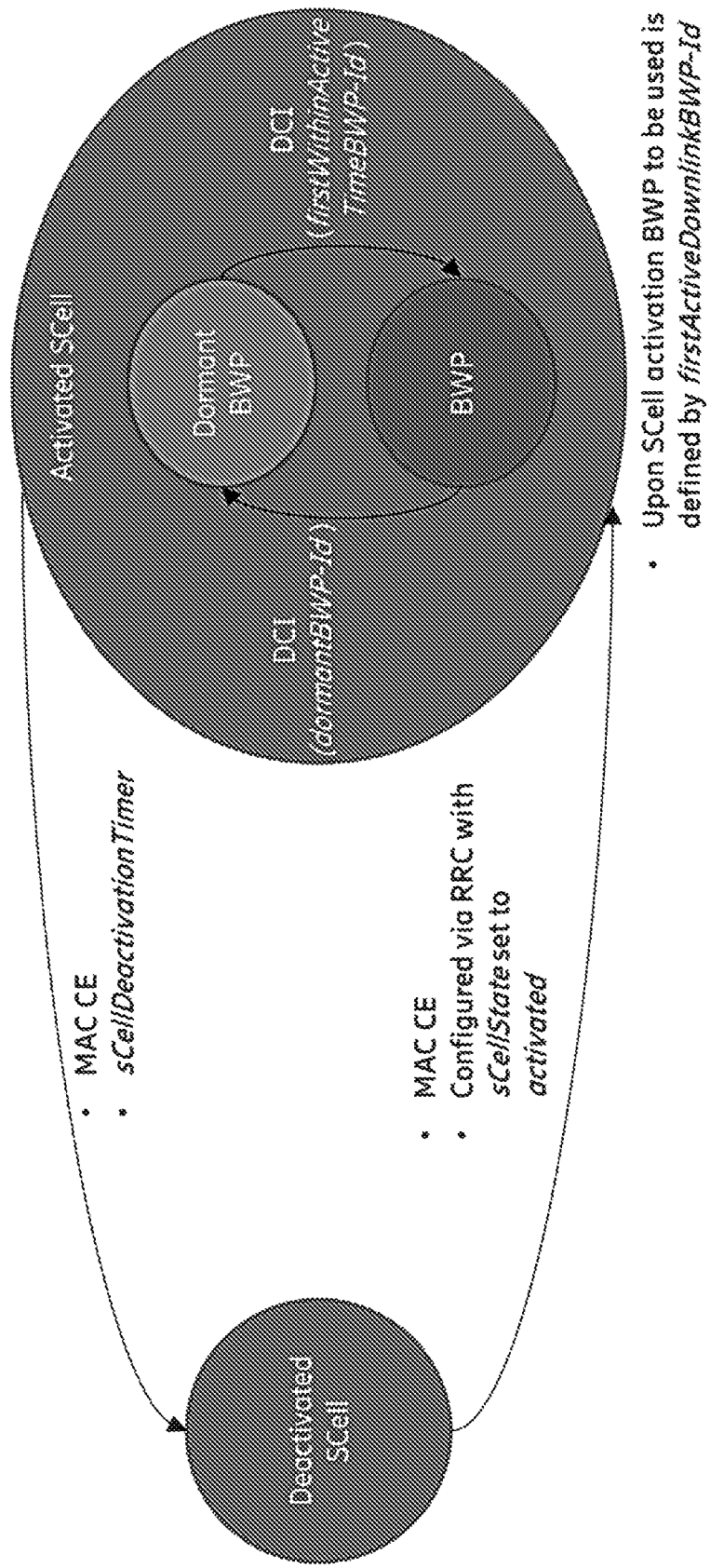
FIG. 3 shows an illustration of dormancy like behavior for SCells in NR according to prior art.
Figure 4:
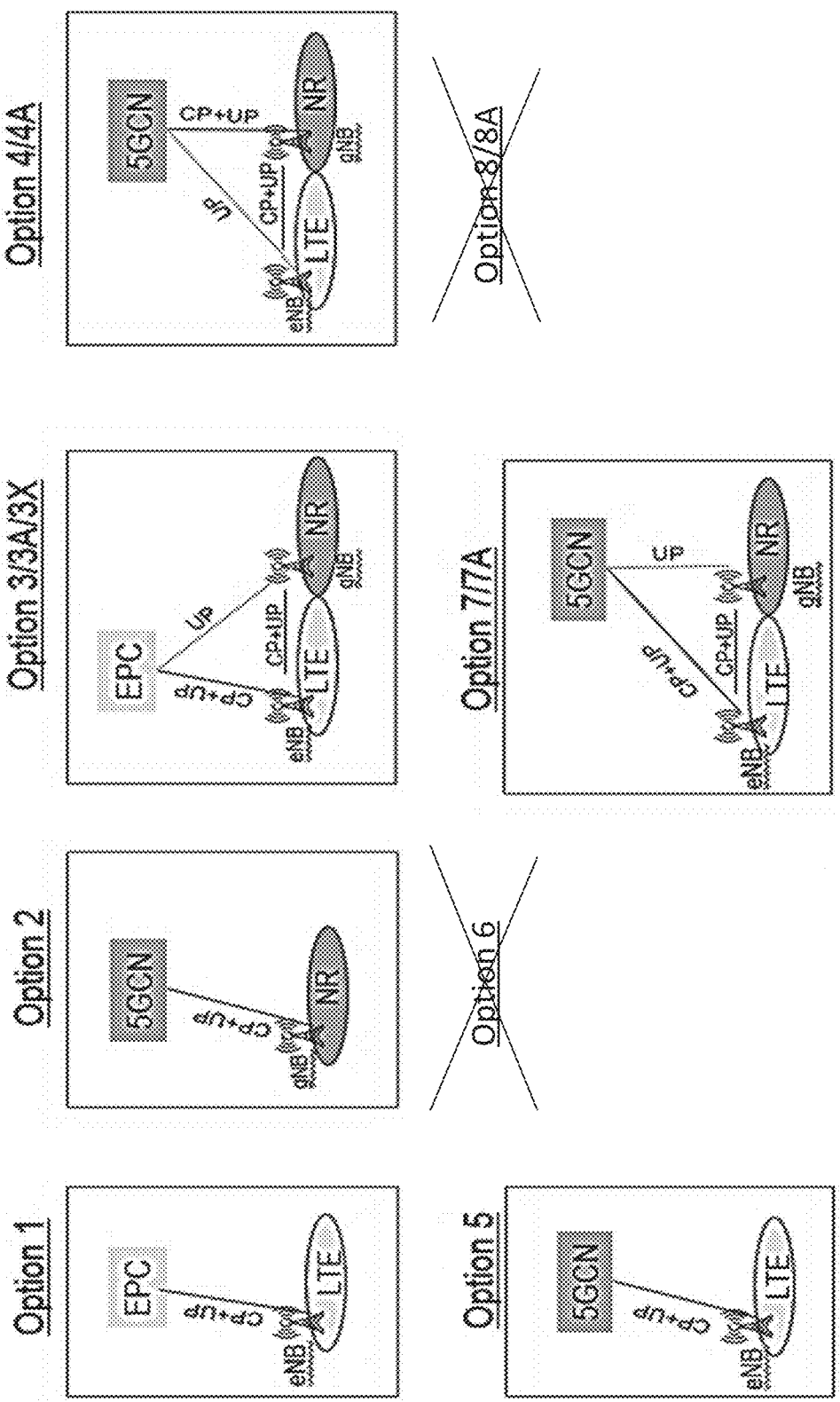
FIG. 4 shows LTE and NR interworking options according to prior art.
Figure 5:
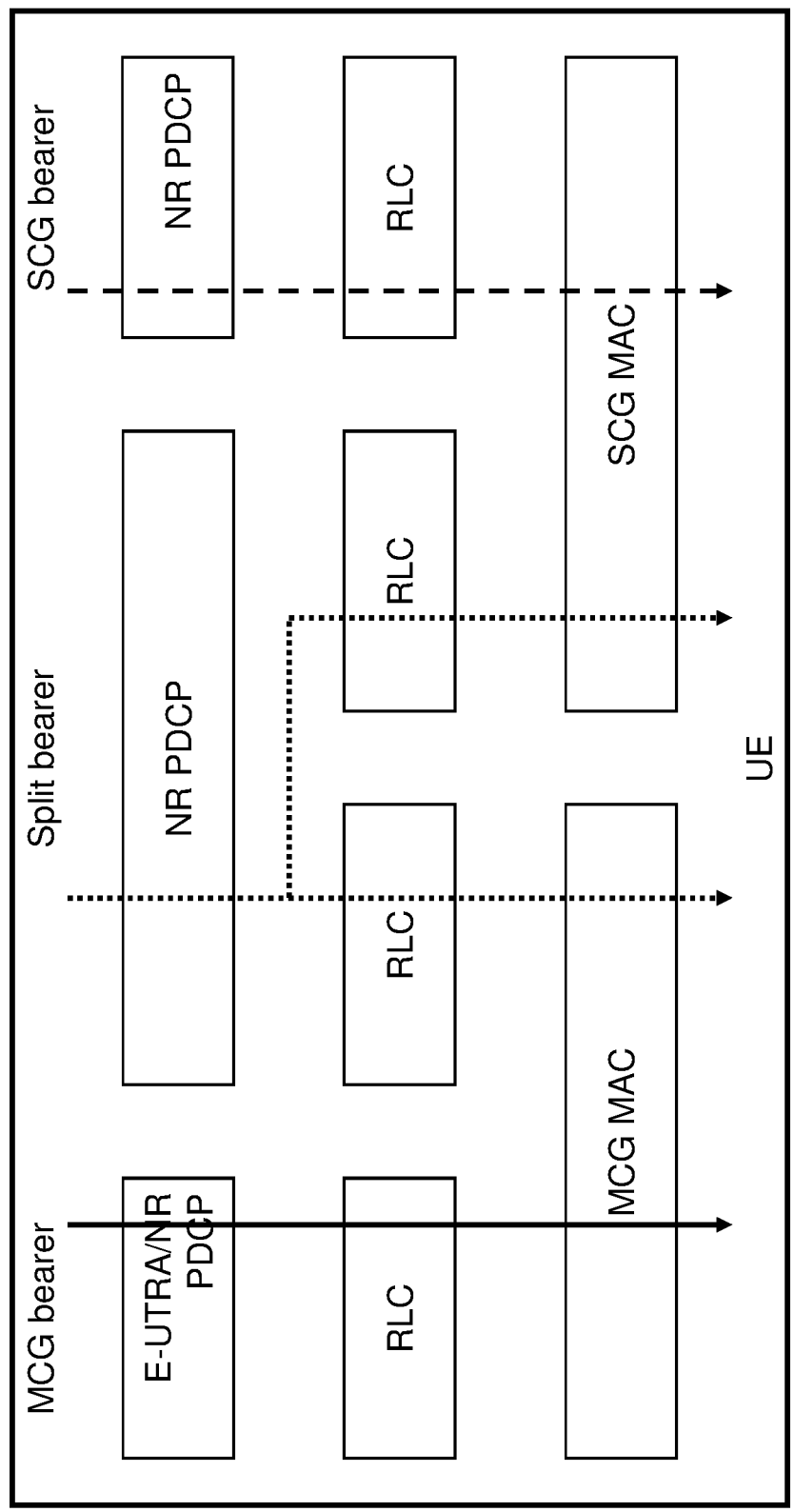
FIG. 5 shows Radio Bearer types in MR-DC according to prior art.
Figure 6:
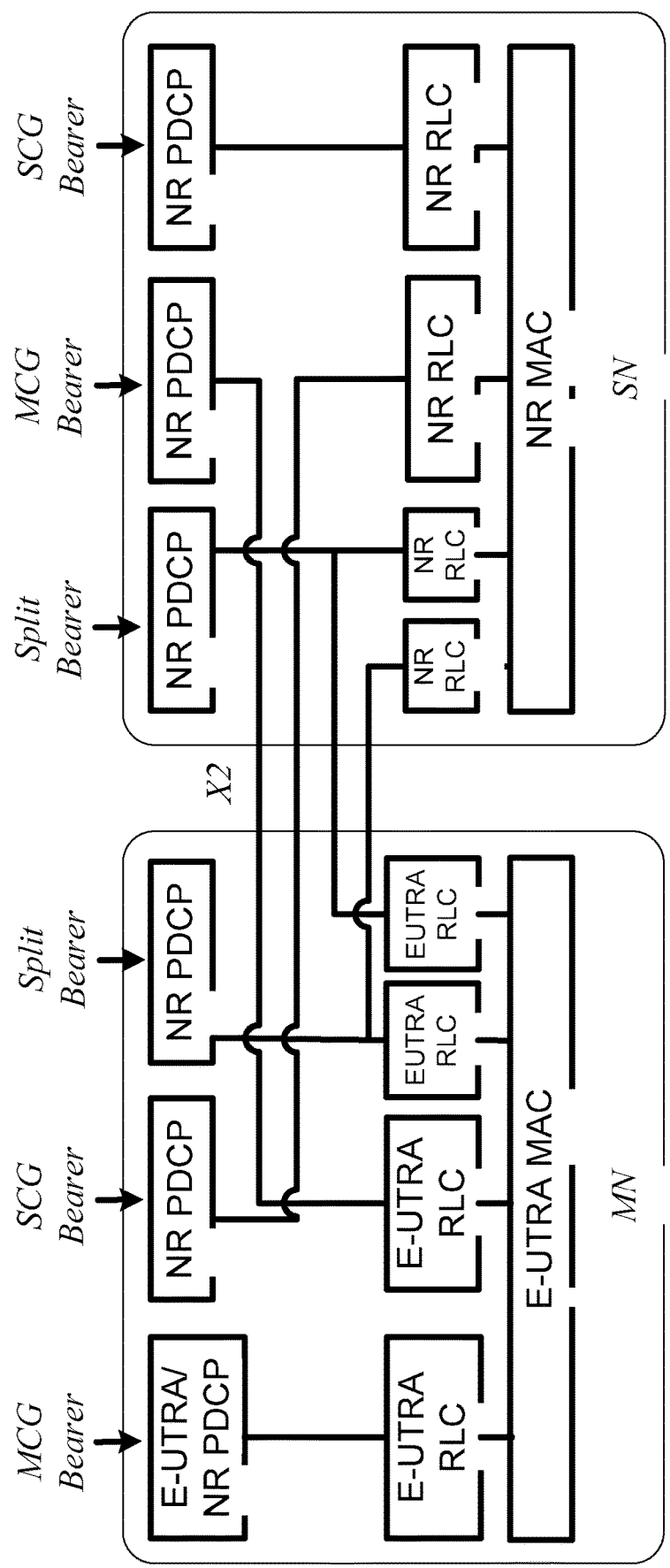
FIG. 6 shows network side radio protocol termination options for MCG, SCG and split bearers in the MN and SN for MR-DC with EPC (EN-DC) according to prior art.
Figure 7:
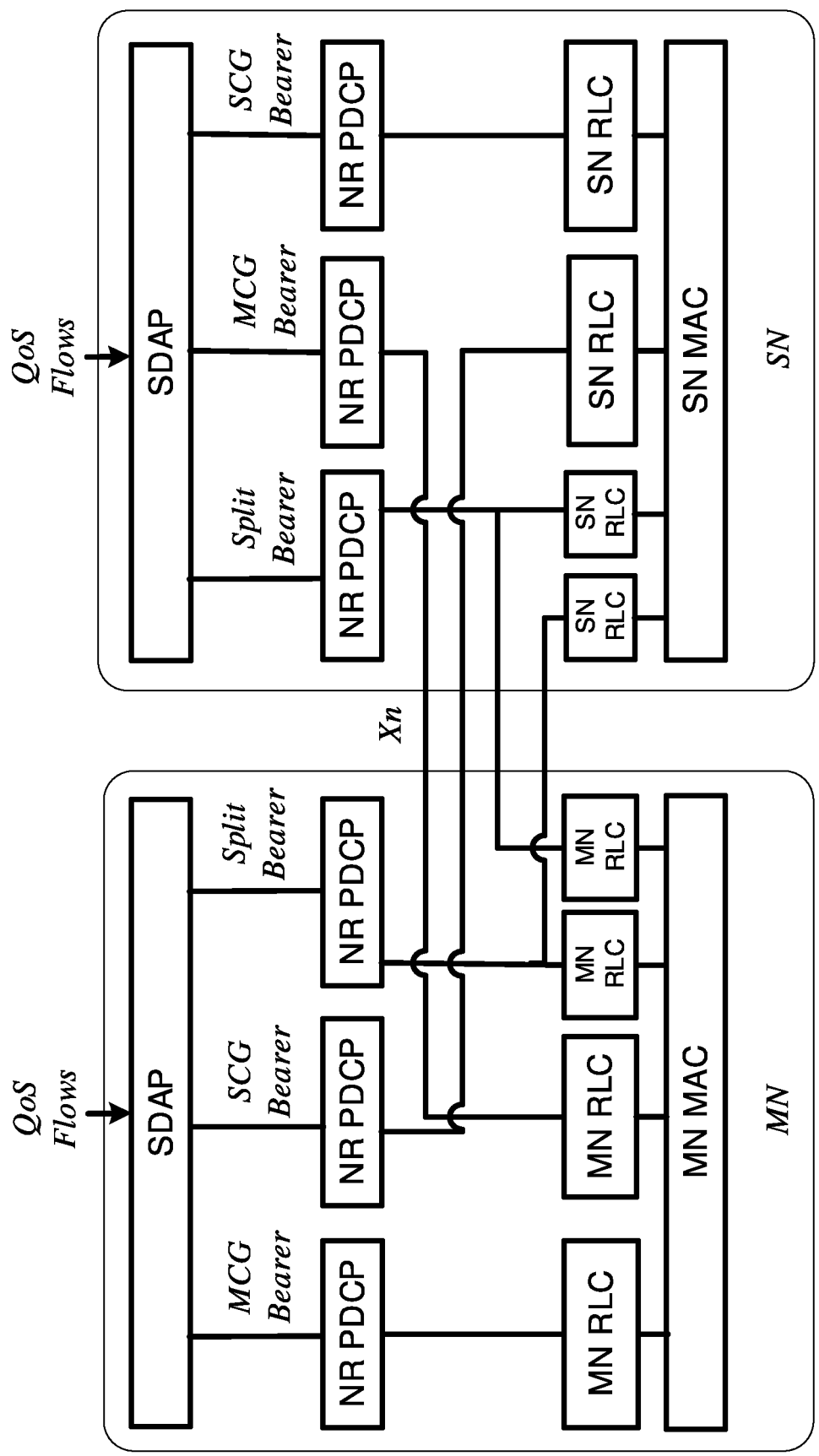
FIG. 7 shows network side radio protocol termination options for MCG, SCG and split bearers in the MN and SN for MR-DC with 5GC according to prior art.
Figure 8:
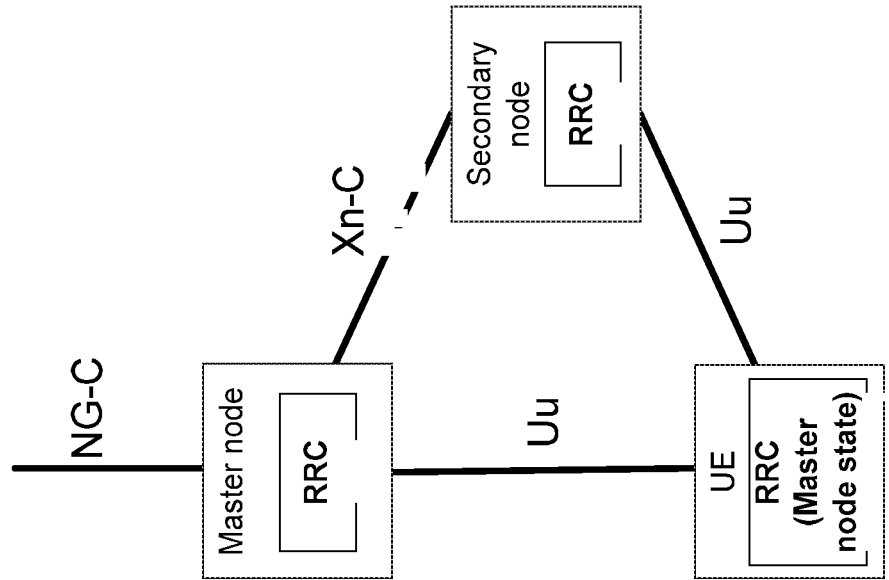
FIG. 8 shows a Control plane architecture for EN-DC (left) and MR-DC with 5GC (right) according to prior art.
Figure 8:
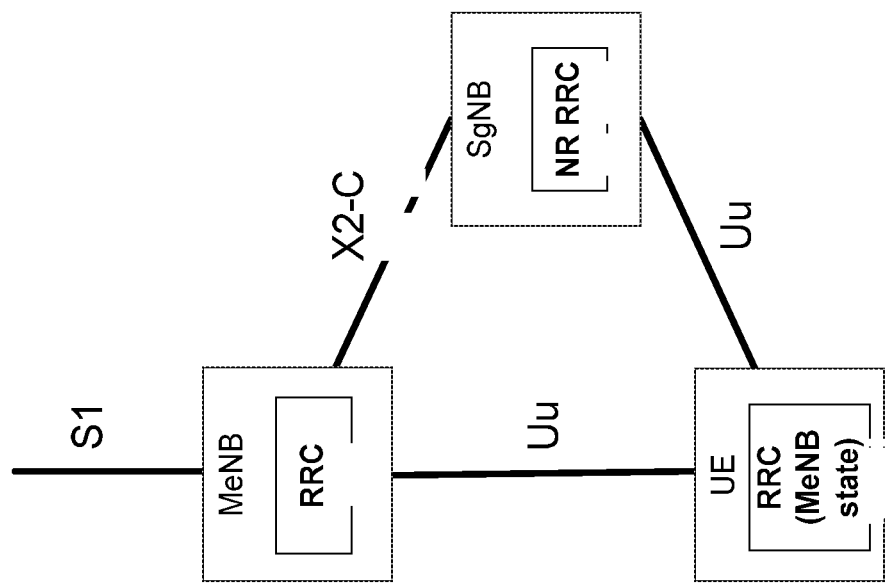
Figure 9:
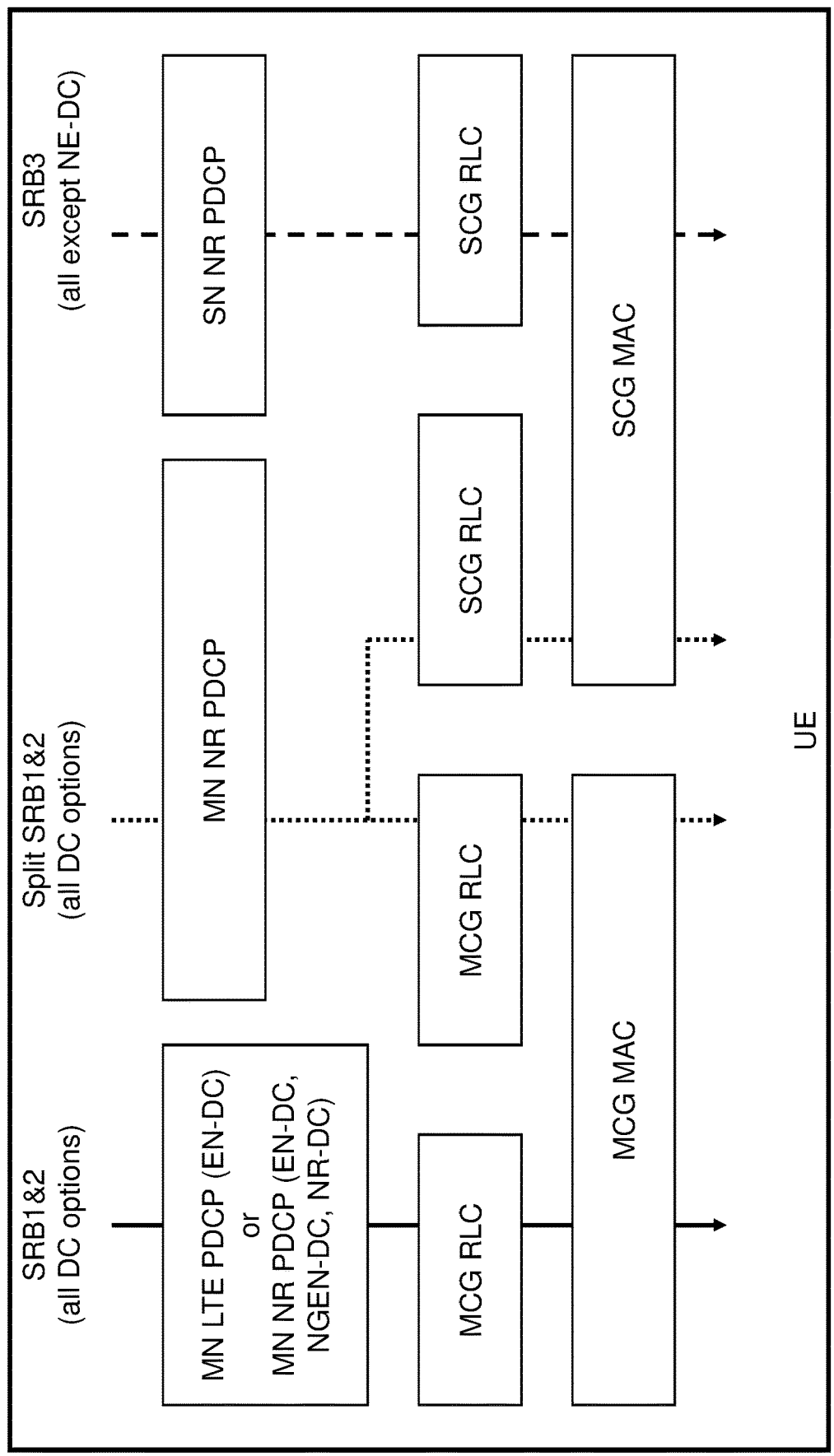
FIG. 9 shows Network side protocol termination options for SRBs in MR-DC according to prior art.
Figure 10:
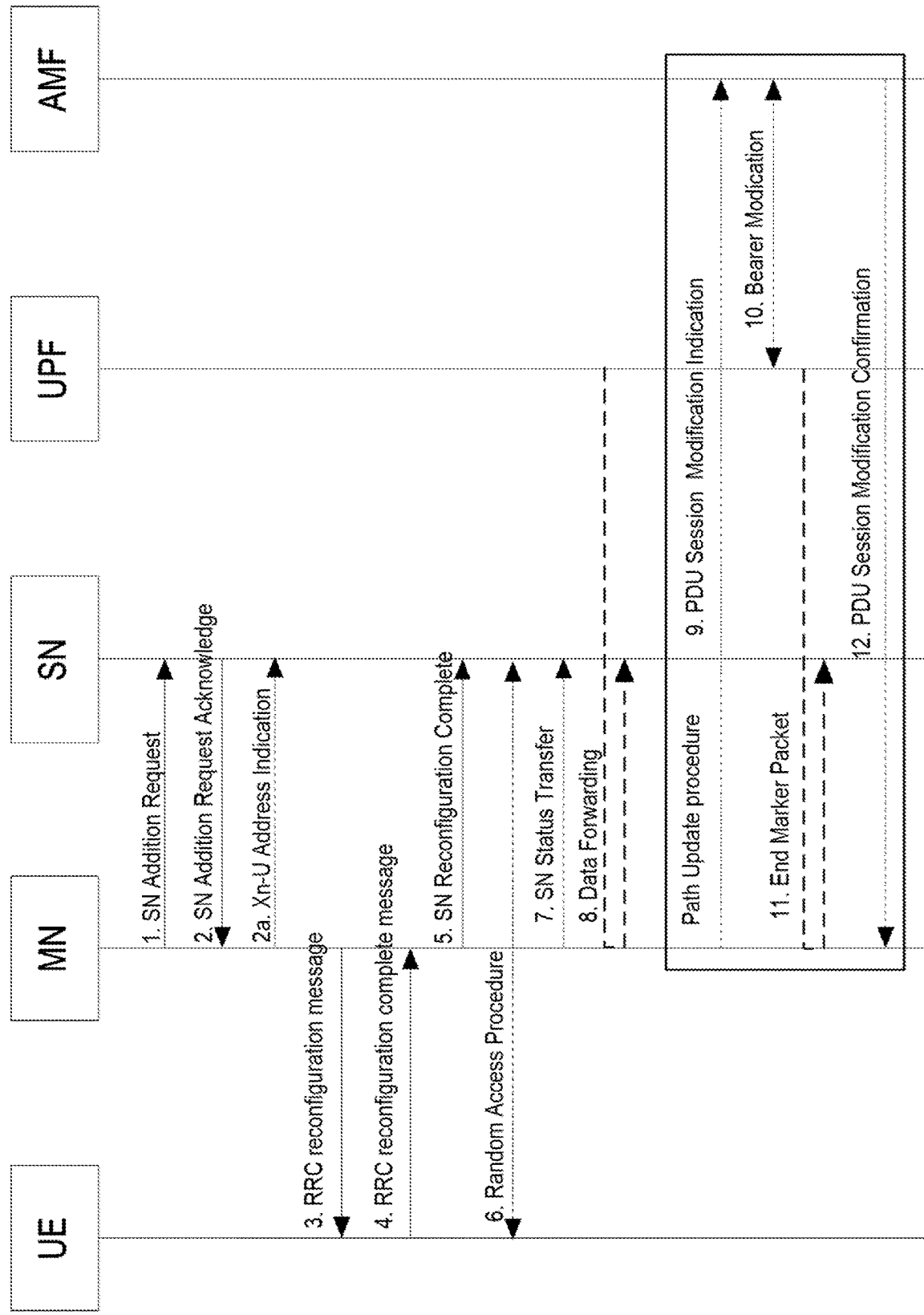
FIG. 10 shows an SN Addition procedure according to prior art.
Figure 11:
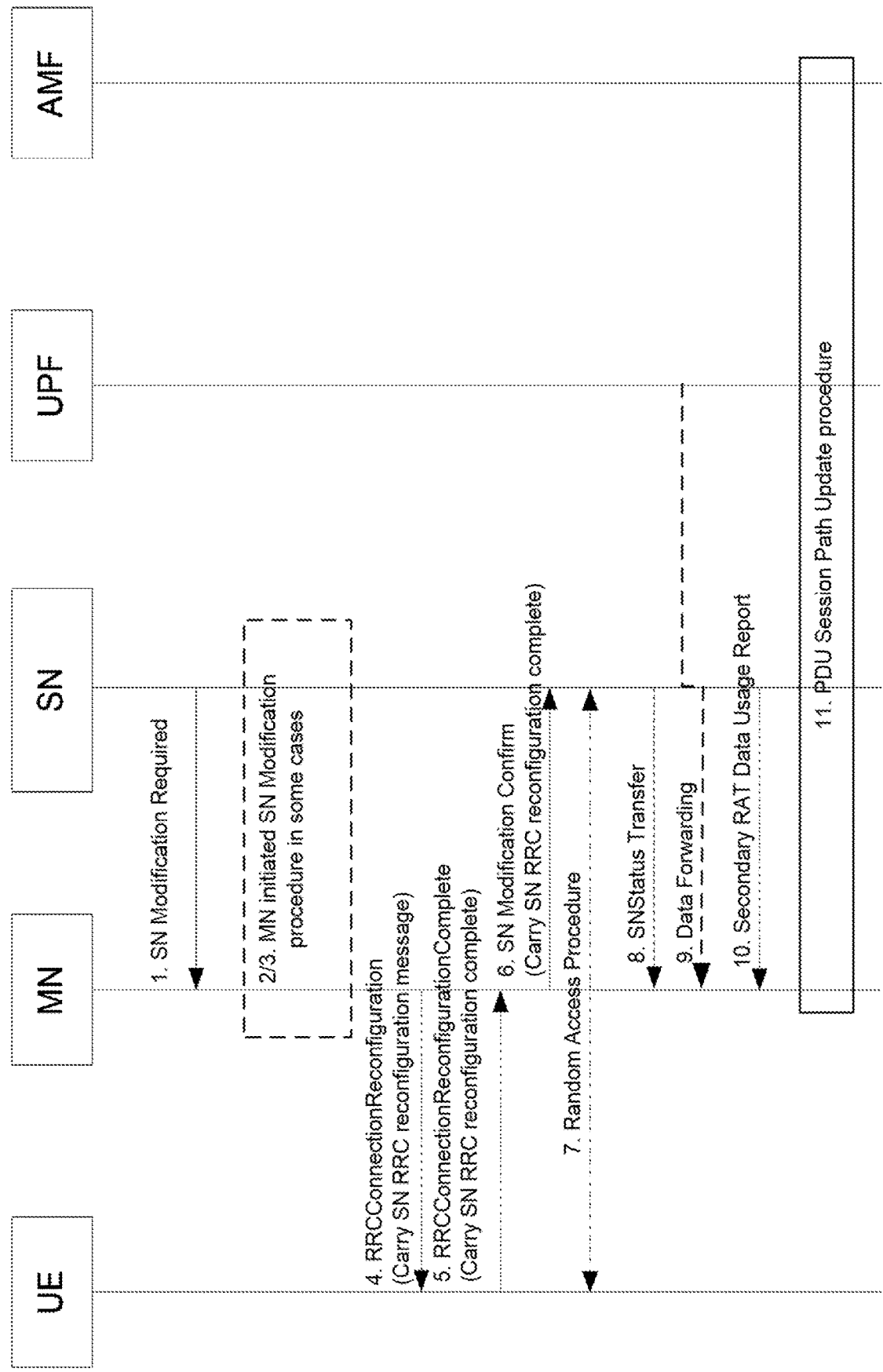
FIG. 11 shows an SN Modification procedure according to prior art.
Figure 12:
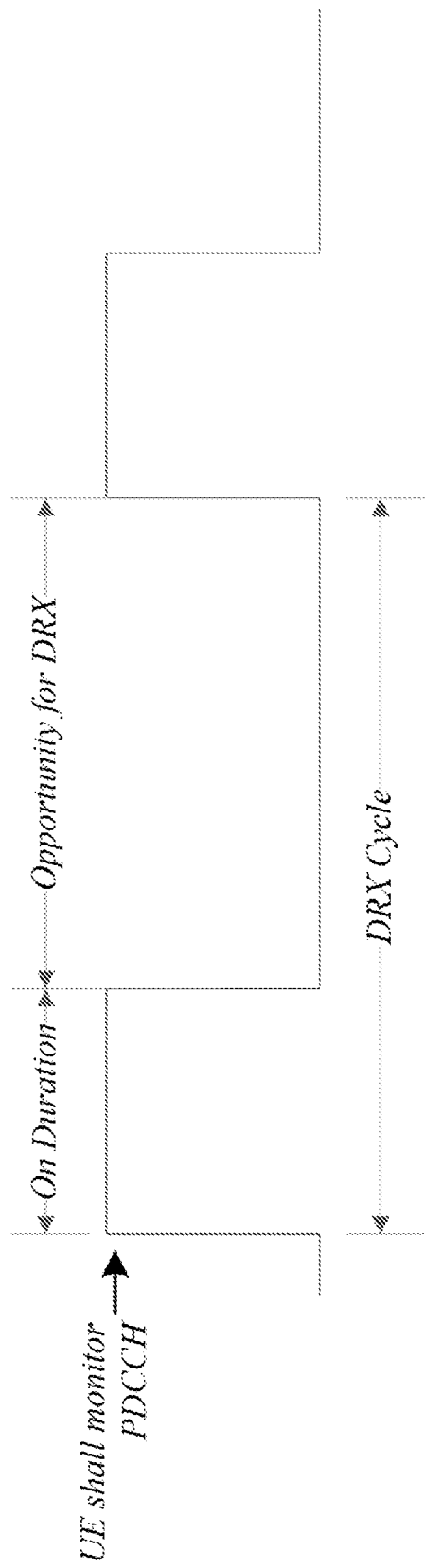
FIG. 12 shows a DRX cycle according to prior art.
Figure 13:
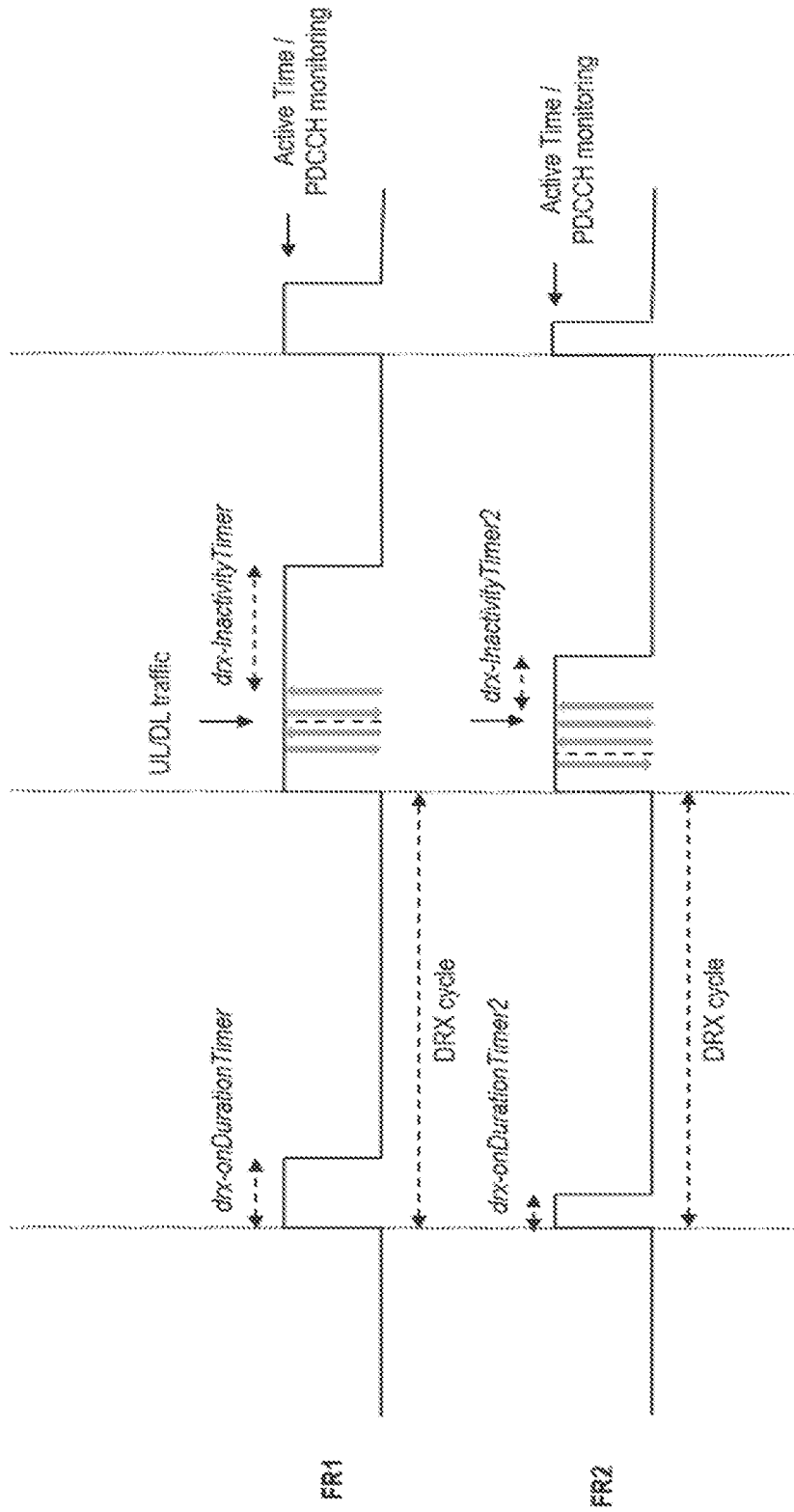
FIG. 13 shows a Secondary DRX group operation in Rel-16 according to prior art.
Figure 14:
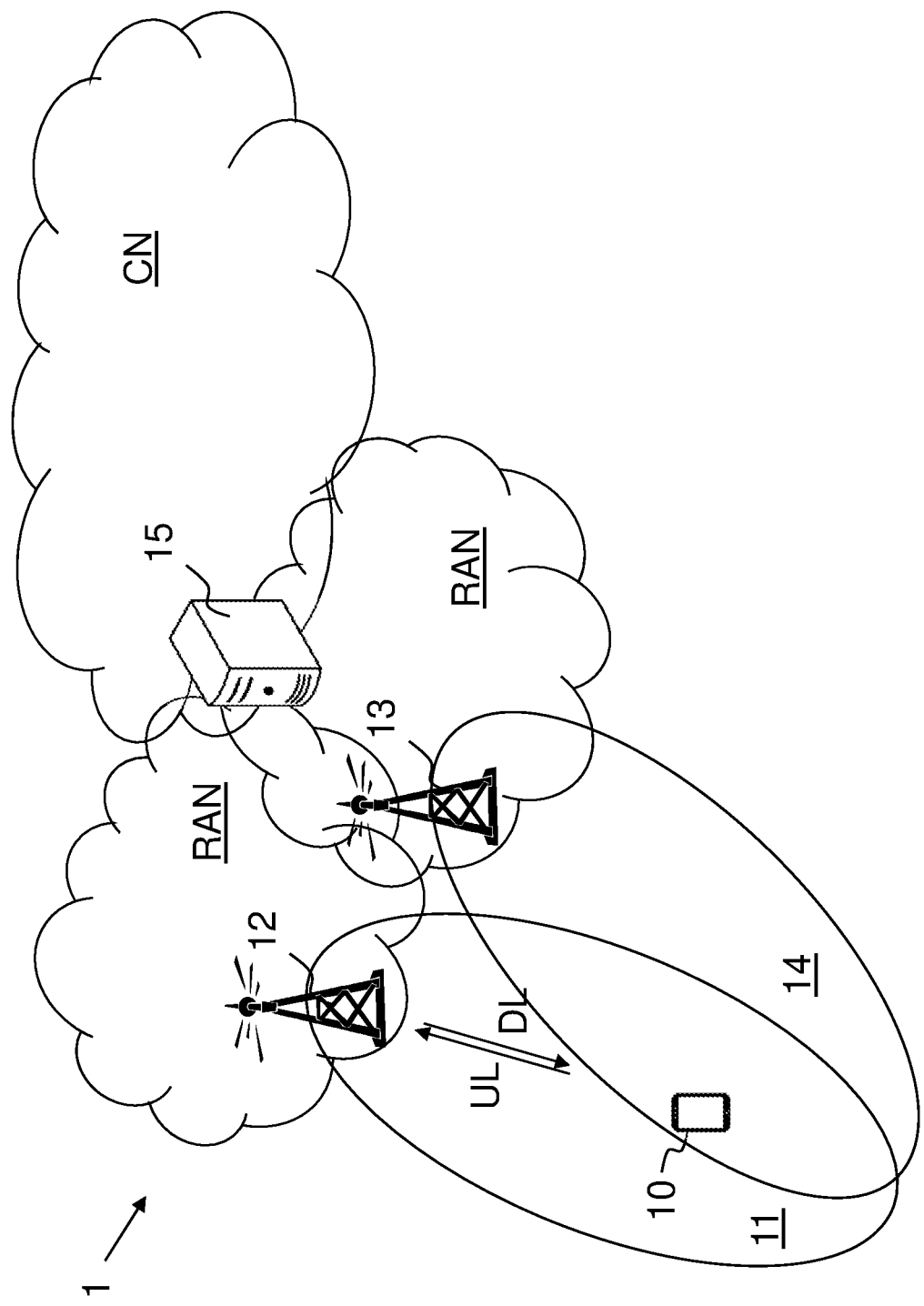
FIG. 14 shows a schematic overview depicting a wireless communication network according to embodiments herein.

Embodiments herein relate to wireless communication networks in general. FIG. 14 is a schematic overview depicting a wireless communication network 1. The wireless communication network 1 comprises e.g. one or more RANs and one or more CNs. The wireless communication network 1 may use one or a number of different technologies, such as Wi-Fi, Long Term Evolution (LTE), LTE-Advanced, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in 5G systems in combination with LTE, however, embodiments are also applicable in further development of the existing communication systems such as e.g. a WCDMA/LTE system.

In the wireless communication network 1, wireless devices e.g. a UE 10 such as a mobile station, a non-access point (non-AP) station (STA), a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing e.g. radio coverage over a geographical area, a first service area 11 i.e. a first cell, of a first radio access technology (RAT), such as NR, LTE, WiMAX or similar. The first radio network node 12 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The first radio network node 12 may alternatively or additionally be a controller node or a packet processing node or similar. The first radio network node 12 may be referred to as source access node or a serving network node wherein the first service area 11 may be referred to as a serving cell, source cell or primary cell, and the first radio network node communicates with the UE 10 in form of DL transmissions to the UE 10 and UL transmissions from the UE 10. The first radio network node may be a distributed node comprising a baseband unit and one or more remote radio units. The first radio network node provides radio coverage over a first cell of a MCG, thus being a master node (MN).

The wireless communication network 1 further comprises a second radio network node 13 providing e.g. radio coverage over a geographical area, a second service area 14 i.e. a second cell, of a second radio access technology (RAT), such as NR, LTE, WiMAX or similar. The second radio network node 13 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The second radio network node 13 may alternatively or additionally be a controller node or a packet processing node or similar. The second radio network node 13 may be referred to as a second access node or a secondary network node wherein the second service area 14 may be referred to as a primary secondary cell or secondary cell, and the second radio network node 13 communicates with the UE 10 in form of DL transmissions to the UE 10 and UL transmissions from the UE 10. The second radio network node may be a distributed node comprising a baseband unit and one or more remote radio units. The first RAT may be the same or different than the second RAT. The second radio network node provides radio coverage over a second cell of a SCG, thus being a secondary node (SN).

It should be noted that a service area may be denoted as cell, beam, beam group or similar to define an area of radio coverage. It should further be noted that the first and second cell may be provided by a same radio network node.

In order to reduce the delay incurred in transitioning the UE's SCG operation (e.g. behavior regarding measurements, monitoring of channels, etc.) from a second operation state, such as a power saving mode of operation, to a first operation state such as a normal operation, and enable the UE 10 to be quickly scheduled in a cell of the SCG (e.g. SpCell of the SCG, SCell of the SCG), embodiments herein propose the UE 10 to use temporary reference signals of an SCG, upon the transition, for various operations such as obtaining synchronization, CSI/PMI/CQI/beam reporting, etc. In the second operation state such as the power saving mode of operation of the SCG, the UE 10 may perform a limited number of procedures or no procedures at all with the SCG, e.g. long DRX, where the UE 10 performs PDCCH monitoring only in the on Duration of the DRX cycle; stored SCG where the UE 10 may have the SCG configuration stored but not applied and operates as if it would have been in single connectivity; PSCell with a dormancy like behavior where only a limited number of procedures such as CQI reporting on the PSCell are performed, etc.

Returning (or transitioning) to the first operation state e.g. normal operation with the SCG could correspond to the UE 10 being able again to be scheduled in the UL/DL with any cell of the SCG, i.e., monitoring PDCCH. In that sense, returning from the power saving mode of operation to normal operation could correspond to e.g. stopping a long DRX operation on the SCG, activating a deactivated SCG, resuming a suspended SCG, applying a stored SCG configuration and start operating in DC, etc.

Transitions to/from different modes of operation (e.g. normal and power saving) may be done by the reception of a command from the network i.e. receiving the triggering indication. In one solution the UE 10 receives the triggering indication to transition the SCG from normal operation to power saving mode from the MN or the SN. The UE 10 then receives the triggering indication such as a command to transition the SCG from power saving mode to normal operation only from the MN.

The temporary RS configuration i.e. where and when to monitor for the temporary RS, may be provided to the UE 10 in different ways and/or different points in time, for example:

While the SCG is operating in normal mode

When the UE 10 is instructed to put the SCG in power saving mode

When the UE 10 is instructed to bring the SCG back to normal mode

It should be noted that that for the sake of brevity we have described only the case of the SCG operating in power saving mode while the MCG operating in normal mode above. However, the reverse case is also possible where the SCG is operating in normal mode while the MCG is operating in power saving mode. It could also be the case that more than one is operating in a power saving mode.

Figure 15:
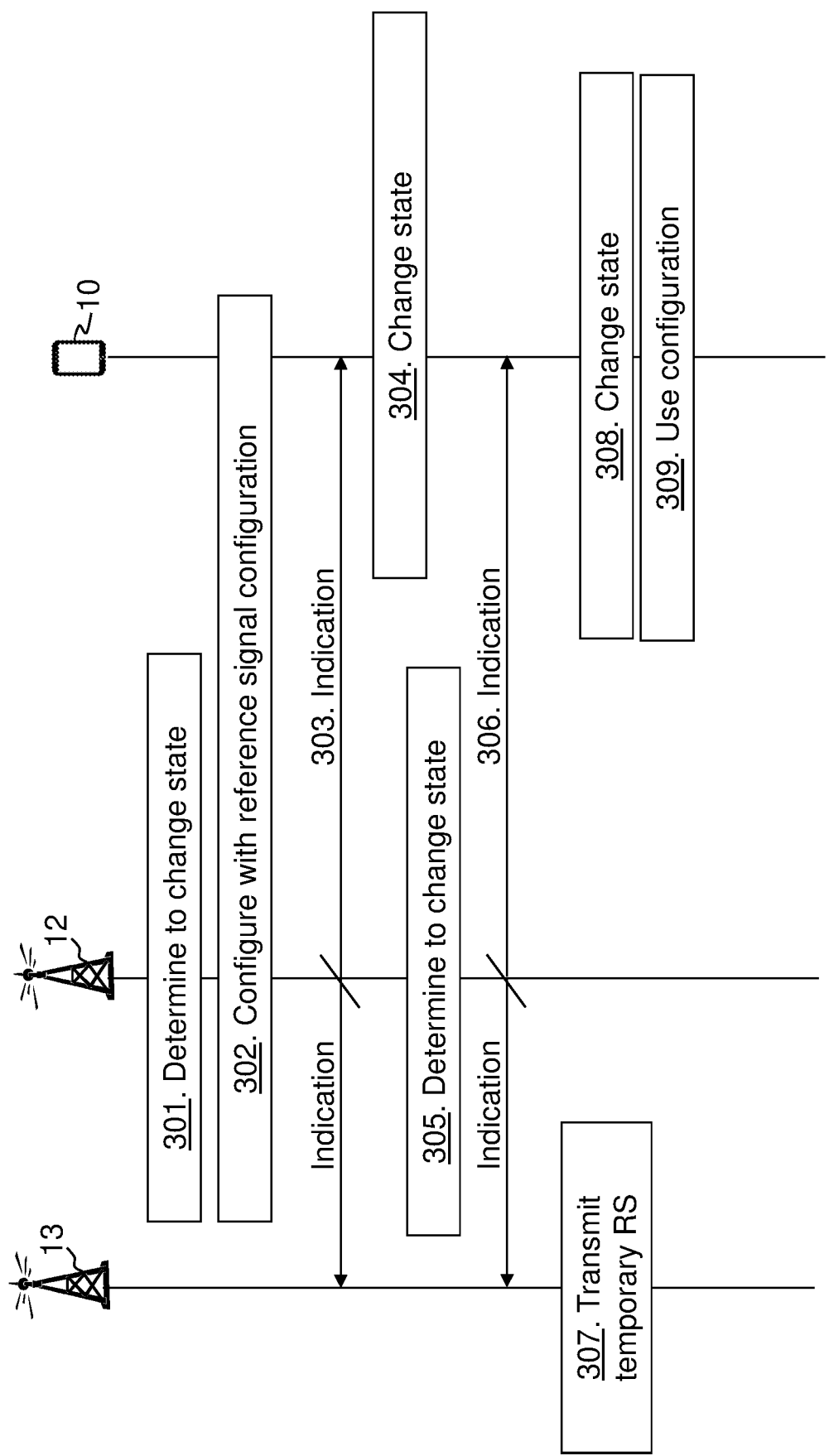
FIG. 15 shows a combined signalling scheme and flow-chart according to embodiments herein.

FIG. 15 is a combined signalling scheme and flowchart according to embodiments herein. In this example the UE 10 is connected to the first cell.

Action 301. The UE 10 is connected to the first cell of the MCG in the first operation state and the first radio network node 12 may determine to transit the UE 10 to the second operation state in the second cell of the SCG.

Action 302. The UE 10 may receive a configuration, being an example of a monitoring indication, from one of the radio network nodes indicating a configuration defining resources to monitor for temporary reference signals from e.g. the second radio network node 13 upon state transition to the first operation state.

Action 303. The radio network node such as the first radio network node 12 may indicate to the UE 10 to transition to the second operation state, and/or also indicate the same to the second radio network node 13.

Action 304. The UE 10 may then transition to the second operation state.

Action 305. The first radio network node 12 may then determine to transition the UE 10 in the second cell of the SCG to the first operation state, e.g. activate the UE 10 or wake up the UE 10.

Action 306. The radio network node such as the first radio network node 12 may indicate to the UE 10 to transition to the first operation state, and/or also to the second radio network node 13 by transmitting the triggering indication to the UE 10 and the second radio network node 13.

Action 307. The radio network node such as the second radio network node 13 then transmits temporary reference signals as configured. These temporary reference signals may be transmitted more often, e.g. more temporary reference signals within a set interval than regular reference signals in same time interval, i.e. more frequently. Thus, the second radio network node 13 may increase number of reference signals within the time interval.

Action 308. The UE 10 may transition back to the first operation state in the SCG.

Action 309. The UE 10 may then use configuration e.g. may monitor and measure on the temporary reference signals as configured for the SCG.

Transition from Normal Mode to Power Saving Mode (e.g. See Actions 302-304):

The temporary RS configuration could be provided to the UE 10 before the reception of the command to put the SCG in power saving mode, or it can be included (or sent in parallel) with the command.

MN-Triggered:

Alternative 1) The MN decides to put the SCG in power saving mode, and sends the command to the SN to start operating the SCG associated with the UE 10 in power saving mode (which may optionally include the temporary RS configuration), either before/in-parallel/after sending the command to the UE 10 to start operating the SCG in power saving mode.

(Alternative 2) The MN sends a request to the SN to start operating the SCG associated with the UE 10 in power saving mode, and once the SN has accepted that request (i.e. an Acknowledgement message received from the SN), the MN sends the command to the UE 10 so the UE 10 enters power saving mode for the SCG. The temporary RS configuration could be provided from the MN to the SN or/and contained in the ACK message that the SN sends to the MN.

SN-Triggered:

(Alternative 3) The SN makes the decision to put the SCG associated with the UE in power saving mode and informs the MN about its decision to operate the SCG associated with the UE 10 in power saving mode, either before/in-parallel/after sending the command to the UE 10 to start operating the SCG in power saving mode (the command to the UE 10 may contain the temporary RS configuration).

(Alternative 4) The SN sends a request to the MN to get the permission to start operating the SCG in power saving mode with respect to the UE, and only instruct the UE once the MN has accepted that request. The request to the MN may contain the temporary RS configuration, and MN may update the temporary RS configuration in the ACK message, and the SN may include the temporary RS configuration (or the updated one, if MN modifies it) in the command to the UE.

Figure 16A:
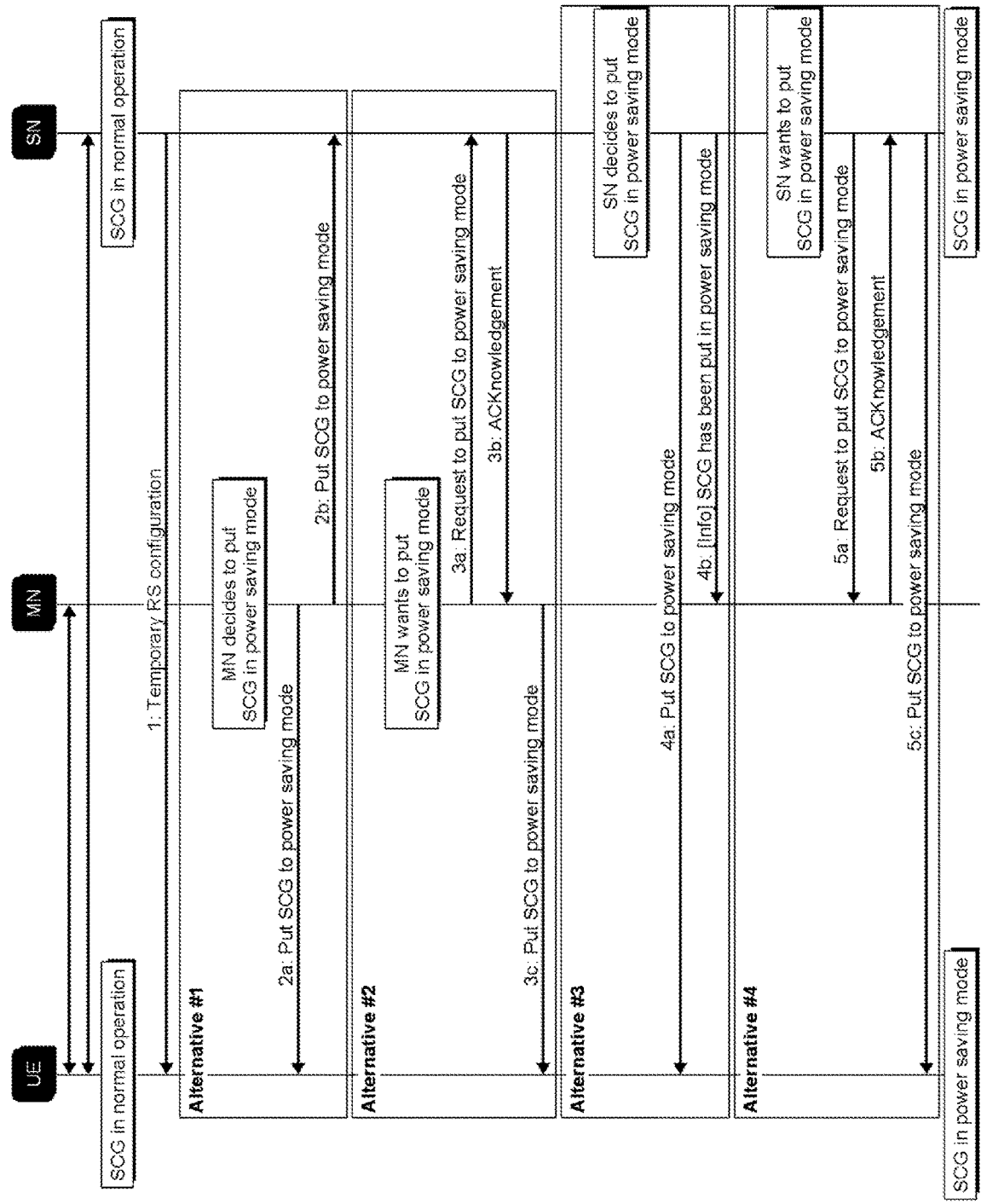
FIG. 16a shows examples of transitioning to the second operation state according to embodiments herein.

These are all shown in FIG. 16*a*.

Transition from Power Saving Mode to Normal Mode (e.g. Actions 305-306):

The temporary RS configuration (action 302) could be provided to the UE 10 before the reception of the command to put the SCG in normal mode (e.g. while the SCG was operating in normal mode, during the transition to power saving mode, while the SCG is operating in power saving mode), or it can be included (or sent in parallel) with the command to transition the SCG in normal mode.

MN Triggered:

(Alternative A) The MN, being an example of the first radio network node 12, decides to bring the SCG to normal operation and instructs the SN, being an example of the second radio network node 13, to start operating the SCG associated with the UE 10 in normal mode, either before/in-parallel/after sending the command to the UE 10 to start operating the SCG in normal mode. The command sent to the UE/SN may contain the temporary RS configuration.

(Alternative B) The MN sends a request to the SN to start operating the SCG associated with the UE 10 in normal mode, and only instructs the UE 10 to start operating the SCG in normal mode once the SN has accepted that request. The request sent from the MN may contain a temporary RS configuration, which the SN may accept as is or update (updated configuration included in the ACK message), and the MN may include it (i.e. original or updated temporary RS configuration) in the command sent to the UE.

SN Triggered:

(Alternative C), The SN decides to bring the SCG to normal operation and sends the command to the MN (optionally including the temporary RS configuration). The MN sends the command to the UE 10 to start operating the SCG in normal mode, and optionally inform/confirm to the SN that the command has been sent to (or/and received at) the UE 10.

(Alternative D) The SN sends a request to the MN to get the permission to start operating the SCG associated with the UE 10 in normal mode. The MN, upon accepting the request from the SN, sends an acknowledgement to the SN, either before/in-parallel/after sending the command to the UE 10 to start operating the SCG in normal mode. The request sent to the MN may contain a temporary RS configuration, which the MN may accept as is or update (updated configuration included in the ACK message), and the MN may include it (i.e. original or updated RS configuration) in the command sent to the UE.

Figure 16B:
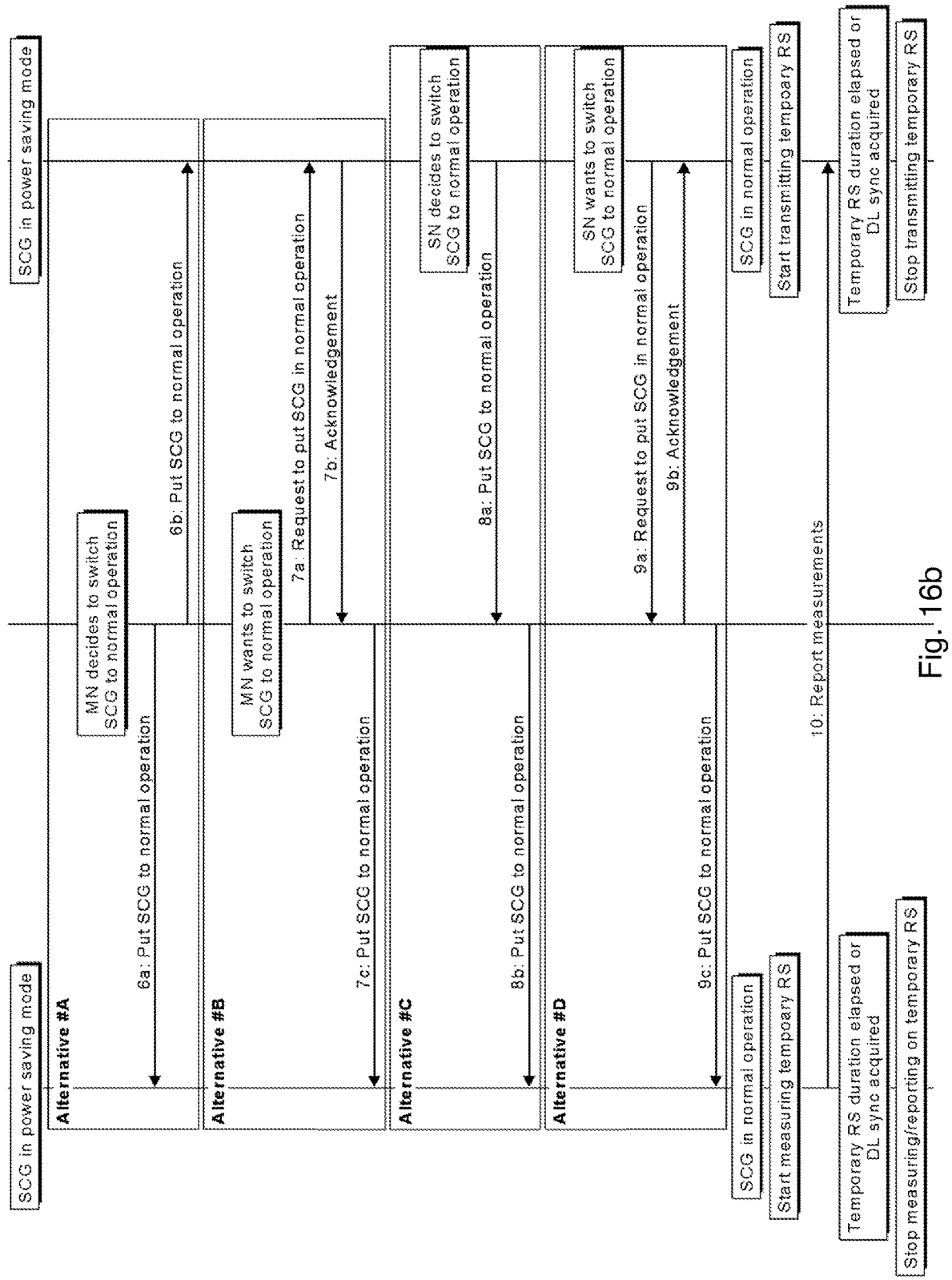
FIG. 16b shows examples of transitioning to the first operation state according to embodiments herein.

These are all illustrated in FIG. 16*b*.

Usage of the Temporary Reference Signals (See e.g. Action 309):

A UE 10 with an SCG operating in power saving mode, upon receiving the command to transition the SCG to normal operation, will start using the temporary reference signals on the SCG, wherein using temporary reference signals on the SCG may correspond, for example, to any of the following actions (or any combination of the following actions):

Obtaining synchronization with a cell of the SCG (e.g. synchronization with the SpCell of the SCG, or the PSCell of the SCG, or an SCell of the SCG);

Obtaining synchronization would enable, for example, the UE 10 to perform random access with a cell of the SCG;

Performing measurements on the temporary reference signal(s) of the SCG, for at least one of the following procedures:

"Random Access Resource selection"; That may comprise the UE 10 performing measurements on SSB(s) or CSI-RSs of the SCG and performing beam selection, and upon selecting a beam determine the associated random access channel (RACH) resources to transmit an associated preamble;

Using temporary RS may speed up the resource selection and the RACH procedure at the cell of the SCG upon the transition to normal mode of operation (and consequently reducing the delay to transition to normal SCG mode of operation). It also speeds up the selection of the best beam to be used in the cell of the SCG;

The method also comprises additional RACH resources (e.g. preambles, time domain resources and/or frequency domain resources) possibly associated with the configuration of temporary RS(s) of the SCG; these additional resources are to be used based on the measurements on temporary RS(s). For example, the contention-based RACH resources of the SpCell of the SCG comes at each 2 radio frames. However, these additional RACH resources to be used during the transition can are transmitted with shorter periodicity (e.g. 2 RACH resources at each radio frame) or shifted in time e.g. RACH resources come after X subframes after the temporary RS transmission (so the UE 10 can perform resource selection and within a short time transmit a preamble).

Early measurement reporting to the SCG e.g. for SCell(s) of the SCG or candidates for PSCell/SpCell change. In this example, measurements can correspond to L3 filtered measurements (also called RRM measurements, reported over RRC message);

Using temporary RS on the SCG for early measurement reporting makes the SCG to obtain faster measurement reports concerning the serving cell quality, which may be used as criteria to determine to release or not the SCG upon the transition; For example, the operation is only resumed if serving cell quality is good enough (e.g. RSRP and/or RSRQ above a certain threshold);

Beam management related measurements with the SCG, such as L1 SSB and/or CSI-RS measurements (e.g. beam measurements) and reporting for TCI state activation/switching;

Other L1 measurements for the SCG and reporting for link adaptation, MIMO operation, and other L1 procedures;

Note: Measurements and reporting of the measurements to the SCG are according to a reporting configuration associated with the temporary reference signal configuration. The UE 10 may perform these measurements and reporting for a specified duration (which could be a fixed value specified in 3GPP standards, or a value communicate to the UE either separately or with the temporary reference signal configuration).

The method also defines network actions e.g. see action 307, in order to enable the UE 10 to measure and report the measurements. According to the method, a network node operating as the secondary node such as the second radio network node 13 for the UE 10 capable of operating in MR-DC may:

Transmit the temporary reference signals on the resources (time slot, frequency, beam, etc) specified in the temporary reference signal configuration Transmit the temporary reference signals for the duration that the UE 10 is expected to monitor/measure them (or until the UE 10 has acquired DL synchronization)

Provide the required resources (e.g. UL grants, RACH resources) to the UE 10 for sending the measurements (e.g. on a pre-determined manner, where the UE knows beforehand on which slots, and for how long (after the reception of the command to transition the SCG to normal operation), it has to keep sending the reports Provide the UE 10 the configuration, being an example of the monitoring indication, of temporary reference signal(s) of a cell of the SCG (e.g. SpCell of the SCG) to be used upon transition from a power saving mode of operation to a normal mode of operation.

Figure 17:
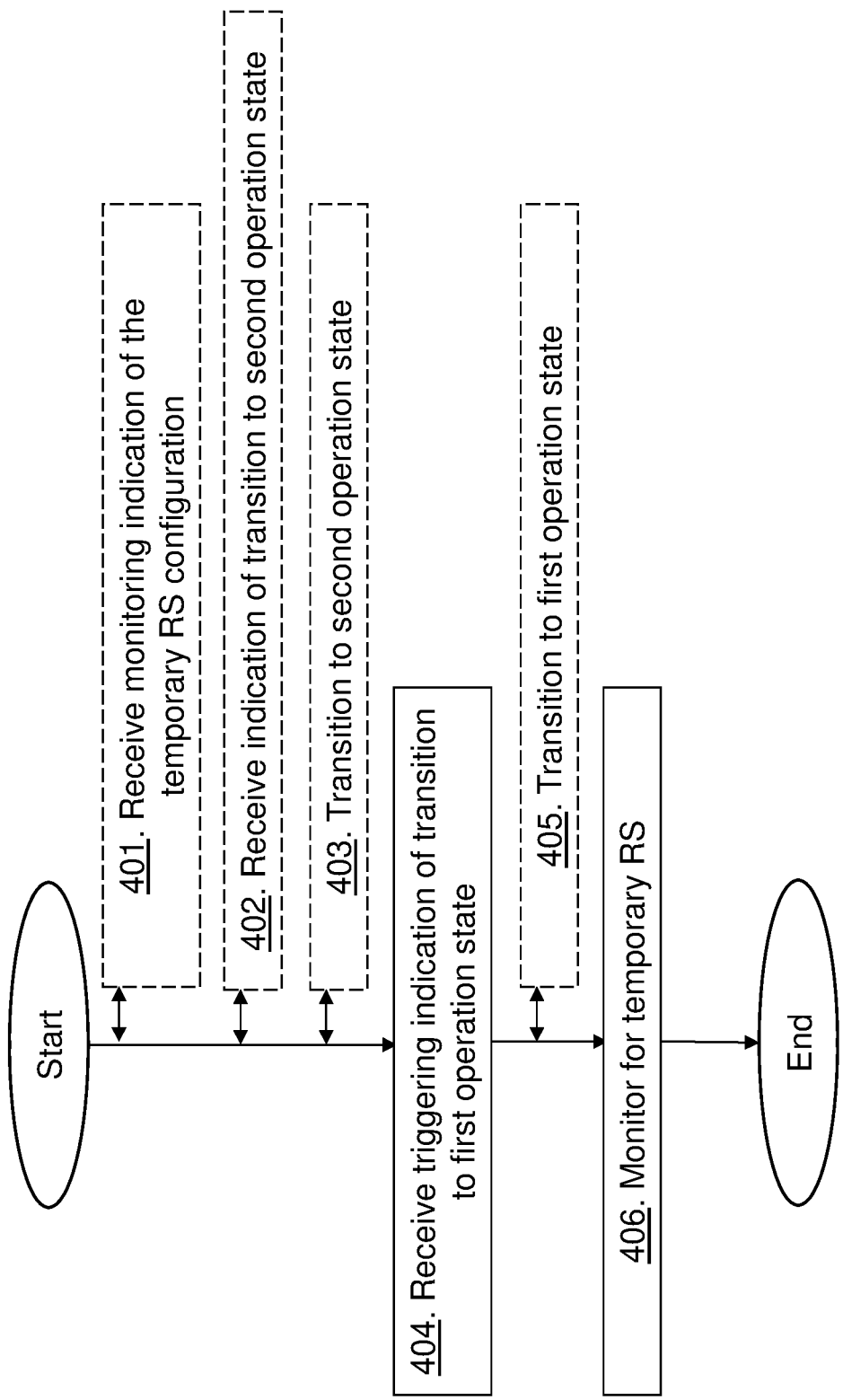
FIG. 17 shows a method performed by a UE according to embodiments herein.

The method actions performed by the UE 10 for communicating in the wireless communication network according to embodiments will now be described with reference to a flowchart depicted in FIG. 17. The actions do not have to be taken in the order stated below, but may be taken in any suitable order. Actions performed in some embodiments are marked with dashed boxes. The UE 10 is connected to a first cell of an MSG and a second cell of a SCG. The wireless communication network may thus comprise a first cell and a second cell and the UE 10 is connected to the first cell and the second cell.

Action 401. The UE 10 may receive from the first radio network node 12 or the second radio network node 13, the monitoring indication indicating the temporary reference signal configuration defining where and when to monitor for the one or more temporary reference signals of the SCG. Thus, the UE 10 may receive, from a radio network node, an indication indicating the temporary RS configuration i.e. where and when to monitor for the temporary RS. The monitoring indication may be received: while the SCG is operating in a normal mode, being the first operation state; when the UE 10 is instructed to put the SCG in power saving mode, being the second operation state; and/or when the UE 10 is instructed to bring the SCG back to normal mode, being the first operation state. This the monitoring indication may be provided to the UE 10 in different ways and/or different points in time, for example:

While the SCG is operating in normal mode

When the UE is instructed to put the SCG in power saving mode

When the UE is instructed to bring the SCG back to normal mode

The monitoring indication may be comprised in a configuration message to the UE 10. The monitoring indication may comprise real values or indices indicating the configuration.

Action 402. The UE 10 may receive from the first radio network node 12 or the second radio network node 13, an indication indicating a transition to the second operation state in the second cell. Thus, the UE 10 may receive, from a radio network node, an indication indicating the transition to the second operation state in the second cell e.g. a command to the UE 10 so the UE 10 enters power saving mode for the SCG.

Action 403. The UE 10 may change state e.g. transition to the second operation state.

Action 404. The UE 10 receives the triggering indication to perform transition to the first operation state from the second operation state. Thus, the UE 10 may receive from the radio network node e.g. the first or the second radio network node, another indication indicating the transition to the first operation state in the second cell e.g. a command to the UE 10 so the UE 10 enters normal mode for the SCG. The triggering indication may comprise a value or an index or a flag indicating the transition.

Action 405. The UE 10 may change state e.g. transition to the first operation state.

Action 406. The UE 10, upon transitioning to the first operation state, monitors for one or more temporary reference signals of the SCG. Thus, the UE 10 may use at least one temporary reference signal of a second cell group e.g. upon state transition the UE monitors for one or more temporary reference signals of the second cell. The UE 10 may thus use the one or more temporary RS as exemplified above.

It should be noted that the first operation state may comprise the normal mode for the SCG, and/or the second operation state may comprise the power saving mode for the SCG.

It is e.g. disclosed herein a method performed the UE 10 e.g. configured with dual connectivity (DC) and operating with a first cell group, e.g. Master Cell Group (MCG), and a second cell group, e.g. Secondary Cell Group (SCG). The method may comprise:

Receiving a temporary reference signal configuration to be applied on a transition of the second cell group from the second operation state e.g. power saving mode operation, to the first operation state e.g. normal operation;

Receiving a command, either from the first cell group or second cell group, to operate the second cell group to the second operation state;

Start operating the second cell group in the second operation state;

Receiving a command via the first cell group to return the second cell group to the first operation state, the command comprising an indication for the UE 10 to use at least one temporary reference signal of the second cell group.

The first cell group may be an MCG and the second cell group may be an SCG; or, the first cell group may be an SCG and the second cell group may be an MCG.

The second operation state of the second cell group may comprise the UE 10 being configured with DRX for the second cell group (e.g. operating in long or short DRX), and the return to the first operation state comprising the UE 10 suspending DRX of the second cell group and/or start monitoring PDCCH of the second cell group, e.g. during on duration of DRX cycle, and/or starting the on duration of the SCG DRX cycle, and/or changing the DRX cycle length and/or changing the onDuration timer value, etc.

The second operation state of the second cell group may comprise the second cell group at the UE 10 being stored, i.e. UE 10 may store the second cell group configuration for the second cell group and may stop operating according at least some of the configurations, and the return to the first operation state may comprise the UE 10 applying the stored second cell group configuration and resuming operating in dual connectivity.

The second operation state of the second cell group may comprise the second cell group at the UE 10 being deactivated/suspended/dormant, i.e. UE 10 has stopped operating according at least some of the second cell group configurations, e.g. not monitoring the PDCCH(s) associated with the cells of the second cell group, and the return to the first operation state may comprise the UE 10 resuming to full second cell group operation, e.g. start monitoring PDCCH(s) associated with the cells of the second cell group.

The triggering indication such as a command, instructing the UE 10 to return to the first state operation may be one of a Radio Resource Control (RRC) message, a Medium Access Control (MAC) Control Element (CE) or a Downlink Control Indication (DCI).

In this case there may be different alternatives to associate the triggering indication to instruct the UE 10 to return to the first operation state and the command to activate temporary RS configuration.

In one alternative, the activation of the temporary RS configuration is done upon reception of a command to instruct the UE 10 to return to normal operation and a command to activate temporary RS configuration.

In another alternative, there is a separated command to instruct the UE 10 to activate temporary RS configuration, which could be useful in some cases where network configures the UE 10 but decides not to use the temporary RS at a given moment in time.

In yet another alternative, the activation of the temporary RS configuration is done upon reception of the command to instruct the UE 10 to return to normal operation and the command to activate temporary RS configuration, wherein the command contain a specific indication within the command, e.g. a field in an RRC message, or an indication in a MAC CE.

In another set of embodiments, the command to instruct the UE 10 to return to normal operation is not associated from the UE's perspective with the command to activate temporary RS configuration. One possible application for that could be that temporary RSs of the SCG may be activated so that the UE 10 starts performing measurements on temporary RSs of the SCG even in power saving mode of operation, e.g. L1 beam/SSB/CSI-Rs measurements, and starts reporting L1 measurements based on these temporary RSs via the MCG, e.g. in L1 reports or even measurement reports. Upon that, the MCG can issue the command to transition the UE 10 to a normal mode of operation, and possibly indicate some specific configuration to be activated, such as a specific TCI state possibly selected based on the reported information on temporary RSs.

The temporary reference signal configuration may be a configuration of an SS/PBCH block (SSB); or a CSI-RS; or a Tracking Reference Signal (TRS); or a Cell-specific reference signal (CRS); or any combination of reference signal(s) such as a combination of SSB and CSI-RS;

The UE 10 may be configured with the temporary reference signal configuration, the configuration comprising at least one of the following parameters:

RS type (e.g. SSB, CSI-RS);

Periodicity (e.g. 5 ms, 20 ms, etc.) or any other indication of periodicity (e.g. integer value such as periodicity is derived as the SCG SSB's periodicity/integer);

Time offset indicating when the UE 10 can assume temporary to start being transmitted (from the reception of the command to transition to normal operation);

Validity time (e.g. timer value), indicating for how long the temporary RS is being transmitted;

Resource indication (e.g. in the time domain, in the frequency domain, etc.);

An RS measurement timing configuration (e.g. an SMTC for the temporary RS), including duration, periodicity and offset;

A measurement reporting configuration (e.g. specifying how often the measurements on the temporary RSs should be reported, in which resources, control channels, properties like periodicity and persistency/non-persistency, type of reports, time validity for which the configuration is valid, etc.)

The UE 10 may use the temporary reference signal by performing at least one of the following operations:

Obtaining synchronization (e.g. in the downlink) with the second cell group (e.g. with the PSCell of the SCG) using the temporary RS;

Performing measurements on temporary RSs (e.g. PMI, CQI, CSI, RI, codebook selection) for L1 reporting;

Performing measurements on temporary RSs that are transmitted in different beams i.e. with different quasi-co-location (QCL) properties, wherein measurements on temporary RSs are used for beam selection/re-selection/re-alignment with the second cell group (e.g. with the PSCell of the SCG);

Reporting the measurements performed on the temporary RSs, using the reporting configuration indicated/implied in the temporary RS configuration, to the second cell group;

A validity time/duration may be associated with the temporary reference signal configuration, wherein the validity time/duration is:

part of the temporary reference signal configuration; or/and a value broadcasted in the network that is common to all UEs a fixed value specified in 3GPP specifications, that is common to all UEs in the network;

The UE 10 may start a timer with a value of the validity time/duration upon the reception the command to transition the second cell group to normal operation, and may start measuring and reporting according to the temporary reference signal configuration until the timer expires, after which the UE 10 stops measuring and reporting according to the temporary reference signal configuration.

The UE 10 may stop the measuring and reporting according to the temporary reference signal configuration while the validity timer is running upon the reception a second command (e.g. DCI, MAC CE, or RRC message received via the first or second cell group).

The UE 10 may be configured with the temporary reference signal configuration when the second cell group is operating in normal mode, i.e. before receiving the command to transition the second cell group to power saving mode.

The UE 10 may be configured with the temporary reference signal configuration when the UE 10 transitions the second cell group to the second operation state (i.e. in the command that instructs the UE 10 to transition the second cell group to power saving mode).

The UE 10 may be configured with multiple temporary reference signal configurations, each with an associated identifier/index, and may receive an indication in the command that instructs the UE 10 to transition the second cell group to power saving mode, the indication identifying which temporary reference signal configuration the UE 10 has to use.

The UE 10 may be configured with partial temporary reference signal configuration while the second cell group is operating in the first state of operation or upon transition to second operation state, and getting the rest of the configuration when the UE 10 transitions the second cell group back to the first operation state, e.g. validity time/duration specified in the command that instructs the UE 10 to transition the second cell group back to normal mode.

Figure 18A:
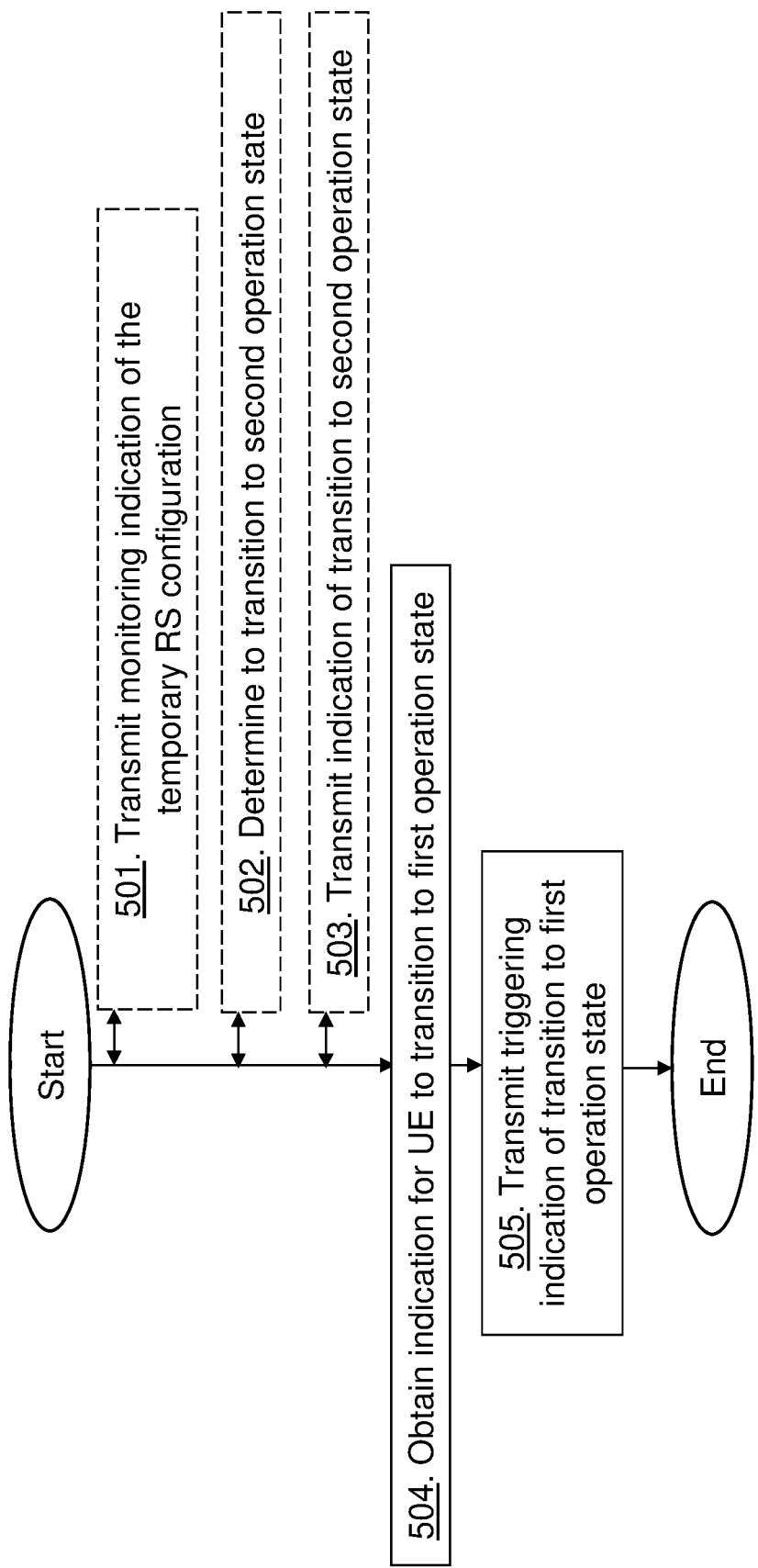
FIG. 18a shows a method performed by a first radio network node according to embodiments herein.

The method actions performed by the first radio network node 12 for communicating in the wireless communication network according to embodiments will now be described with reference to a flowchart depicted in FIG. 18a. The actions do not have to be taken in the order stated below, but may be taken in any suitable order. Actions performed in some embodiments are marked with dashed boxes. The first radio network node 12 provides radio coverage over the first cell of the MCG, to which the UE is connected to.

Action 501. The first radio network node 12 may transmit to the UE 10, the monitoring indication indicating the temporary reference signal configuration defining where and when to monitor for the one or more temporary reference signals of the SCG. Thus, the first radio network node 12 may transmit to the UE, the indication indicating the temporary RS configuration i.e. where and when to monitor for the temporary RS. The monitoring indication may be transmitted: while the SCG is operating in the normal mode, being the first operation state; when the UE 10 is instructed to put the SCG in power saving mode, being the second operation state; and/or when the UE 10 is instructed to bring the SCG back to normal mode, being the first operation state. This the monitoring indication may be provided to the UE 10 in different ways and/or different points in time, for example:
While the SCG is operating in normal mode
When the UE 10 is instructed to put the SCG in power saving mode
When the UE 10 is instructed to bring the SCG back to normal mode The indication may be comprised in a configuration message to the UE 10.

Action 502. The first radio network node may determine to transition, or to perform transition of, the UE 10 to the second operation state.

Action 503. The first radio network node may transmit to the UE, the indication indicating the transition to the second operation state in the second cell. Thus, the first radio network node may transmit to the UE, the indication indicating the transition to the second operation state in the second cell e.g. a command to the UE 10 so the UE 10 enters power saving mode for the SCG.

Action 504. The first radio network node obtains the indication that the UE 10 is to perform transition to the first operation state from the second operation state in the second cell of the SCG. The first radio network node may thus obtain an indication or determines to transition the UE 10 to the first operation state. The indication may be measurements or reports or data for the UE.

Action 505. The first radio network node transmits the triggering indication to the UE 10 to perform transition to the first operation state and to trigger the UE 10 to monitor for one or more temporary reference signals of the SCG. Thus, the first radio network node may transmit to the UE 10, another indication to transition to the first operation state in the second cell e.g. triggering the UE 10 to monitor for the at least one temporary reference signal from the radio network node, a command to the UE 10 so the UE 10 enters normal mode for the SCG.

The first operation state may comprise the normal mode for the SCG, and/or the second operation state may comprise the power saving mode for the SCG.

E.g. it is herein disclosed a method performed at the first radio network node 12 also called a gNodeB (gNB) serving e.g. the UE 10 in Dual Connectivity (DC) configured with a first cell group e.g. MCG associated with the first radio network node, and a second cell group, e.g. SCG, associated with the second radio network node 13. The method may comprise:
Transmitting the command via the first cell group instructing the UE 10 to return the second cell group to the first operation state.

The first radio network node 12 may be operating as a Master Node (MN) or first radio network node may be operating as a Second Node (SN);

The first radio network node 12 may transmit a command to the UE 10 to transition the second cell group to the second operation state.

The first radio network node 12 may transmit a command to the second radio network node 13 to put the second cell group to the second operation state.

The first radio network node 12 may send a request to the second radio network node 13 if the second cell group can put in the second operation state.

The first radio network node 12 may receive an acknowledgement from the second radio network node 13 that the second cell group can be put in the second operation state.

The first radio network node 12 may receive an indication from the second radio network node 13 that the second cell group has been put in the second operation state.

The first radio network node 12 may receive a request from the second radio network node if the second cell group can be put in the second operation state.

The first radio network node 12 may send an acknowledgement to the second radio network node 13 that the second cell group can be put in the second operation state.

The first radio network node 12 may transmit a command to the UE 10 to transition the second cell group to the first operation state.

The first radio network node 12 may transmit a command to the second radio network node to put the second cell group in the first operation state.

The first radio network node 12 may send a request to the second radio network node if the second cell group can be put in the first operation state.

The first radio network node 12 may receive an acknowledgement from the second radio network node 13 that the second cell group can be put in the first operation state.

The first radio network node 12 may receive a command from the second radio network node 13 that the second cell group has to be put in the first operation state.

The first radio network node 12 may receive a request from the second radio network node 13 if the second cell group can be put in the first operation state. The first radio network node 12 may send an acknowledgement to the second radio network node 13 that the second cell group can be put in the first operation state.

Figure 18B:
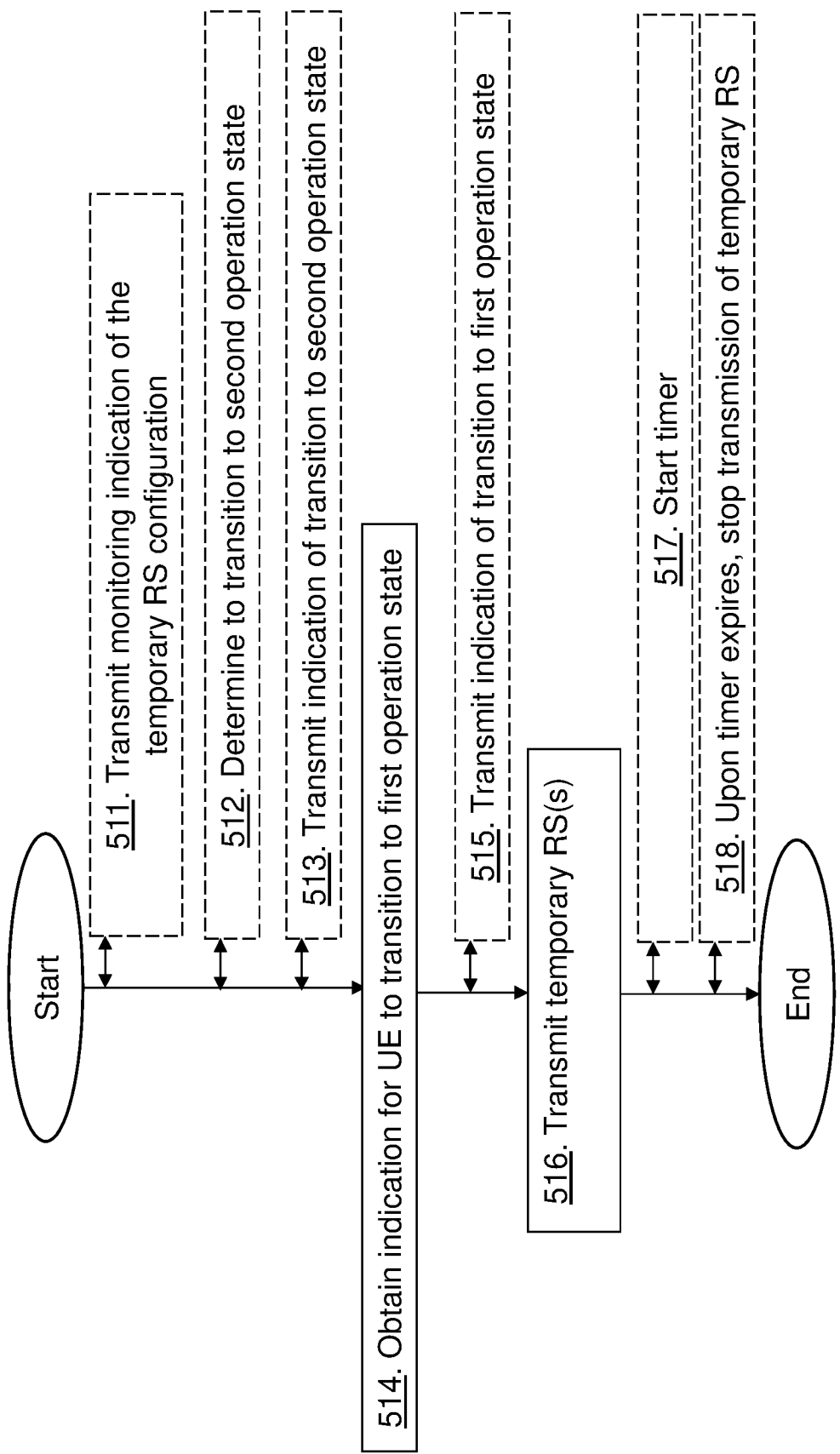
FIG. 18b shows a method performed by a second radio network node according to embodiments herein.

The method actions performed by the second radio network node 13 for communicating in the wireless communication network according to embodiments will now be described with reference to a flowchart depicted in FIG. 18*b*. The actions do not have to be taken in the order stated below, but may be taken in any suitable order. Actions performed in some embodiments are marked with dashed boxes. The second radio network node 13 provides radio coverage over the second cell of the SCG, to which the UE 10 is connected to.

Action 511. The second radio network node 13 may transmit to the UE 10, the monitoring indication indicating the temporary reference signal configuration defining where and when to monitor for the one or more temporary reference signals of the SCG. Thus, the second radio network node 13 may transmit to the UE 10, the indication indicating the temporary RS configuration i.e. where and when to monitor for the temporary RS. The monitoring indication may be transmitted: while the SCG is operating in the normal mode, being the first operation state; when the UE 10 is instructed to put the SCG in power saving mode, being the second operation state; and/or when the UE 10 is instructed to bring the SCG back to normal mode, being the first operation state. This the monitoring indication may be provided to the UE 10 in different ways and/or different points in time, for example:

While the SCG is operating in normal mode

When the UE 10 is instructed to put the SCG in power saving mode

When the UE 10 is instructed to bring the SCG back to normal mode

The indication may be comprised in a configuration message to the UE 10.

Action 512. The second radio network node 13 may determine to transition, or to perform transition of, the UE 10 to the second operation state.

Action 513. The second radio network node 13 may transmit to the UE, the indication indicating the transition to the second operation state in the second cell. Thus, the second radio network node may transmit to the UE 10, the indication indicating the transition to the second operation state in the second cell e.g. a command to the UE 10 so the UE 10 enters power saving mode for the SCG.

Action 514. The second radio network node 13 obtains the indication that the UE 10 is to perform transition to the first operation state from the second operation state in the second cell of the SCG. The first radio network node may thus obtain an indication or determine to transition the UE 10 to the first operation state. The indication may be measurements or reports or data for the UE.

Action 515. The second radio network node 13 may transmit an indication to the first radio network node 12 indicating transition of the UE 10 to the first operation state.

Action 516. The second radio network node transmits one or more temporary reference signals of the SCG at least one temporary reference signal of the second cell. The one or more temporary reference signals of the SCG may be transmitted with at least one of the following properties:

Shorter periodicity compared to the periodicity of other reference signals of the SCG;

Higher density in frequency and/or time compared to other reference signals of the SCG;

Different beamforming properties compared to other reference signals of the SCG;

Different reference signal type compared to other reference signals of the SCG.

The first operation state may comprise the normal mode for the SCG, and/or the second operation state may comprise the power saving mode for the SCG.

Action 517. The second radio network node 13 may start a timer when transmission of the one or more temporary reference signals starts.

Action 518. Upon the timer expires, the second radio network node 13 may stop transmission of the one or more temporary reference signals.

It is further herein disclosed e.g. a method performed at the second radio network node 13 e.g. a gNB serving a UE in e.g. DC configured with a second cell group (e.g. SCG) associated with the second radio network node and a first cell group (e.g. MCG) associated with the first radio network node. The method may comprise:

Configuring the UE 10 with a temporary reference signal configuration to be applied on a transition of the SCG from a second operation state to a first operation state e.g. from power saving mode operation to normal operation.

Operating the secondary cell group in the second operation state (e.g. stop scheduling the UE 10 on the second cell group)

Transmitting a temporary reference signal (SS/PBCH blocks—SSBs, CSI-RSs, or both of SSBs and CSI-RSs) of the secondary cell group (e.g. SCG) during a validity time associated to it.

The second radio network node 13 may be operating as a Secondary Node (SN) or the second radio network node may be operating as a Master Node (MN);

The second radio network node 13 may stop transmitting the temporary reference signal (SS/PBCH blocks— SSBs, CSI-RSs, or both of SSBs and CSI-RSs) of the second cell group (e.g. SCG) after the validity time; For example, the second radio network node 13 may start a timer when the temporary RS starts to be transmitted, and, upon the timer expires the second radio network node may stop transmitting the temporary RS.

The second radio network node 13 may transmit the temporary reference signal (SS/PBCH blocks— SSBs, CSI-RSs, or both of SSBs and CSI-RSs) of the second cell group (e.g. SCG) with at least one of the following properties:

Shorter periodicity compared to the periodicity of other RS of the second cell group (e.g. SSBs being transmitted and possibly detected by idle/inactive UEs) and/or Higher density in frequency and/or time;

Different beamforming properties such as transmitted in narrow beams (while RS that are not temporary are transmitted in wide beams); or wide beams (while RS that are not temporary are transmitted in narrow beams);

Different RS type (e.g. secondary cell group is transmitting SSBs, while temporary RS comprises CSI-RSs);

The second radio network node 13 may receive the command to put the second cell group in the second operation state.

The second radio network node 13 may transmit the command to the UE 10 to transition the second cell group to the second operation state.

The second radio network node 13 may receive the request from the first radio network node 12 if the second cell group can put in the second operation state.

The second radio network node 13 may send the acknowledgement to the first radio network node that the second cell group can be put in the second operation state.

The second radio network node 13 may send the indication to the first radio network node that the second cell group has been put in the second operation state.

The second radio network node 13 may send the request to the first radio network node 12 if the second cell group can be put in the second operation state.

The second radio network node 13 may receive the acknowledgement from the first radio network node 12 that the second cell group can be put in the second operation state.

The second radio network node 13 may receive the command from the first radio network node 12 to put the second cell group in the first operation state.

The second radio network node 13 may receive the request from the first radio network node 12 if the second cell group can be put in the first operation state.

The second radio network node 13 may send the acknowledgement to the first radio network node 12 that the second cell group can be put in the first operation state.

The second radio network node 13 may send the command to the first radio network node 12 that the second cell group has to be put in the first operation state.

The second radio network node 13 may send the request to the first radio network node 12 if the second cell group can be put in the first operation state.

The second radio network node 13 may receive the acknowledgement from the first radio network node that the second cell group can be put in the first operation state.

Configurations Associated to the Temporary RS(s)

In the document the configuration of temporary RS is described, see actions 401, 501 and 511. The configuration may correspond to any associated configuration provided to the UE 10 such as the reporting of information based on measurements performed on temporary RS(s), an SMTC configuration indicating when/where the UE 10 shall perform the measurements on temporary RS(s), etc. Or, that can correspond to measurement related procedures (e.g. synchronization, L1 measurement and L1 reporting, etc.).

In various embodiments, as described above the temporary reference signal configuration may be a configuration of an SS/PBCH block (SSB); or a CSI-RS; or a Tracking Reference Signal (TRS); or a Cell-specific reference signal (CRS); or any combination of reference signal(s) such as a combination of SSB and CSI-RS;

The UE 10 may be configured with the temporary reference signal configuration, the configuration comprising at least one of the following parameters:

RS type (e.g. SSB, CSI-RS);
Periodicity (e.g. 5 ms, 20 ms, etc.) or any other indication of periodicity (e.g. integer value such as periodicity is derived as the SCG SSB's periodicity/integer);
  This can be the periodicity of the signals or the periodicity of an SMTC window, indicating what the UE 10 can assume as the periodicity of the temporary RS.
Time offset indicating when the UE 10 can assume temporary to start being transmitted (from the reception of the command to transition to normal operation);
  In one alternative this is an offset from the time the UE 10 has received the command from the network to transition from power saving mode of operation to normal mode of operation;
  In another alternative this is an offset that has as reference the SpCell of the cell group whose the UE 10 is operating according to the normal mode of operation.
Validity time (e.g. timer value), indicating for how long the temporary RS is being transmitted; Or, in other words, indicating for how long the UE 10 can assume that temporary RS(s) of the SCG are being transmitted; or, in other words, indicating for how long the UE 10 shall measure temporary RS(s) of the SCG;
Resource indication (e.g. in the time domain, in the frequency domain, etc.);
Resource density e.g. signal bandwidth.
An RS measurement timing configuration (e.g. an SMTC for the temporary RS), including duration, periodicity and offset;
A measurement reporting configuration (e.g. specifying how often the measurements on the temporary RSs should be reported)

That temporary RS configuration may be provided to the UE 10 in the same message indicating to the UE 10 that the SCG is to transition to the power saving mode of operation e.g. an RRC Release or an RRC Reconfiguration message with an indication that only the SCG is to be suspended. In another alternative, the temporary RS configuration for the SCG (or another cell group) may be provided as part of the cell group configuration e.g. in the IE CellGroupConfig, indicating to the UE 10 that this is to be used upon transitioning from power saving to normal mode of operation. In yet another alternative, that temporary RS configuration can be provided to the UE 10 in the same message indicating to the UE 10 that the SCG is to transition from the power saving mode of operation to a normal mode of operation. In yet another alternative, there can be parameters of the temporary RS configuration for the SCG (or another cell group) provided as part of the cell group configuration, while some other parameters are provided in the message that transitions the UE 10 to the power saving state, etc.

The UE 10 may assume that some parameters of the temporary RS are the same as provided in the configuration of the SpCell of the SCG. For example, if the temporary RS is an SSB, the UE 10 can assume that the subcarrier spacing of the temporary RS is the same of the PSCell's SSB. For example, if the temporary RS is an SSB, the UE 10 may assume that the frequency domain allocation, e.g. absolute radio-frequency channel number (ARFCN), of the temporary RS is the same of the PSCell's SSB. In other words, the temporary RS configuration may contain only the configurations that differ from the ones associated with the SSB's SpCell of the SCG.

In legacy (up to Rel-16), the UE is configured with an SMTC associated with the SpCell of a cell group e.g. the received in reconfigurationWithSync upon handovers. According to the method, in the case of a temporary RS configuration, the UE 10 may be configured with a first STMC configuration, or at least one parameter associated with an SMTC configuration, comprising the SSB period-icity/offset/duration configuration of the NR PSCell (SpCell of the SCG) during the transition from power saving mode of operation to normal mode of operation. In that case, the network does not have to set the periodicityAndOffset to indicate the same periodicity as ssb-periodicityServingCell in spCellConfigCommon.

Also, according to the method, in the case of a temporary RS configuration, the UE 10 may be configured with at least one more STMC configuration, comprising the SSB peri-odicity/offset/duration configuration of an NR SCell of the SCG during the transition from power saving mode of operation to normal mode of operation. In that case, the network does not have to set the periodicityAndOffset to indicate the same periodicity as ssb-periodicityServingCell in sCellConfigCommon (but network would rather indicate shorter values, to have shorter periodicities to enable faster access to the SCG). The smtc for temporary RSs for SCells of the SCG is based on the timing of the SpCell of associated cell group. Added text is underlined and bold

| SSB-MTC information element |
|---|

```
--ASN1START
--TAG-SSB-MTC-START
SSB-MTC ::=                    SEQUENCE {
    periodicityAndOffset           CHOICE {
        sf5                            INTEGER (0..4),
        sf10                           INTEGER (0..9),
        sf20                           INTEGER (0..19),
        sf40                           INTEGER (0..39),
        sf80                           INTEGER (0..79),
        sf160                          INTEGER (0..159)
    },
    duration                       ENUMERATED { sf1, sf2, sf3, sf4, sf5 }
    validityTimer                  ENUMERATED { 1, 2, 3, 4, 5, 6, 7, 8},
}
SSB-MTC2 ::=                   SEQUENCE {
    pci-List                       SEQUENCE (SIZE (1..maxNrofPCIsPerSMTC)) OF
PhysCellId                     OPTIONAL,   -- Need M
    periodicity                    ENUMERATED {sf5, sf10, sf20, sf40, sf80, spare3,
spare2, spare1}
}
SSB-MTC2-LP-r16 ::=            SEQUENCE {
    pci-List                       SEQUENCE (SIZE (1..maxNrofPCIsPerSMTC)) OF
PhysCellId                     OPTIONAL,   -- Need R
    periodicity                    ENUMERATED {sf10, sf20, sf40, sf80, sf160, spare3,
spare2, spare1}
}
SSB-MTC3-r16 ::=               SEQUENCE {
    ssb-MTC-Periodicity-r16        ENUMERATED {ms5, ms10, ms20, ms40, ms80, ms160,
ms320, ms640, ms1280},
    ssb-MTC-Timingoffset-r16       INTEGER (0..127),
    ssb-MTC-Duration=r16           ENUMERATED {sf1, sf2, sf3, sf4, sf5},
    ssb-MTC-pci-List-r16           SEQUENCE (SIZE (0..63)) OF PhysCellId,
    ssb-ToMeasure-r16              SetupRelease { SSB-ToMeasure }
OPTIONAL   -- Need M
}
-- TAG-SSB-MIC-STOP
-- ASN1STOP
```

| SSB-MTC field descriptions |
|---|
| duration<br>Duration of the measurement window in which to receive SS/PBCH blocks. It is given in number of subframes (see TS 38.213 [13], clause 4.1).<br>periodicityAndOffset<br>Periodicity and offset of the measurement window in which to receive SS/PBCH blocks, see 5.5.2.10. Periodicity and offset are given in number of subframes.<br>validityTimer<br>Duration of the overall STMC (number of windows)for which the UE assumes transmission of temporary RS(s)in number of subframes (The usage of the number of subframes is merely an example, the time measure can be anything the UE is able to derive and is commonly understood by the UE and the network e.g. number of SMTC windows, a value that is used to divide the existing SMTC periodicity by it, to reach a shorter value, etc. The value 8 as the maximum value is merely an example, this can be higher or lower than 8). |

Figure 19:
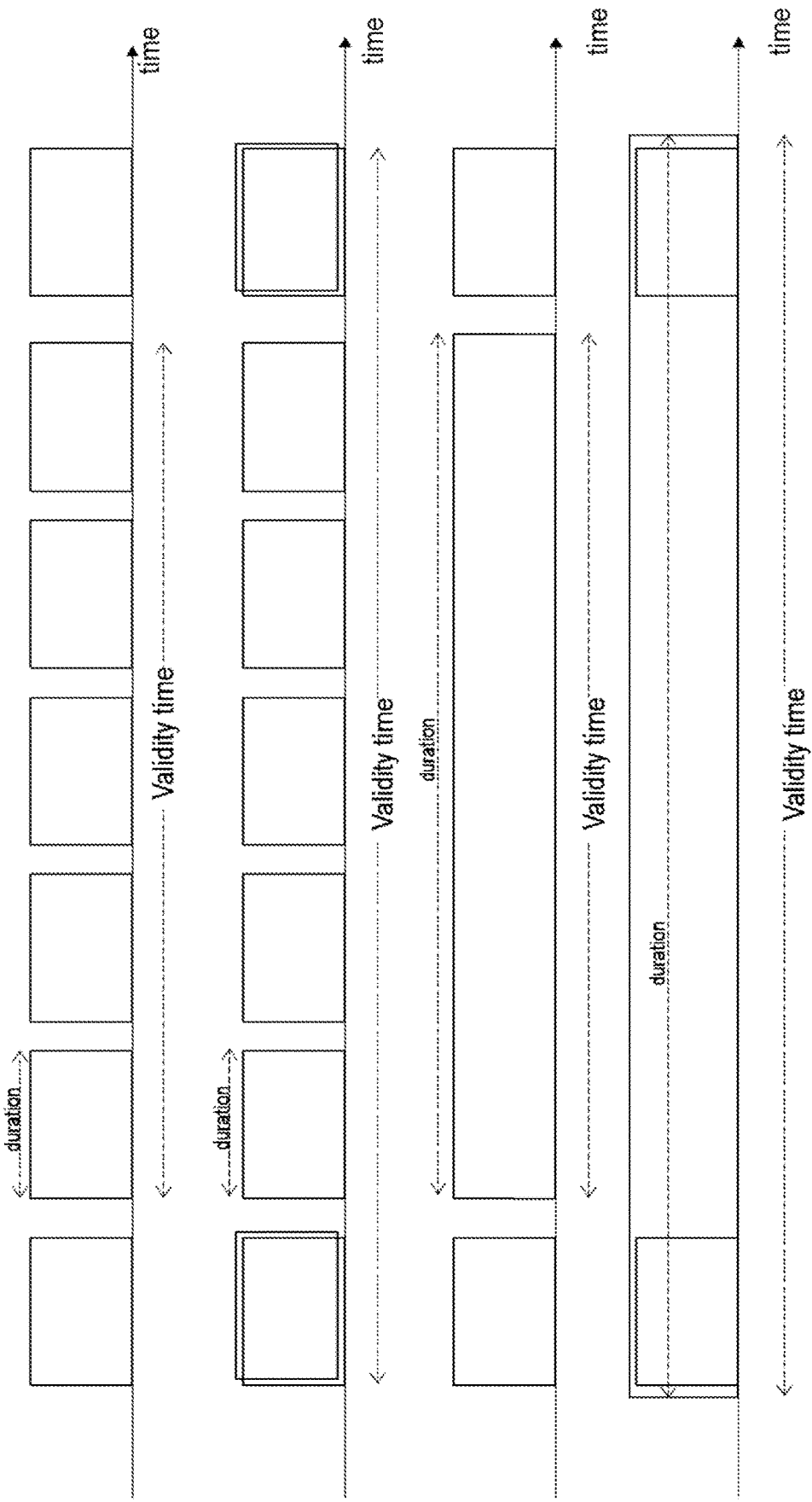
FIG. 19 shows examples of SMTC configuration for transitioning from second operation state to the first operation state.

FIG. 19 shows examples of SMTC configuration for transitioning from second operation state to the first operation state.

In an embodiment, specific SSB configuration for temporary RS may be provided, so that during the transition the UE 10 assumes that configuration instead of the configuration for normal mode of operation e.g. the SSB configuration provided in SpCell configuration, provided in reconfigurationWithSync and/or serving cell config common.

For example, the temporary RS, e.g. a temporary SSB of the SCG, may be transmitted in a different frequency resource, i.e. different ARFCN, and possibly having other different properties, e.g. subcarrier spacing, SSBs to measure—ssb-ToMeasure, deriveSSB-IndexFromCell, ss-RSSI-Measurement, compared to the SSB of the PSCell whose properties are indicated in legacy in the IE FrequencyInfoDL or/and in measurement object.

In one embodiment, SMTC(s) or parameters related to the timing of the temporary RS of the SCG, or the MCG, in case it is the MCG that is to have associated temporary reference signals, may be signalled as part of the Cell group configuration, when that cell group is being added. in the CellGroupConfig IE.

by a timer that is started when the UE receives the command). An example of such a configuration is given below:

```
validityTimer                    ENUMERATED {ms50, ms100,
ms150, ms200, ms500, ms1000, ms2000, ms10000},
   rach-ConfigDedicatedTempRS    CHOICE {
      uplink                     RACH-ConfigDedicated,
      supplementaryUplink        RACH-ConfigDedicated
   }
OPTIONAL,  -- Need N
}
```

In legacy, the UE can be configured to perform L1 measurement and report them for a given serving cell e.g.

| CellGroupConfig information element |
|---|

```
-- ASN1START
-- TAG-CELLGROUPCONFIG-START
-- Configuration of one Cell-Group:
CellGroupConfig ::=                        SEQUENCE {
   cellGroupId                                CellGroupId,
   rlc-BearerToAddModList                     SEQUENCE (SIZE(1..maxLC-ID)) OF RLC
BearerConfig                            OPTIONAL,  -- Need N
   rlc-BearerToReleaseList                    SEQUENCE (SIZE(1..maxLC-ID)) OF
LogicalChannelIdentity                  OPTIONAL,  -- Need N
   mac-CellGroupConfig                        MAC-CellGroupConfig
OPTIONAL,  -- Need M
   physicalCellGroupConfig                    PhysicalCellGroupConfig
OPTIONAL,  -- Need M
   spCellConfig                               SpCellConfig
OPTIONAL,  -- Need M
   sCellToAddModList                          SEQUENCE (SIZE (]. maxNrofsCells)) OF
ScellConfig                             OPTIONAL,  -- Need N
   sCellToReleaseList                         SEQUENCE (SIZE (1. maxNrofsCells) ) OF
SCellIndex                              OPTIONAL,  -- Need N
   ...,
   [[
   reportUplinkTxDirectCurrent                ENUMERATED {true}
OPTIONAL   -- Cond BWP-Reconfig
   ]],
   [[
   bap-Address-r16                            BIT STRING (SIZE (10))
OPTIONAL,  -- Need M
   bh-RLC-ChannelToAddModList-r16             SEQUENCE (SIZE(1..maxLC-ID-Iab-r16)) OF BH-
RLC-ChannelConfig-r16                   OPTIONAL,  -- Need N
   bh-RLC-ChannelToReleaseList-r16            SEQUENCE (SIZE(1..maxLC-ID-Iab-r16)) OF BH-
LogicalChannelIdentity=r16              OPTIONAL,  -- Need N
   dormancySCellGroups                        DormancySCellGroups
OPTIONAL,  -- Need N
   simultaneousTCI-UpdateList r16             SEQUENCE (SIZE (1..maxNrofServingCellsTCI-
r16)) OF ServCellIndex                  OPTIONAL,  -- Need R
   simultaneousTCI-UpdateListSecond-r16       SEQUENCE (SIZE (1..maxNrofServingCellsTCI-
r16)) OF ServCellIndex                  OPTIONAL,  -- Need R
   simultaneousSpatial-UpdateList-r16         SEQUENCE (SIZE (1..maxNrofServingCellsTCI-
r16)) OF ServCellIndex                  OPTIONAL,  -- Need R
   simultaneousSpatial-UpdatedListSecond-r16  SEQUENCE (SIZE (1..maxNrofServingCellsTCI-
r16)) OF ServCellIndex                  OPTIONAL,  -- Need R
   simultaneousSpatial-UpdatedListSecond-r16  SEQUENCE (SIZE (1..maxNrofServingCellsTCI-
r16)) OF ServCellIndex                  OPTIONAL,  -- Need R
   ]],
   [[
   smtc-Temp-RS                               SSB-MTC
OPTIONAL   -- Need S
   ]]
}
```

In one embodiment, RACH resources of the SCG (e.g. RACH occasions of the PSCell/SpCell of the SCG) to be used during the transition from the power saving mode of operation to a normal mode of operation can be configured to the UE. In one solution these are contention-free RACH resources for which validity is limited from the time the UE receives a command until a defined duration (e.g. configured SpCell of the MCG (PCell), Scell or SpCell of the SCG (PSCell). According to the method, the UE can be configured to report RSRP for each 1 of up to X beams, either on CSI-RS or SS/PBCH block, associated to temporary RSs of the SCG, either over PUCCH or PUSCH (where that could be configurable). The reporting mode for measurements based on temporary RSs can also be configured such as:

Periodic and semi-persistent CSI-RS resources are RRC configured with a certain period and a certain slot offset, and a certain validity time (associated with the temporary RSs);

Aperiodic temporary CSI-RS can be scheduled by a specific DCI (or by a DCI used for normal operation but provided via MCG), in the same DCI where the UL resources for the measurement report are scheduled.

Semi-persistent temporary CSI-RS is configured using RRC and activated using MAC CE. Periodic CSI-RS is configured using RRC.

The configuration for the reporting of measurements based on temporary RS(s) could be configured in same IEs used for legacy, except that the UE understands its activation occurs during transition from power saving mode to normal mode of operation. Options for what/how the UE shall report is defined in a CSI-RS reporting setting (CSIReportConfig), as part of CSI-MeasConfig which is part of ServingCell-Config (i.e. within CellGroupConfig for spCell). A reporting setting also refers to a CSI-ResourceConfig, which defines the resources for which the report setting should be used. CSI-MeasConfig within ServingCellConfig In one solution there can be a specific field defined for temporary RS using same IE CSI-MeasConfig, or another IE possibly having similar configurations. The CSI-MeasConfig IE (or equivalent IE) can be used to configured at least one of the following procedures:

Configure temporary RSs belonging to the serving cell (e.g. SpCell of the SCG, SCell of the SCG) in which CSI-MeasConfig is included (and known to be used during transition from power saving to normal mode of operation);

Configure channel state information (CSI) reports based on temporary RSs of the SCG, to be transmitted on PUCCH on the serving cell in which CSI-MeasConfig is included, i.e., the cell that is in a power saving mode of operation (e.g. reporting occurs after the transition to normal mode of operation while measurements on temporary RSs can start earlier, triggered via MCG);

Configure channel state information reports based on temporary RSs reports on PUSCH triggered by DCI received on the serving cell in which CSI-MeasConfig is included.

The validity time for which these configurations are valid can also be configured in CSI-MeasConfig.

```
ServingCellConfig ::=                              SEQUENCE {
...
    csi-MeasConfig                                 SetupRelease { CSI MeasConfig }
OPTIONAL,    -- Need M
    csi-MeasConfigTemp-RS                          SetupRelease { CSI MeasConfigTemp }
OPTIONAL,    -- Need M
...
}
CSI-MeasConfigTemp ::=                             SEQUENCE {
    nzp-CSI-RS-ResourceToAddModList                SEQUENCE (SIZE (1..maxNrofNZP-CSI-RS-Resources)) OF
NZP-CSI-RS-Resource                            OPTIONAL, -- Need N
    nzp-CSI-RS-ResourceToReleaseList               SEQUENCE (SIZE (1..maxNrofNZP-CSI-RS-Resources)) OF
NZP-CSI-RS-ResourceId                          OPTIONAL, -- Need N
    nzp-CSI-RS-ResourceSetToAddModList             SEQUENCE (SIZE (1..maxNrofNZP-CSI-RS-ResourceSets))
OF NZP-CSI-RS-ResourceSet
OPTIONAL,    -- Need N
    nzp-CSI-RS-ResourceSetToReleaseList            SEQUENCE (SIZE (1..maxNrofNZP-CSI-RS-ResourceSets))
OF NZP-CSI-RS-ResourceSetId
OPTIONAL, -- Need N
    csi-IM-ResourceToAddModList                    SEQUENCE (SIZE (1..maxNrofCSI-IM-Resources)) OF
CSI-IM-Resource                                OPTIONAL, -- Need N
    csi-IM-ResourceToReleaseList                   SEQUENCE (SIZE (1..maxNrofCSI-IM-Resources)) OF
CSI-IM-ResourceId                              OPTIONAL, -- Need N
    csi-IM-ResourceSetToAddModList                 SEQUENCE (SIZE (1..maxNrofCSI-IM-ResourceSets)) OF
CSI-IM-ResourceSet                             OPTIONAL, -- Need N
    csi-IM-ResourceSetToReleaseList                SEQUENCE (SIZE (1..maxNrofCSI-IM-ResourceSets)) OF
CSI-IM-ResourceSetId                           OPTIONAL, -- Need N
    csi-SSB-ResourceSetToAddModList                SEQUENCE (SIZE (1..maxNrofCSI-SSB-ResourceSets)) OF
CSI-SSB-ResourceSet                            OPTIONAL, -- Need N
    csi-SSB-ResourceSetToReleaseList               SEQUENCE (SIZE (1..maxNrofCSI-SSB-ResourceSets)) OF
CSI-SSB-ResourceSetId                          OPTIONAL, -- Need N
    csi-ResourceConfigToAddModList                 SEQUENCE (SIZE (1..maxNrofCSI-
ResourceConfigurations)) OF CSI-ResourceConfig
OPTIONAL, -- Need N
    csi-ResourceConfigToReleaseList                SEQUENCE (SIZE (1..maxNrofCSI-
ResourceConfigurations)) OF CSI-ResourceConfigId
OPTIONAL, -- Need N
    csi-ReportConfigToAddModList                   SEQUENCE (SIZE (1..maxNrofCSI-
ReportConfigurations)) OF CSI-ReportConfig OPTIONAL, -- Need N
    csi-ReportConfigToReleaseList                  SEQUENCE (SIZE (1..maxNrofCSI-
ReportConfigurations)) OF CSI-ReportConfigId
OPTIONAL, -- Need N
    reportTriggerSize                              INTEGER (0..6)
OPTIONAL, -- Need M
    aperiodicTriggerStateList                      SetupRelease { CSI-AperiodicTriggerStateList }
OPTIONAL, -- Need M
    semiPersistentOnPUSCH-TriggerStateList             SetupRelease { CSI-SemiPersistentOnPUSCH-
TriggerStateList }                             OPTIONAL, -- Need M
    ...,
    [[
    reportTriggerSizeForDCI-Format0-2-r16              INTEGER (0..6)
OPTIONAL, -- Need M
```

```
  aperiodicTriggerStateListForDCI-Format0-2-r16 SetupRelease { CSI-
AperiodicTriggerStateList }                         OPTIONAL, -- Need M
    semiPersistentOnPUSCH-TriggerStateListForDCI-Format0-2-r16 SetupRelease { CSI-
SemiPersistentOnPUSCH-TriggerStateList }
OPTIONAL   -- Need M
    ]]
}
```

Alternatively, temporary RS configuration can be provided as part of CSI-MeasConfig (e.g. in case CSI-RS is defined as temporary RS, or in case SSB is defined as temporary RS for CSI purposes), within ServingCellConfig for the SpCell of the SCG. In that case, the same pool of resources for which the network uses to configure RSs for normal operation could be used for configuring temporary RSs (i.e. to be used during transition from power saving mode of operation to normal mode of operation of the cell associated to that ServingCellConfig.

In both cases we could have definitions are follows:

nzp-CSI-RS-ResourceToAddModList: Pool of NZP-CSI-RS-Resource to be used as temporary RS resources which can be referred to from NZP-CSI-RS-ResourceSet. The configuration of each temporary RS is within NZP-CSI-RS-Resource (e.g. periodicity, offset, etc.).

nzp-CSI-RS-ResourceSetToAddModList: Pool of NZP-CSI-RS-ResourceSet to be used as temporary RS set which can be referred to from CSI-ResourceConfig or from MAC CEs.

csi-IM-ResourceToAddModList: Pool of CSI-IM-Resource to be used as temporary RS which can be referred to from CSI-IM-ResourceSet.

csi-IM-ResourceSetToAddModList: Pool of CSI-IM-ResourceSet to be used as temporary RS set which can be referred to from CSI-ResourceConfig or from MAC CEs.

csi-SSB-ResourceSetToAddModList: Pool of CSI-SSB-ResourceSet to be used as temporary RS (in this case SSBs are temporary RSs) set which can be referred to from CSI-ResourceConfig. Notice that CSI-SSB-ResourceSet in legacy was used to configure one SS/PBCH block resource set which refers to SS/PBCH as indicated in ServingCellConfigCommon; however, according to the method that may refer to SS/PBCH that are temporarily transmitted (possibly configured in ServingCellConfig).

csi-ResourceConfigToAddModList: Configured CSI resource settings for temporary RS. It is a list of CSI-CSI-ResourceConfig IEs, wherein each of these defines a group of one or more NZP-CSI-RS-ResourceSet, CSI-IM-ResourceSet and/or CSI-SSB-ResourceSet. The other lists are individual resources of temporary RSs.

csi-ReportConfigToAddModList: Configured CSI report settings for measurements based on temporary RSs of the SCG. It is a list of CSI-ReportConfig IEs. Each CSI-ReportConfig is used to configure a periodic or semi-persistent report sent on PUCCH based on temporary RS on the cell in which the CSI-ReportConfig is included (e.g. SpCell of the SCG), or to configure a semi-persistent or aperiodic report sent on PUSCH triggered by DCI received on the cell in which the CSI-ReportConfig is included (in this case, the cell on which the report is sent is determined by the received DCI).

Other examples are given below for the case where operating in power saving mode means operating in long DRX.

Configuration of Temporary RS on DRX OFF
  UE embodiments:
    Reception of temporary Reference Signal (RS) configuration, to be used on transition from DRX operation to non-DRX operation
    Reception of the temporary RS resource configuration and also reporting configuration (e.g. via RRCReconfiguration) prior to entering the long DRX state
    Optionally, a validity timer information is also provided indicating for how long these temporary RS resource and reporting should be used after they are activated
    More than one temporary RS resource/reporting configuration can be received (e.g. each with a configuration index, such as a measurement ID)
  NOTE: the temporary RS configuration is an RRC configuration and thus generated by the SN. If there is SRB3 configured, this can be transmitted directly from the SN. If not, the RRC configuration is transported via the MN like any SCG generated RRC configuration (i.e. embedded with MCG RRC)
    Storing the configuration(s)
    Starting to operate in long DRX mode (e.g. inactivity timer expiring, reception of a MAC CE/DCI to turn on DRX, etc). The command to turn ON the long DRX can be sent either from the MN or the SN.
    Receiving a command (from the MN) to turn OFF the DRX, and turning off long DRX operation on the SCG
    Start measuring on the SCG using the stored temporary RS resource configuration and reporting using the associated reporting configuration
      In case multiple configurations were provided, in one alternative, the DRX OFF command could indicate which configuration should be used (e.g. by including the index/measId associated with that configuration)
      In another alternative, the UE measures/reports according to all the configurations
      If a validity timer was provided, starting the validity timer
    Report the measurements to the SN.
    Stop measuring/reporting on the temporary RSs once certain condition(s) is/are fulfilled, such as:
      A valid CSI report is generated (i.e. not OOR); or
      DL sync has been acquired;
      that concerned cell group is up and running (E.g. DL data has been properly scheduled/received); or
      (if validity timer was configured) on the expiration of the validity timer; or
      Reception of a command (e.g. MAC CE, DCI) from the SN indicating to stop the reporting on the temporary RSs (e.g. when the SN has determined that DL sync has been acquired before the duration/validity of the temporary RS signaling has expired)

Network embodiments:
Configuring the UE with a temporary Reference Signal (RS) configuration, for the UE to use on transition from DRX operation to non-DRX operation
Providing the temporary RS resource configuration and also reporting configuration via RRCReconfiguration prior to entering the DRX state
Optionally, including a validity timer information indicating to the UE for how long these CSI resource and reporting should be used after they are activated
Optionally, including more than one temporary RSs resource/reporting configurations (e.g. each with a configuration index, such as a measurement ID)
NOTE: this is done by the SN (either directly via SR3 or embedded within an MCG RRC via SRB1).
sending a command (e.g. RRC, MAC CE, DCI) to turn on long DRX on the SCG
This can be done by the MN or SN
Deciding to turn OFF the DRX
This can be triggered by the SN (e.g. DL data arriving at the SN, whereby the SN sends an activity notification to the MN), or by the MN (e.g. when the MN decides to start offloading some of the data transmission for MCG terminated split bearers).
Sending a DRX OFF command (e.g. MAC CE, DCI) to the UE
This is done by the MN. If the triggering was performed by the MN in the previous stage, the MN has to inform the SN about this.
Start the validity timer (if configured) and start transmitting the temporary RSs on the time/frequency indicated in the temporary RS configuration(s)
This is done by the SN
Stop transmitting on the temporary RSs once certain condition(s) is/are fulfilled:
A valid CSI report is received (i.e. not OOR); or
When DL sync has been acquired
that concerned cell group is up and running (E.g. DL data has been properly scheduled/received); or
(if validity timer was configured) on the expiration of the validity timer.
(optionally) send a command to the UE to stop reporting on the temporary RS resources ((e.g. when the SN has determined that DL sync has been acquired before the duration/validity of the temporary RS signaling has expired Other Use Cases:
In most of the descriptions above, it has been assumed that the temporary RS configuration is used when the operation of the SCG is changed from a power saving mode to a normal mode. In some embodiments, it could be envisioned that the temporary RS concept can be used even when an SCG is added, this being an example of the first operation state. For example, the temporary RS could be part of the SCG configuration, and upon applying the SCG configuration that adds the PSCell (and optionally other SCG SCells), the UE starts 10 monitoring the temporary RSs and reporting them based on the received temporary RS configuration, thereby getting a quick synchronization with the PSCell and enabling the quick scheduling in the UL/DL.

Similarly, the temporary RS concept can be used during SCG change, this being an example of the first operation state. Some useful scenarios for this could be the case where the PSCell is being served by a node different from the source PSCell or operating at a different frequency band than the source PSCell.

Figure 20:
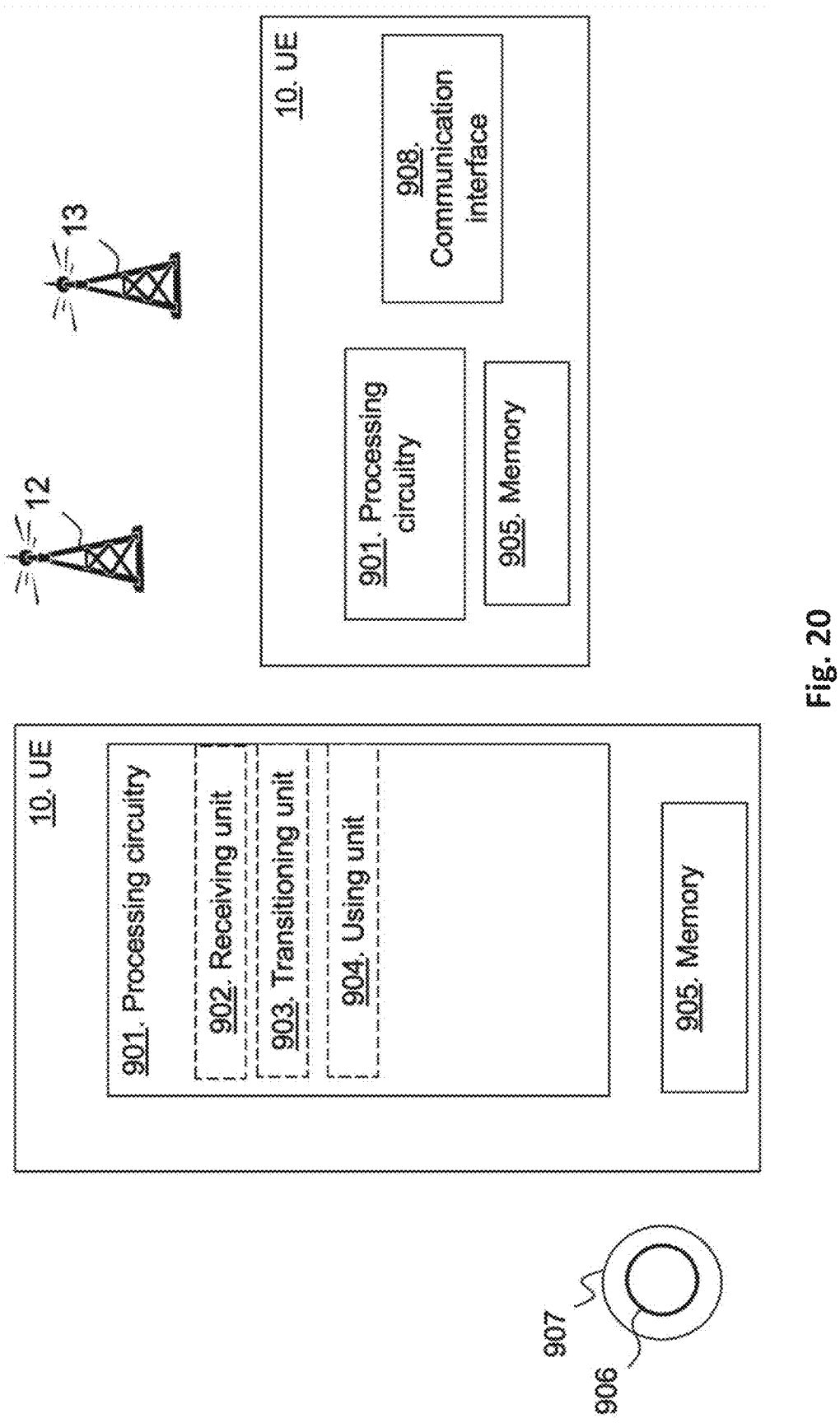
FIG. 20 shows UEs according to embodiments herein.

FIG. 20 is a block diagram depicting the UE 10, in two embodiments, for communicating in the wireless communication network 1 according to embodiments herein. The UE is configured to be connected to the first cell of the MSG, and the second cell of the SCG. The wireless communication network may thus comprise the first cell and the second cell and the UE is connected to the first cell and the second cell.

The UE 10 may comprise processing circuitry 901, e.g. one or more processors, configured to perform the methods herein. The first operation state may comprise the normal mode for the SCG, and/or the second operation state may comprise the power saving mode for the SCG.

The UE 10 may comprise a receiving unit 902, e.g. a receiver and/or transceiver. The UE 10, the processing circuitry 901 and/or the receiving unit 902 may be configured to receive from a first radio network node or a second radio network node, the monitoring indication indicating the temporary reference signal configuration defining where and when to monitor for the one or more temporary reference signals of the SCG. For example, receive, from a radio network node, an indication indicating the temporary RS configuration i.e. where and when to monitor for the temporary RS. The monitoring indication may be received: while the SCG is operating in the normal mode, being the first operation state; when the UE is instructed to put the SCG in the power saving mode, being the second operation state; and/or when the UE is instructed to bring the SCG back to normal mode, being the first operation state. Thus, the monitoring indication may be provided to the UE 10 in different ways and/or different points in time, for example:
While the SCG is operating in normal mode
When the UE is instructed to put the SCG in power saving mode
When the UE is instructed to bring the SCG back to normal mode
The indication may be comprised in a configuration message to the UE 10.

The UE 10, the processing circuitry 901 and/or the receiving unit 902 may be configured to receive from the first radio network node, the indication indicating the transition to the second operation state in the second cell. For example, receive, from a radio network node, an indication indicating a transition to the second operation state in the second cell e.g. a command to the UE so the UE enters power saving mode for the SCG.

The UE 10 may comprise a transitioning unit 903. The UE 10, the processing circuitry 901 and/or the transitioning unit 903 may be configured to change state e.g. transition to the second operation state.

The UE 10, the processing circuitry 901 and/or the receiving unit 902 is configured to receive an indication to perform transition to the first operation state from the second operation state of the SCG. For example, receive, from the radio network node, another indication indicating a transition to the first operation state in the second cell e.g. a command to the UE so the UE enters normal mode for the SCG.

The UE 10, the processing circuitry 901 and/or the transitioning unit 903 may be configured to change state e.g. transition to the first operation state.

The UE 10 may comprise a using unit 904. The UE 10, the processing circuitry 901 and/or the using unit 904 is configured to, upon transitioning to the first operation state, monitor for one or more temporary reference signals of the SCG. For example, use at least one temporary reference signal of a second cell group e.g. upon state transition the UE monitors for one or more temporary reference signals of the second cell.

The UE 10 further comprises a memory 905. The memory comprises one or more units to be used to store data on, such as indications, temporary RS configurations, time intervals, strengths or qualities, grants, indications, reconfiguration, configuration, values, scheduling information, timers, applications to perform the methods disclosed herein when being executed, and similar. The UE 10 comprises a communication interface 908 comprising transmitter, receiver, transceiver and/or one or more antennas.

The methods according to the embodiments described herein for the UE 10 are respectively implemented by means of e.g. a computer program product 906 or a computer program product, comprising instructions, i.e., software code portions, which, when executed on at least one processor, cause the at least one processor to carry out the actions described herein, as performed by the UE 10. The computer program product 906 may be stored on a computer-readable storage medium 907, e.g. a universal serial bus (USB) stick, a disc or similar. The computer-readable storage medium 907, having stored thereon the computer program product, may comprise the instructions which, when executed on at least one processor, cause the at least one processor to carry out the actions described herein, as performed by the UE 10. In some embodiments, the computer-readable storage medium may be a non-transitory or transitory computer-readable storage medium.

Figure 21A:
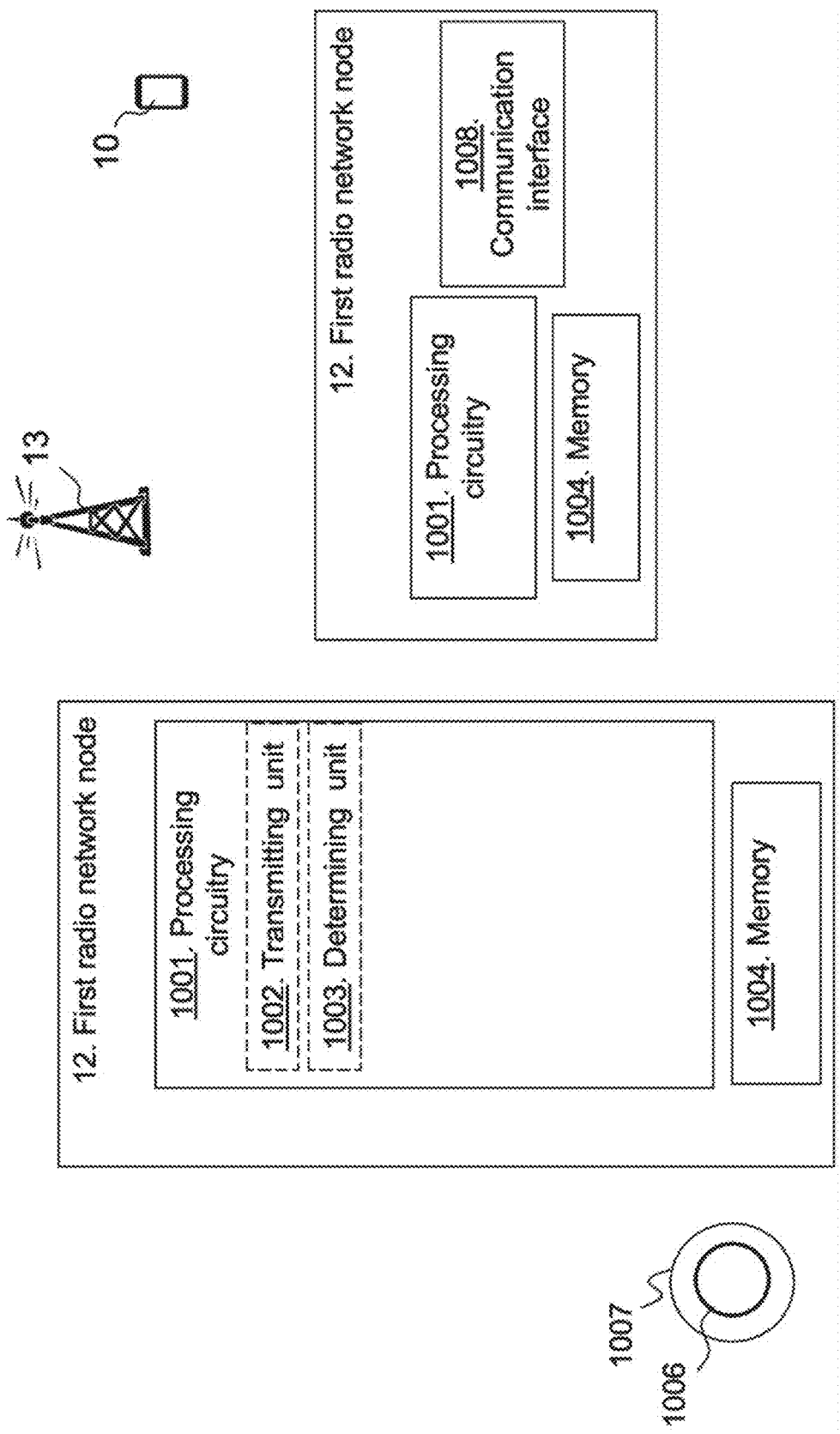
FIG. 21a shows first radio network nodes according to embodiments herein.

FIG. 21*a* is a block diagram depicting the first radio network node 12, in two embodiments, for communicating in the wireless communication network 1 according to embodiments herein. The first radio network node 12 is configured to provide radio coverage over the first cell of the MCG to which the UE 10, is connected to.

The first radio network node 12 may comprise processing circuitry 1001, e.g. one or more processors, configured to perform the methods herein.

The first radio network node 12 may comprise a transmitting unit 1002, e.g. a transmitter or a transceiver. The first radio network node 12, the processing circuitry 1001 and/or the transmitting unit 1002 may be configured to transmit to the UE, the monitoring indication indicating the temporary reference signal configuration defining where and when to monitor for the one or more temporary reference signals of the SCG. For example, transmit to the UE, the indication indicating the temporary RS configuration i.e. where and when to monitor for the temporary RS. The monitoring indication may be transmitted: while the SCG is operating in the normal mode, being the first operation state; when the UE is instructed to put the SCG in the power saving mode, being the second operation state; and/or when the UE 10 is instructed to bring the SCG back to normal mode, being the first operation state. Thus, the monitoring indication may be provided to the UE 10 in different ways and/or different points in time, for example:

While the SCG is operating in normal mode
  When the UE 10 is instructed to put the SCG in power saving mode
  When the UE 10 is instructed to bring the SCG back to normal mode The indication may be comprised in a configuration message to the UE 10.

The first radio network node 12 may comprise a determining unit 1003. The first radio network node 12, the processing circuitry 1001 and/or the determining unit 1003 may be configured to determine to perform transition of the UE to the second operation state.

The first radio network node 12, the processing circuitry 1001 and/or the transmitting unit 1002 may be configured to transmit to the UE 10, an indication indicating the transition to the second operation state in the second cell. For example, transmit to the UE 10, the indication indicating the transition to the second operation state in the second cell e.g. a command to the UE 10 so the UE 10 enters power saving mode for the SCG.

The first radio network node, the processing circuitry 1001 and/or the determining unit 1003 is configured to obtain the indication that the UE is to perform transition to the first operation state from the second operation state in the second cell of the SCG. For example, obtain the indication or determine to transition the UE to the first operation state.

The first radio network node 12, the processing circuitry 1001 and/or the transmitting unit 1002 is configured to transmit the triggering indication to the UE 10 to perform transition to the first operation state and to trigger the UE 10 to monitor for one or more temporary reference signals of the SCG. For example, transmit to the UE 10, another indication to transition to the first operation state in the second cell e.g. triggering the UE 10 to monitor for the at least one temporary reference signal from the radio network node, a command to the UE 10 so the UE 10 enters normal mode for the SCG.

The first operation state may comprise the normal mode for the SCG, and/or the second operation state may comprise the power saving mode for the SCG.

The first radio network node 12 further comprises a memory 1004. The memory comprises one or more units to be used to store data on, such as indications, temporary RS configurations, strengths or qualities, grants, messages, execution conditions, user data, reconfiguration, configurations, scheduling information, timers, applications to perform the methods disclosed herein when being executed, and similar. The first radio network node 12 comprises a communication interface 1008 comprising transmitter, receiver, transceiver and/or one or more antennas.

The methods according to the embodiments described herein for the first radio network node 12 are respectively implemented by means of e.g. a computer program product 1006 or a computer program product, comprising instructions, i.e., software code portions, which, when executed on at least one processor, cause the at least one processor to carry out the actions described herein, as performed by the first radio network node 12. The computer program product 1006 may be stored on a computer-readable storage medium 1007, e.g. a universal serial bus (USB) stick, a disc or similar. The computer-readable storage medium 1007, having stored thereon the computer program product, may comprise the instructions which, when executed on at least one processor, cause the at least one processor to carry out the actions described herein, as performed by the first radio network node 12. In some embodiments, the computer-readable storage medium may be a non-transitory or transitory computer-readable storage medium.

Figure 21B:
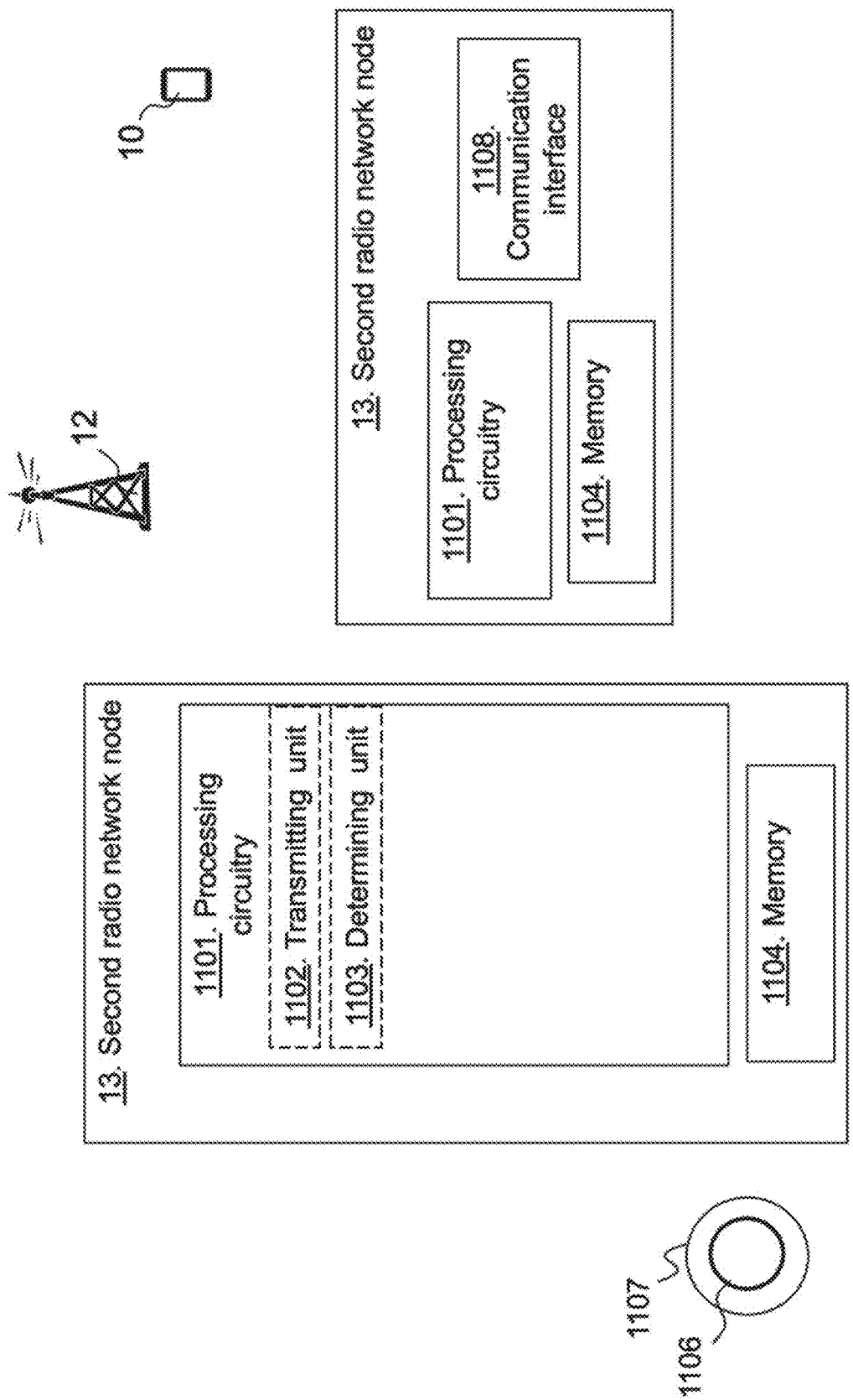
FIG. 21b shows second radio network nodes according to embodiments herein.

FIG. 21*b* is a block diagram depicting the second radio network node 13, in two embodiments, for communicating in the wireless communication network 1 according to embodiments herein. The second radio network node is configured to provide radio coverage over the second cell of the SCG, to which the UE is connected to.

The second radio network node 13 may comprise processing circuitry 1101, e.g. one or more processors, configured to perform the methods herein.

The second radio network node 13 may comprise a transmitting unit 1102, e.g. a transmitter or a transceiver. The second radio network node 13, the processing circuitry 1101 and/or the transmitting unit 1102 may be configured to transmit to the UE 10, the monitoring indication indicating the temporary reference signal configuration defining where and when to monitor for the one or more temporary reference signals of the SCG. For example, transmit to the UE 10, the indication indicating the temporary RS configuration i.e. where and when to monitor for the temporary RS. The monitoring indication may be transmitted: while the SCG is operating in a normal mode, being the first operation state; when the UE is instructed to put the SCG in power saving mode, being the second operation state; and/or when the UE is instructed to bring the SCG back to normal mode, being the first operation state. canthus, the monitoring indication may be provided to the UE 10 in different ways and/or different points in time, for example:

While the SCG is operating in normal mode
When the UE 10 is instructed to put the SCG in power saving mode
When the UE 10 is instructed to bring the SCG back to normal mode The indication may be comprised in a configuration message to the UE 10.

The second radio network node 13 may comprise a determining unit 1103. The second radio network node 13, the processing circuitry 1101 and/or the determining unit 1103 may be configured to determine to perform transition of the UE 10 to the second operation state.

The second radio network node 13, the processing circuitry 1101 and/or the transmitting unit 1102 may be configured to transmit to the UE 10, the indication indicating the transition to the second operation state in the second cell e.g. a command to the UE so the UE 10 enters power saving mode for the SCG.

The second radio network node 13, the processing circuitry 1101 and/or the determining unit 1103 is configured to obtain the indication that the UE 10 is to perform transition to the first operation state from the second operation state in the second cell of the SCG. For example, obtain the indication or determine to transition the UE 10 to the first operation state.

The second radio network node 13, the processing circuitry 1101 and/or the transmitting unit 1102 may be configured to transmit to the first radio network node 12, another indication to transition the UE 10 to the first operation state in the second cell.

The second radio network node 13, the processing circuitry 1101 and/or the transmitting unit 1102 is configured to transmit the one or more temporary reference signals of the SCG. For example, transmit at least one temporary reference signal of the second cell. The one or more temporary reference signals of the SCG may be transmitted with at least one of the following properties:

Shorter periodicity compared to the periodicity of other reference signals of the SCG;
Higher density in frequency and/or time compared to other reference signals of the SCG;
Different beamforming properties compared to other reference signals of the SCG;
Different reference signal type compared to other reference signals of the SCG.

The first operation state may comprise the normal mode for the SCG, and/or the second operation state may comprise the power saving mode for the SCG.

The second radio network node 13, the processing circuitry 1101 and/or the transmitting unit 1102 may be configured to start a timer when transmission of the one or more temporary reference signals starts; and, upon the timer expires, configured to stop transmission of the one or more temporary reference signals.

The second radio network node 13 further comprises a memory 1104. The memory comprises one or more units to be used to store data on, such as indications, temporary RS configurations, strengths or qualities, grants, messages, execution conditions, user data, reconfiguration, configurations, scheduling information, timers, applications to perform the methods disclosed herein when being executed, and similar. The second radio network node 13 comprises a communication interface 1108 comprising transmitter, receiver, transceiver and/or one or more antennas.

The methods according to the embodiments described herein for the second radio network node 13 are respectively implemented by means of e.g. a computer program product 1106 or a computer program product, comprising instructions, i.e., software code portions, which, when executed on at least one processor, cause the at least one processor to carry out the actions described herein, as performed by the second radio network node 13. The computer program product 1106 may be stored on a computer-readable storage medium 1107, e.g. a universal serial bus (USB) stick, a disc or similar. The computer-readable storage medium 1107, having stored thereon the computer program product, may comprise the instructions which, when executed on at least one processor, cause the at least one processor to carry out the actions described herein, as performed by the second radio network node 13. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), gateways, transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g.

data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 22:
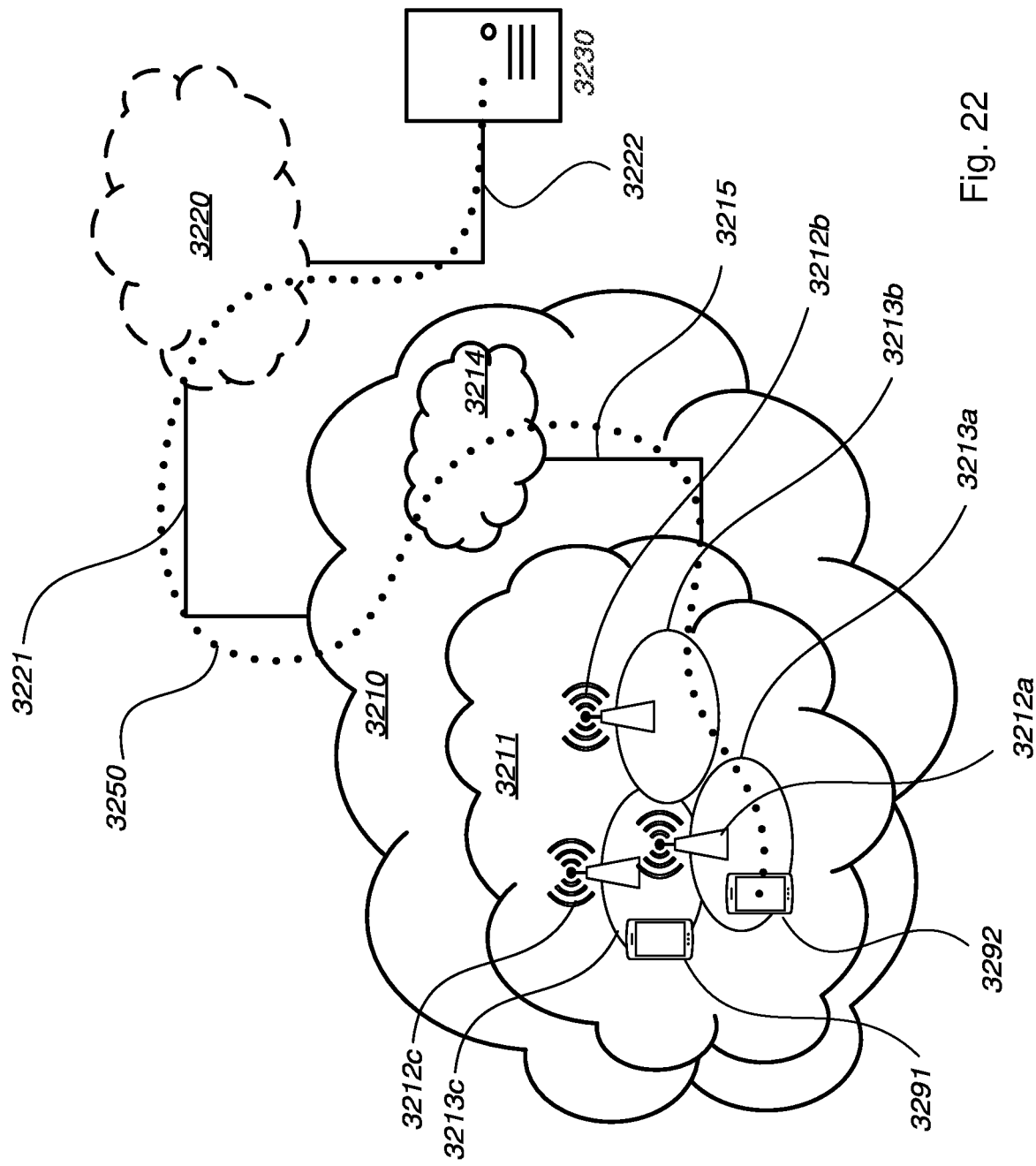
FIG. 22 schematically illustrates a telecommunication network connected via an intermediate network to a host computer.

With reference to FIG. 22, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 22 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 23. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 23) served by the base station 3320. The communication interface 3326 may be configured to facilitate a connection 3360 to the host computer 3310. The connection 3360 may be direct or it may pass through a core network (not shown in FIG. 23) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions.

The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 23:
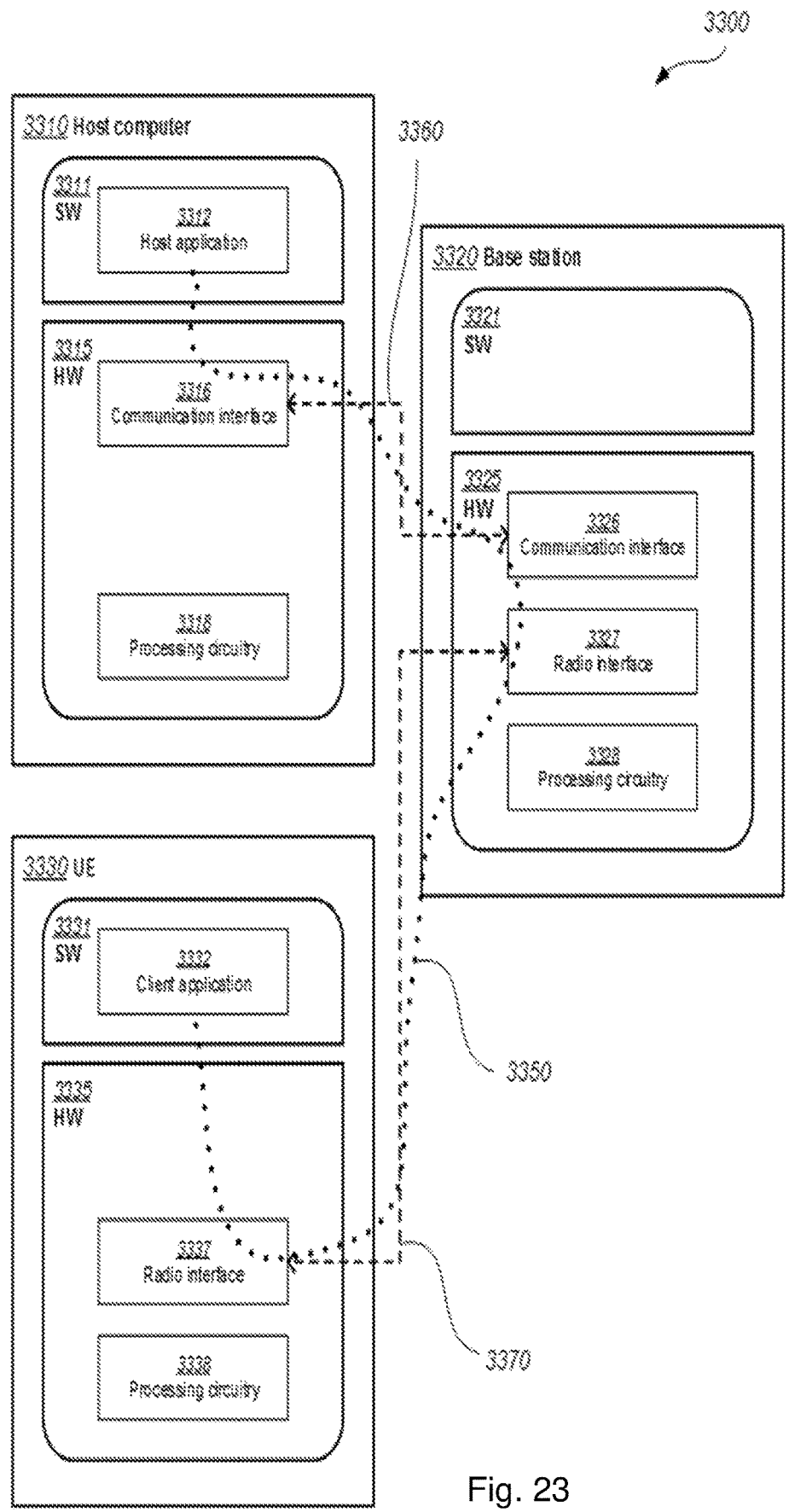
FIG. 23 is a generalized block diagram of a host computer communicating via a base station with a user equipment over a partially wireless connection.

It is noted that the host computer 3310, base station 3320 and UE 3330 illustrated in FIG. 23 may be identical to the host computer 3230, one of the base stations 3212a, 3212b, 3212c and one of the UEs 3291, 3292 of FIG. 22, respectively. This is to say, the inner workings of these entities may be as shown in FIG. 23 and independently, the surrounding network topology may be that of FIG. 22.

In FIG. 23, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may enable quick synchronization to a SCG and thereby provide benefits such as improved user experience and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
| --- | --- |
| 5GC | 5th Generation Core network |
| CDM | Code Division Multiplex |
| CQI | Channel Quality Information |
| CSI | Channel State Information |
| CRC | Cyclic Redundancy Check |
| DC | Dual Connectivity |
| DCI | Downlink Control Information |
| DFT | Discrete Fourier Transform |
| DM-RS | Demodulation Reference Signal |
| DRX | Discontinuous Reception |
| EPC | Evolved Packet Core network |
| FDM | Frequency Division Multiplex |
| HARQ | Hybrid Automatic Repeat Request |
| OFDM | Orthogonal Frequency Division Multiplex |
| PAPR | Peak to Average Power Ratio |
| PUCCH | Physical Uplink Control Channel |
| PUSCH | Physical Uplink Shared Channel |
| SRS | Sounding Reference Signal |
| PRACH | Physical Random Access Channel |
| DC | Dual-connectivity |
| PRB | Physical Resource Block |
| RRC | Radio Resource Control |
| UCI | Uplink Control Information |
| EIRP | Effective Isotropic Radiated Power |
| SS-block | Synchronisation Signal Block |
| CSI-RS | Channel State Information Reference Signal |
| PBCH | Primary Broadcast Channel |
| MAC | Medium Access Control |
| MAC CE | MAC Control Entity |
| MCG | Master cell group |
| MR-DC | Multi-Radio Dual Connectivity |
| SCG | Secondary cell group |
| MN | Master Node |

The invention claimed is:

1. A method performed by a user equipment (UE) for communicating in a wireless communication network, the method comprising:
receiving a message from a first cell of the wireless communication network, the message indicating that the UE is to transition from a normal mode of operation into a power saving mode operation with respect to a second cell of the wireless communication network, the first cell belonging to a master cell group (MCG) and the second cell belonging to a secondary cell group (SCG);
determining resources to monitor for a burst of temporary reference signals, for subsequently returning to the normal mode of operation with respect to the second cell, based on a temporary reference signal configuration that was indicated in the message and indicates the resources to be used for transmitting the burst of temporary reference signals; and
in association with returning to the normal mode of operation with respect to the second cell, monitoring the indicated resources for the burst of temporary reference signals.

2. A method performed by a first radio network node for communicating in a wireless communication network, wherein the first radio network node provides radio coverage over a first cell of a master cell group (MCG), wherein a second radio network node provides radio coverage over a second cell of a secondary cell group (SCG), and wherein a user equipment (UE) is connected to the first and second cells, the method comprising:
communicating with the second radio network node to establish a temporary reference signal configuration that defines resources to be used for transmitting a burst of temporary reference signals in association with the UE returning to a normal mode of operation with respect to the second cell;
sending a message to the UE, the message indicating to the UE that the UE is to transition from a current, normal mode of operation with respect to the second cell into a power saving mode of operation with respect to the cell, and the message further indicating the temporary reference signal configuration; and
transmitting a triggering indication to the UE while the UE is operating in the power saving mode of operation with respect to the second cell, to trigger the UE to perform a transition to the normal mode of operation with respect to the second cell.

3. A method performed by a second radio network node for communicating in a wireless communication network, wherein the second radio network node provides radio coverage over a second cell of a secondary cell group (SCG) to which a user equipment (UE) is connected to, wherein a first radio network node provides radio coverage over a first cell of a master cell group (MCG) to which the UE is connected, the method comprising:
communicating with the first radio network node to establish a temporary reference signal configuration that defines resources to be used for transmitting a burst of temporary reference signals in association with the UE returning from a power saving mode with respect to the second cell to a normal mode of operation with respect to the second cell;
determining, subsequent to the UE entering the power saving mode of operation with respect to the second cell, that the UE is returning to the normal mode operation with respect to the second cell; and transmitting the burst of temporary reference signals, according to the temporary reference signal configuration.

4. The method according to claim 3, wherein transmitting the burst of temporary reference signals comprises:

starting a timer when transmission of the burst of temporary reference signals starts; and, upon expiration of the timer, stopping transmission of the burst of temporary reference signals.

5. A user equipment (UE) for communicating in a wireless communication network, wherein the UE comprises:

a communication interface; and processing circuitry configured to:

receive, via the communication interface, a message from a first cell of the wireless communication network, the message indicating that the UE is to transmission from a normal mode of operation into a power saving mode operation with respect to a second cell of the wireless communication network, the first cell belonging to a master cell group (MCG) and the second cell belonging to a secondary cell group (SCG);

determine resources to monitor for a burst of temporary reference signals, for subsequently returning to the normal mode of operation with respect to the second cell, based on a temporary reference signal configuration that was indicated in the message and indicates the resources to be used for transmitting the burst of temporary reference signals; and in association with returning to the normal mode of operation with respect to the second cell, monitor the indicated resources for the burst of temporary reference signals.

* * * * *